US011212356B2

(12) United States Patent
Rolando et al.

(10) Patent No.: US 11,212,356 B2
(45) Date of Patent: Dec. 28, 2021

(54) PROVIDING SERVICES AT THE EDGE OF A NETWORK USING SELECTED VIRTUAL TUNNEL INTERFACES

(71) Applicant: VMware, Inc., Palo Alto, CA (US)

(72) Inventors: Pierluigi Rolando, Santa Clara, CA (US); Jayant Jain, Cupertino, CA (US); Raju Koganty, San Jose, CA (US); Kantesh Mundaragi, Pune (IN); Yuxiao Zhang, Mountain View, CA (US); Rahul Mishra, Mountain View, CA (US); Akhila Naveen, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/904,399

(22) Filed: Jun. 17, 2020

(65) Prior Publication Data

US 2021/0314415 A1 Oct. 7, 2021

(30) Foreign Application Priority Data

Apr. 6, 2020 (IN) .............................. 202041015116

(51) Int. Cl.
*H04L 29/08* (2006.01)
*H04L 12/46* (2006.01)
*H04L 29/06* (2006.01)
*H04L 12/911* (2013.01)

(52) U.S. Cl.
CPC ...... *H04L 67/2814* (2013.01); *H04L 12/4662* (2013.01); *H04L 63/0272* (2013.01); *H04L 63/164* (2013.01); *H04L 47/825* (2013.01)

(58) Field of Classification Search
CPC ............. H04L 67/2814; H04L 12/4662; H04L 63/0272; H04L 63/164
See application file for complete search history.

(56) References Cited

U.S. PATENT DOCUMENTS

| 6,006,264 | A | 12/1999 | Colby et al. |
|---|---|---|---|
| 6,104,700 | A | 8/2000 | Haddock et al. |
| 6,154,448 | A | 11/2000 | Petersen et al. |
| 6,772,211 | B2 | 8/2004 | Lu et al. |
| 6,779,030 | B1 | 8/2004 | Dugan et al. |
| 6,826,694 | B1 | 11/2004 | Dutta et al. |
| 6,880,089 | B1 | 4/2005 | Bommareddy et al. |
| 6,985,956 | B2 | 1/2006 | Luke et al. |
| 7,013,389 | B1 | 3/2006 | Srivastava et al. |
| 7,209,977 | B2 | 4/2007 | Acharya et al. |
| 7,239,639 | B2 | 7/2007 | Cox et al. |
| 7,379,465 | B2 | 5/2008 | Aysan et al. |
| 7,406,540 | B2 | 7/2008 | Acharya et al. |
| 7,447,775 | B1 | 11/2008 | Zhu et al. |
| 7,480,737 | B2 | 1/2009 | Chauffour et al. |
| 7,487,250 | B2 | 2/2009 | Siegel |
| 7,649,890 | B2 | 1/2010 | Mizutani et al. |
| 7,698,458 | B1 | 4/2010 | Liu et al. |
| 7,818,452 | B2 | 10/2010 | Matthews et al. |
| 7,898,959 | B1 | 3/2011 | Arad |
| 7,948,986 | B1 | 5/2011 | Ghosh et al. |
| 8,078,903 | B1 | 12/2011 | Parthasarathy et al. |
| 8,094,575 | B1 | 1/2012 | Vadlakonda et al. |
| 8,175,863 | B1 | 5/2012 | Ostermeyer et al. |
| 8,190,767 | B1 | 5/2012 | Maufer et al. |
| 8,201,219 | B2 | 6/2012 | Jones |
| 8,223,634 | B2 | 7/2012 | Tanaka et al. |
| 8,224,885 | B1 | 7/2012 | Doucette et al. |
| 8,230,493 | B2 | 7/2012 | Davidson et al. |
| 8,266,261 | B2 | 9/2012 | Akagi |
| 8,339,959 | B1 | 12/2012 | Moisand et al. |
| 8,451,735 | B2 | 5/2013 | Li |
| 8,484,348 | B2 | 7/2013 | Subramanian et al. |
| 8,488,577 | B1 | 7/2013 | Macpherson |

(Continued)

FOREIGN PATENT DOCUMENTS

| CN | 1689369 A | 10/2005 |
|---|---|---|
| CN | 101594358 A | 12/2009 |

(Continued)

OTHER PUBLICATIONS

Author Unknown, "Datagram," Jun. 22, 2012, 2 pages, retrieved from https://web.archive.org/web/20120622031055/https://en.wikipedia.org/wiki/datagram.
Author Unknown, "AppLogic Features," Jul. 2007, 2 pages. 3TERA, Inc.
Author Unknown, "Enabling Service Chaining on Cisco Nexus 1000V Series," Month Unknown, 2012, 25 pages, CISCO.
Casado, Martin, et al., "Virtualizing the Network Forwarding Plane," Dec. 2010, 6 pages.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Greenberg, Albert, et al., "VL2: A Scalable and Flexible Data Center Network," SIGCOMM '09, Aug. 17-21, 2009, 12 pages, ACM, Barcelona, Spain.

(Continued)

*Primary Examiner* — Brian Whipple
(74) *Attorney, Agent, or Firm* — Adeli LLP

(57) ABSTRACT

For traffic exiting a logical network through a particular VTI, some embodiments perform a service classification operation for different data messages to identify different VTIs that connect the edge forwarding element to a service node to provide services required by the data messages. Each data message, in some embodiments, is then forwarded to the identified VTI to receive the required service. The identified VTI does not perform a service classification operation. The service node then returns the serviced data message to the edge forwarding element. In some embodiments, the identified VTI is not configured to perform the service classification operation and is instead configured to mark all traffic directed to the edge forwarding element as having been serviced. The marked serviced data message is received at the edge forwarding element and forwarded to a destination of the data message through the particular VTI.

20 Claims, 36 Drawing Sheets

(56) References Cited

U.S. PATENT DOCUMENTS

| | | |
|---|---|---|
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Haugsnes et al. |
| 8,966,024 B2 | 2/2015 | Koponen et al. |
| 8,966,029 B2 | 2/2015 | Zhang et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,009,289 B1 | 4/2015 | Jacob |
| 9,015,823 B2 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,191,293 B2 | 11/2015 | Iovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,042,722 B1 | 8/2018 | Chigurupati et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,514,941 B2 | 12/2019 | Zhang et al. |
| 10,516,568 B2 | 12/2019 | Jain et al. |
| 10,547,692 B2 | 1/2020 | Salgueiro et al. |
| 10,594,743 B2 | 3/2020 | Hong et al. |
| 10,609,091 B2 | 3/2020 | Hong et al. |
| 10,623,309 B1 | 4/2020 | Gampel et al. |
| 10,645,060 B2 | 5/2020 | Ao et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,742,544 B2 | 8/2020 | Roeland et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,853,111 B1 | 12/2020 | Gupta et al. |
| 10,929,171 B2 | 2/2021 | Gokhale et al. |
| 10,938,716 B1 | 3/2021 | Chin et al. |
| 10,944,673 B2 | 3/2021 | Naveen et al. |
| 10,949,244 B2 | 3/2021 | Naveen et al. |
| 11,003,482 B2 | 5/2021 | Rolando et al. |
| 11,012,420 B2 | 5/2021 | Sevinc et al. |
| 11,036,538 B2 | 6/2021 | Lecuyer et al. |
| 11,038,782 B2 | 6/2021 | Boutros et al. |
| 11,042,397 B2 | 6/2021 | Mishra et al. |
| 11,074,097 B2 | 7/2021 | Naveen et al. |
| 11,075,839 B2 | 7/2021 | Zhuang et al. |
| 11,075,842 B2 | 7/2021 | Jain et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |

(56) References Cited

U.S. PATENT DOCUMENTS

| | | |
|---|---|---|
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0291088 A1 | 10/2013 | Shieh et al. |
| 2013/0297798 A1 | 11/2013 | Arisoylu et al. |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0336319 A1 | 12/2013 | Liu et al. |
| 2013/0343174 A1 | 12/2013 | Guichard et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0269717 A1 | 9/2014 | Thubert et al. |
| 2014/0269724 A1 | 9/2014 | Mehler et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |

(56) References Cited

U.S. PATENT DOCUMENTS

| | | |
|---|---|---|
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0351452 A1 | 11/2014 | Bosch et al. |
| 2014/0362682 A1 | 12/2014 | Guichard et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0092564 A1 | 4/2015 | Aldrin |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0263901 A1 | 9/2015 | Kumar et al. |
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0365322 A1 | 12/2015 | Shatzkamer et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0149816 A1 | 5/2016 | Roach et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0205015 A1 | 7/2016 | Halligan et al. |
| 2016/0212048 A1 | 7/2016 | Kaempfer et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0344565 A1 | 11/2016 | Batz et al. |
| 2016/0344621 A1 | 11/2016 | Roeland et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0026417 A1 | 1/2017 | Ermagan et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0163531 A1 | 6/2017 | Kumar et al. |
| 2017/0163724 A1 | 6/2017 | Puri et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0230333 A1 | 8/2017 | Glazemakers et al. |
| 2017/0230467 A1 | 8/2017 | Salgueiro et al. |

(56) References Cited

U.S. PATENT DOCUMENTS

| | | |
|---|---|---|
| 2017/0237656 A1 | 8/2017 | Gage |
| 2017/0250902 A1 | 8/2017 | Rasanen et al. |
| 2017/0250917 A1 | 8/2017 | Ruckstuhl et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317954 A1 | 11/2017 | Masurekar et al. |
| 2017/0318097 A1 | 11/2017 | Drew et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0364794 A1 | 12/2017 | Mahkonen et al. |
| 2017/0373990 A1 | 12/2017 | Jeuk et al. |
| 2018/0027101 A1 | 1/2018 | Kumar et al. |
| 2018/0041524 A1 | 2/2018 | Reddy et al. |
| 2018/0063018 A1 | 3/2018 | Bosch et al. |
| 2018/0091420 A1 | 3/2018 | Drake et al. |
| 2018/0102919 A1 | 4/2018 | Hao et al. |
| 2018/0115471 A1 | 4/2018 | Curcio et al. |
| 2018/0123950 A1* | 5/2018 | Garg ............... H04L 63/0236 |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa et al. |
| 2018/0191600 A1 | 7/2018 | Hecker et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0248713 A1 | 8/2018 | Zanier et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1 | 10/2018 | Leung et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028384 A1 | 1/2019 | Penno et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1* | 6/2019 | Jain .................... H04L 63/0428 |
| 2019/0173851 A1* | 6/2019 | Jain .................... H04L 45/50 |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |
| 2020/0204492 A1 | 6/2020 | Sarva et al. |
| 2020/0213366 A1 | 7/2020 | Hong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0322271 A1 | 10/2020 | Jain et al. |
| 2020/0344088 A1 | 10/2020 | Selvaraj et al. |
| 2020/0358696 A1 | 11/2020 | Hu et al. |
| 2020/0366526 A1 | 11/2020 | Boutros et al. |
| 2020/0366584 A1 | 11/2020 | Boutros et al. |
| 2020/0382412 A1 | 12/2020 | Chandrappa et al. |
| 2020/0382420 A1 | 12/2020 | Suryanarayana et al. |
| 2021/0029088 A1 | 1/2021 | Mayya et al. |
| 2021/0044502 A1 | 2/2021 | Boutros et al. |
| 2021/0120080 A1 | 4/2021 | Mishra et al. |
| 2021/0135992 A1 | 5/2021 | Tidemann et al. |
| 2021/0136140 A1 | 5/2021 | Tidemann et al. |
| 2021/0136141 A1 | 5/2021 | Tidemann et al. |
| 2021/0218587 A1 | 7/2021 | Mishra et al. |
| 2021/0227041 A1 | 7/2021 | Sawant et al. |
| 2021/0227042 A1 | 7/2021 | Sawant et al. |

FOREIGN PATENT DOCUMENTS

| | | |
|---|---|---|
| CN | 101729412 A | 6/2010 |
| CN | 103516807 A | 1/2014 |
| CN | 103795805 A | 5/2014 |
| EP | 2426956 A1 | 3/2012 |
| EP | 2466985 A1 | 6/2012 |
| EP | 3210345 A1 | 8/2017 |
| EP | 3300319 A1 | 3/2018 |
| JP | 2005311863 A | 11/2005 |
| WO | 9918534 A2 | 4/1999 |
| WO | 2008095010 A1 | 8/2008 |
| WO | 2014069978 A1 | 5/2014 |
| WO | 2014182529 A1 | 11/2014 |

(56) References Cited

FOREIGN PATENT DOCUMENTS

| WO | 2016053373 A1 | 4/2016 |
|---|---|---|
| WO | 2016054272 A1 | 4/2016 |
| WO | 2019084066 A1 | 5/2019 |
| WO | 2019147316 A1 | 8/2019 |
| WO | 2020046686 A1 | 3/2020 |
| WO | 2020171937 A1 | 8/2020 |
| WO | 2021086462 A1 | 5/2021 |

OTHER PUBLICATIONS

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Non-Published Commonly Owned U.S. Appl. No. 16/668,477, filed Oct. 30, 2019, 31 pages, VMware, Inc.

Non-Published Commonly Owned U.S. Appl. No. 16/668,485, filed Oct. 30, 2019, 55 pages, VMware, Inc.

Non-Published Commonly Owned U.S. Appl. No. 16/668,505, filed Oct. 30, 2019, 39 pages, VMware, Inc.

Non-Published Commonly Owned U.S. Appl. No. 16/741,544, filed Jan. 13, 2020, 31 pages, VMware, Inc.

Non-Published Commonly Owned U.S. Appl. No. 16/785,674, filed Feb. 10, 2020, 29 pages, VMware, Inc.

Non-Published Commonly Owned U.S. Appl. No. 16/843,913, filed Apr. 9, 2020, 119 pages, VMware, Inc.

Non-Published Commonly Owned U.S. Appl. No. 16/843,919, filed Apr. 9, 2020, 123 pages, VMware, Inc.

Non-Published Commonly Owned Related U.S. Appl. No. 16/904,377 with similar specification, filed Jun. 17, 2020, 120 pages, VMware, Inc.

Non-Published Commonly Owned Related U.S. Appl. No. 16/904,390 with similar specification, filed Jun. 17, 2020, 121 pages, VMware, Inc.

Non-Published Commonly Owned Related U.S. Appl. No. 16/904,430 with similar specification, filed Jun. 17, 2020, 120 pages, VMware, Inc.

Non-Published Commonly Owned Related U.S. Appl. No. 16/904,437 with similar specification, filed Jun. 17, 2020, 121 pages, VMware, Inc.

Non-Published Commonly Owned Related U.S. Appl. No. 16/904,442 with similar specification, filed Jun. 17, 2020, 121 pages, VMware, Inc.

Non-Published Commonly Owned Related U.S. Appl. No. 16/904,446 with similar specification, filed Jun. 17, 2020, 121 pages, VMware, Inc.

Non-Published Commonly Owned U.S. Appl. No. 16/905,909, filed Jun. 18, 2020, 36 pages, Nicira, Inc.

Non-Published Commonly Owned U.S. Appl. No. 16/945,675, filed Jul. 31, 2020, 51 pages, Nicira, Inc.

Non-Published Commonly Owned U.S. Appl. No. 16/945,868, filed Aug. 1, 2020, 48 pages, Nicira, Inc.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Non-Published Commonly Owned U.S. Appl. No. 17/067,635, filed Oct. 9, 2020, 65 pages, Nicira, Inc.

Siasi, N., et al., "Container-Based Service Function Chain Mapping," 2019 SoutheastCon, Apr. 11-14, 2019, 6 pages, IEEE, Huntsville, AL, USA.

Lin, Po-Ching, et al., "Balanced Service Chaining in Software-Defined Networks with Network Function Virtualization," Computer: Research Feature, Nov. 2016, 9 pages, vol. 49, No. 11, IEEE.

Non-Published Commonly Owned U.S. Appl. No. 17/346,255, filed Jun. 13, 2021, 49 pages, Nicira, Inc.

Non-Published Commonly Owned U.S. Appl. No. 17/352,298, filed Jun. 19, 2021, 132 pages, VMware, Inc.

Non-Published Commonly Owned U.S. Appl. No. 17/385,809, filed Jul. 26, 2021, 74 pages, Nicira, Inc.

PCT International Search Report and Written Opinion of commonly owned International Patent Application PCT/US2021/016117, dated May 27, 2021, 10 pages, International Searching Authority (EPO).

Xiong, Gang, et al., "A Mechanism for Configurable Network Service Chaining and Its Implementation," KSII Transactions on Internet and Information Systems, Aug. 2016, 27 pages, vol. 10, No. 8, KSII.

\* cited by examiner

PROVIDING SERVICES AT THE EDGE OF A NETWORK USING SELECTED VIRTUAL TUNNEL INTERFACES

BACKGROUND

Datacenters today provide edge services for multiple different types of traffic. Edge services for different types of traffic have, in the past, used different mechanisms to perform service classification. New use cases for edge services require yet more mechanisms for providing edge services. In order to simplify the provision of edge services for the multiple types of traffic there is a need in the art for a new approach to the provision of edge services.

BRIEF SUMMARY

Some virtualized computing environments provide edge forwarding elements that sit between an external network and internal networks (e.g., logical networks). The virtualized computing environment, in some embodiments, provides additional edge forwarding elements (and edge services) for subnetworks within the virtualized computing environment. For example, different logical networks, each with their own edge device may be implemented within a datacenter (e.g., by a provider network) that provides an edge forwarding element between an external network and the networks internal to the datacenter. Each logical network (e.g., tenant network, or provider network) includes at least one edge forwarding element, in some embodiments, that executes on either an edge host or as an edge compute node to provide the logical network with access to an external network and vice versa. In some embodiments, the edge forwarding elements provide a set of services (e.g., edge services) for traffic processed by the edge forwarding elements.

Some embodiments provide novel methods for providing different types of services for a logical network associated with an edge forwarding element acting between the logical network and an external network. The edge forwarding element receives data messages for forwarding and performs a service classification operation to select a set of services of a particular type for the data message. The particular type of service is one of multiple different types of services that use different transport mechanisms to forward the data to a set of service nodes (e.g., service virtual machines, or service appliances, etc.) that provide the service. The edge forwarding element then receives the data message after the selected set of services has been performed and performs a forwarding operation to forward the data message. In some embodiments, the method is also performed by edge forwarding elements that are at the edges of logical network segments within the logical network.

The transport mechanisms, in some embodiments, include a logical service forwarding plane (implemented as a logical service forwarding element) that connects the edge forwarding element to a set of service nodes that each provide a service in the set of services. In selecting the set of services, the service classification operation of some embodiments identifies a chain of multiple service operations that has to be performed on the data message. The service classification operation, in some embodiments, includes selecting, for the identified chain of services, a service path to provide the multiple services. After selecting the service path, the data message is sent along the selected service path to have the services provided. Once the services have been provided, the data message is returned to the edge forwarding element by a last service node in the service path that performs the last service operation and the edge forwarding element performs next hop forwarding on the data message or a forwarding operation to forward the data message.

Some embodiments provide stateful services in the chain of services identified for some data messages. To support stateful services in service chains, some embodiments generate connection tracking records in a connection tracker storage used by the edge forwarding element to track service insertion decisions made for multiple data message flows requiring multiple different sets of services (i.e., service chains). The edge forwarding element (e.g., a router) receives a data message at a particular interface of the edge forwarding element that is traversing the edge forwarding element in a forward direction between two machines. The data message, in some embodiments, is a first data message in a forward data message flow (e.g., a set of data messages sharing a same set of attributes) that together with a reverse data message flow between the two machines makes up a bidirectional flow.

The edge forwarding element identifies (1) a set of stateful services for the received data message and (2) a next hop associated with the identified set of stateful services in the forward direction and a next hop associated with the identified set of stateful services in the reverse direction. Based on the identified set of services and the next hops for the forward and reverse directions, the edge forwarding element generates and stores first and second connection tracking records for the forward and reverse data message flows, respectively. The first and second connection tracking records include the next hop identified for the forward and reverse direction data message flows, respectively. The edge forwarding element forwards the received data message to the next hop identified for the forward direction and, for subsequent data messages of the forward and reverse data message flows received by the edge forwarding element, uses the stored connection tracking records to identify the next hop for forwarding.

Some embodiments configure the edge forwarding element to perform service insertion operations to identify stateful services to perform for data messages received for forwarding by the edge forwarding element at multiple virtual interfaces of the edge forwarding element. The service insertion operation, in some embodiments, includes applying a set of service insertion rules. The service insertion rules (1) specify a set of criteria and a corresponding action to take for data messages matching the criteria (e.g., a redirection action and a redirection destination) and (2) are associated with a set of interfaces to which the service insertion rules are applied. In some embodiments, the action is specified using a universally unique identifier (UUID) that is then used as a matching criteria for a subsequent policy lookup that identifies a type of service insertion and a set of next hop data. The edge forwarding element is configured to apply, for each virtual interface, a set of relevant service insertion rules to data messages received at the virtual interface (i.e., to make a service insertion decision).

As described above, the edge forwarding element is configured with a connection tracker storage that stores connection tracking records for data message flows based on the result of a service insertion operation performed for a first data message in the data message flows. In some embodiments, the connection tracker storage is a universal storage for all interfaces of the edge forwarding element and each connection tracking record includes an identifier of a service insertion rule that is used to identify the set of stateful services and the next hop for a data message flow corresponding to the connection tracking record.

The service insertion operation, in some embodiments, includes a first lookup in the connection tracker storage to identify a connection tracking record for a data message received at an interface if it exists. If the connection tracking record exists, all connection tracking data records that include a set of data message attributes (e.g., a data message flow identifier) that match data message attributes of the received data message are identified as a set of possible connection records for the data message. Based on the service insertion rule identifiers and an interface on which the data message was received, a connection tracking record in the set of possible connection records storing an identifier for a service insertion rule applied to the interface is identified as storing the action for the received data message. If a connection tracking record for the received data message is identified, the edge forwarding element forwards the data message based on the action stored in the connection tracking record. If a connection tracking record is not identified (e.g., the data message is a first data message in a data message flow), the edge forwarding element identifies the action for the data message using the service insertion rules and generates connection tracking record and stores the connection tracking record in the connection tracker storage.

Some embodiments provide a method of performing stateful services that keeps track of changes to states of service nodes to update connection tracker records when necessary. At least one global state value indicating a state of the service nodes is maintained at the edge device. In some embodiments, different global state values are maintained for service chain service nodes (SCSNs) and layer 2 bump-in-the-wire service nodes (L2 SNs). The method generates a record in a connection tracker storage including the current global state value as a flow state value for a first data message in a data message flow. Each time a data message is received for the data message flow, the stored state value (i.e., a flow state value) is compared to the relevant global state value (e.g., SCSN state value or L2 SN state value) to determine if the stored action may have been updated.

After a change in the global state value relevant to the flow, the global state value and the flow state value do not match and the method examines a flow programming table to determine if the flow has been affected by the flow programming instruction(s) that caused the global state value to change (e.g., increment). The instructions stored in the flow programming table, in some embodiments, include a data message flow identifier and an updated action (e.g., drop, allow, update selected service path, update a next hop address). If the data message flow identifiers stored in the flow programming table do not match the current data message flow identifier, the flow state value is updated to the current global state value and the action stored in the connection tracker record is used to process the data message. However, if at least one of the data message flow identifiers stored in the flow programming table matches the current data message flow identifier, the flow state value is updated to the current global state value and the action stored in the connection tracker record is updated to reflect the execution of the instructions with a matching flow identifier stored in the flow programming table and the updated action is used to process the data message.

An edge forwarding element is configured, in some embodiments, to provide services using the service logical forwarding element as a transport mechanism. The edge forwarding element is configured to connect different sets of virtual interfaces of the edge forwarding element to different network elements of the logical network using different transport mechanisms. For example, a first set of virtual interfaces is configured to connect to a set of forwarding elements internal to the logical network using a set of logical forwarding elements connecting source and destination machines of traffic for the logical network. Traffic received on the first set of interfaces is forwarded to a next hop towards the destination by the edge forwarding element without being returned to the forwarding element from which it was received, in some embodiments. A second set of virtual interfaces is configured to connect to a set of service nodes to provide services for data messages received at the edge forwarding element.

Each connection made for the second set of virtual interfaces may use different transport mechanisms such as a service logical forwarding element, a tunneling mechanism, and a bump-in-the-wire mechanism, and in some embodiments, some or all of the transport mechanisms are used to provide data messages to the service nodes. Each virtual interface in a third set of virtual interfaces is configured to connect to a service logical forwarding element connecting the edge forwarding element to at least one internal forwarding element in the set of internal forwarding elements. The virtual interfaces are configured to be used (1) to receive data messages from the at least one internal forwarding element to be provided a service by at least one service node in the set of service nodes and (2) to return the serviced data message to the internal forwarding element network.

Some embodiments facilitate the provision of a service reachable at a virtual internet protocol (VIP) address. The VIP address is used by clients to access a set of service nodes in the logical network. In some embodiments, data messages from client machines to the VIP are directed to an edge forwarding element at which the data messages are redirected to a load balancer that load balances among the set of service nodes to select a service node to provide a service requested by the client machine. The load balancer, in some embodiments, does not change the source IP address of the data message received from the client machine so that the service node receives a data message to be serviced that identifies the client machine IP address as a source IP address. The service node services the data message and sends the serviced data message to the client machine using the IP address of the service node as a source IP address and the IP address of the client node as the destination IP address. Because the client sent the original address to the VIP address, the client will not recognize the source IP address of the serviced data message as being a response to the request sent to the VIP address and the serviced data message will not be processed appropriately (e.g., it will be dropped, or not associated with the original request).

Facilitating the provision of the service, in some embodiments, includes returning the serviced data message to the load balancer to track the state of the connection using the service logical forwarding element. To use the service logical forwarding element, some embodiments configure an egress data path of the service nodes to intercept the serviced data message before being forwarded to a logical forwarding element in the datapath from the client to the service node, and determine if the serviced data message requires routing by the routing service provided as a service by the edge forwarding element. If the data message requires routing by the routing service (e.g., for serviced data messages), the serviced data message is forwarded to the edge forwarding element over the service logical forwarding element. In some embodiments, the serviced data message is provided to the edge forwarding element along with the VIP associated with the service, in other embodiments, the edge forwarding element determines the VIP based on a port used to send the data message over the service logical forwarding element. The VIP is used by the edge forwarding element to identify the load balancer associated with the serviced data message. The serviced data message is then forwarded to the load balancer for the load balancer to maintain state information for the connection to which the data message belongs and modify the data message to identify the VIP as the source address for forwarding to the client.

The transport mechanisms, in some embodiments, include a tunneling mechanism (e.g. a virtual private network (VPN), internet protocol security (IPSec), etc.) that connects the edge forwarding element to at least one service node through a corresponding set of virtual tunnel interfaces (VTIs). In addition to the VTIs used to connect the edge forwarding element to the service nodes, the edge forwarding element uses other VTIs to connect to other network elements for which it provides forwarding operations. At least one VTI used to connect the edge forwarding element to other (i.e., non-service node) network elements is identified to perform a service classification operation and is configured to perform the service classification operation for data messages received at the VTI for forwarding. The VTIs connecting the edge forwarding element to the service nodes, in some embodiments, are not configured to perform a service classification operation and are instead configured to mark data messages returned to the edge forwarding element as having been serviced. In other embodiments, VTIs connecting the edge forwarding element to the service nodes are configured to perform limited service classification operations using a single default rule that is applied at the VTI that marks data messages returned to the edge forwarding element as having been serviced.

For traffic exiting a logical network through a particular VTI, some embodiments perform a service classification operation for different data messages to identify different VTIs that connect the edge forwarding element to a service node to provide services required by the data messages. Each data message, in some embodiments, is then forwarded to the identified VTI to receive the required service (e.g., from the service node connected to the edge forwarding element through the VTI). The identified VTI does not perform a service classification operation and merely allows the data message to reach the service node. The service node then returns the serviced data message to the edge forwarding element. In some embodiments, the VTI is not configured to perform the service classification operation and is instead configured to mark all traffic directed to the edge forwarding element from the service node as having been serviced. The marked serviced data message is then received at the edge forwarding element and is forwarded to a destination of the data message through the particular VTI. In some embodiments, the particular VTI does not perform additional service insertion operations because the data message is marked as having been serviced.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
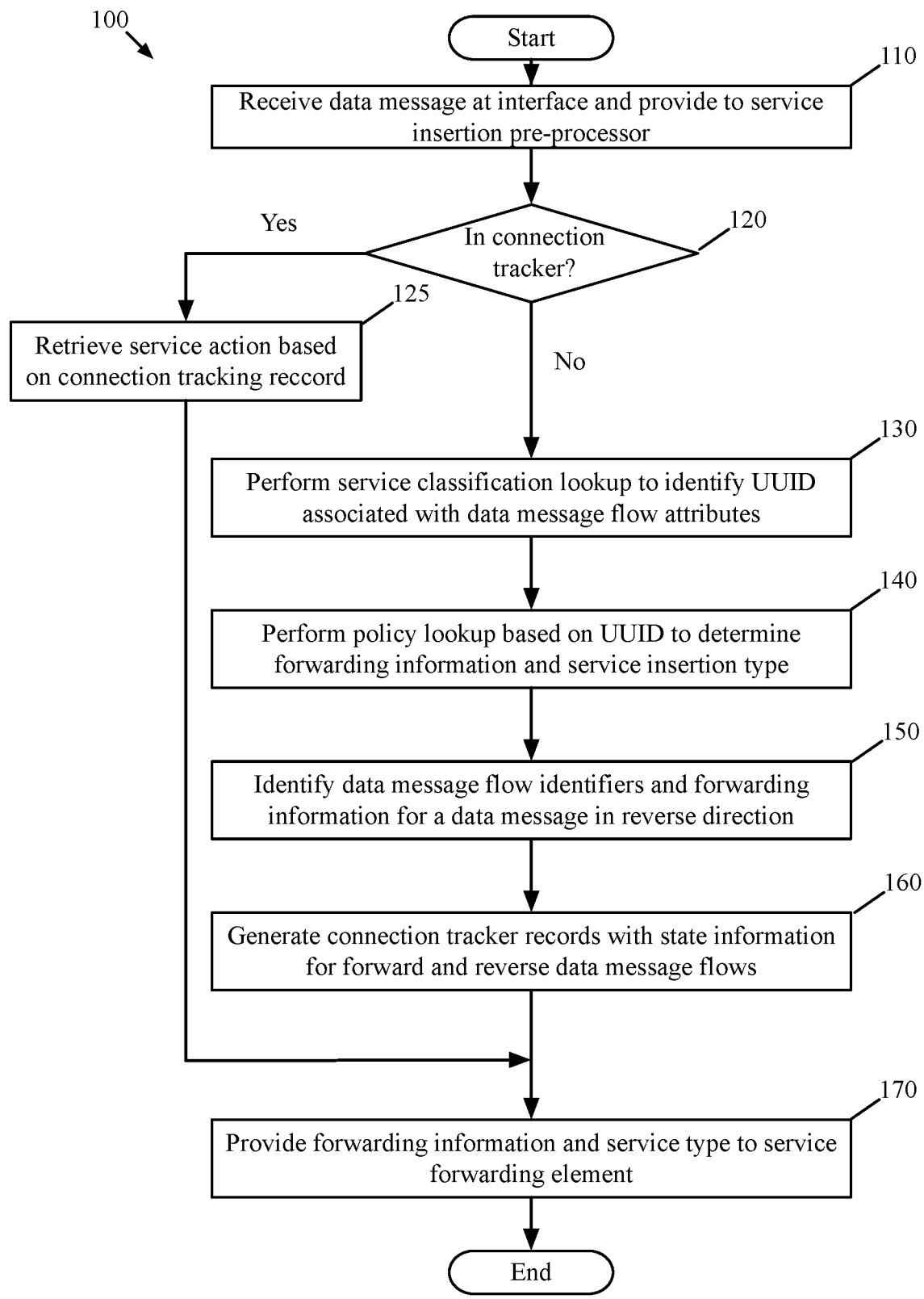
FIG. 1 conceptually illustrates a process performed by the edge device to perform the service classification operation to select a set of services of a particular type for the data message and identify forwarding information for the data message.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some virtualized computing environments/logical networks provide edge forwarding elements that sit between an external network and internal networks (e.g., logical networks). The virtualized computing environment, in some embodiments, provides additional edge forwarding elements (or edge services) for subnetworks within the virtualized computing environment. For example, different logical networks, each with their own edge device may be implemented within a datacenter (e.g., by a provider network) that provides an edge forwarding element between an external network and the networks internal to the datacenter. Each logical network (e.g., tenant network, or provider network) includes at least one edge forwarding elements, in some embodiments, that executes in either an edge host or as an edge compute node to provide the logical network with access to an external network and vice versa. In some embodiments, the edge forwarding elements provide a set of services (e.g., middlebox services) for traffic processed by the edge forwarding elements.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Also, in this example, each logical forwarding element is a distributed forwarding element that is implemented by configuring multiple software forwarding elements (SFEs) (i.e., managed forwarding elements) on multiple host computers. To do this, each SFE or a module associated with the SFE in some embodiments is configured to encapsulate the data messages of the LFE with an overlay network header that contains a virtual network identifier (VNI) associated with the overlay network. As such, the LFEs are said to be overlay network constructs that span multiple host computers in the discussion below.

The LFEs also span in some embodiments configured hardware forwarding elements (e.g., top of rack switches). In some embodiments, each LFE is a logical switch that is implemented by configuring multiple software switches (called virtual switches or vswitches) or related modules on multiple host computers. In other embodiments, the LFEs can be other types of forwarding elements (e.g., logical routers), or any combination of forwarding elements (e.g., logical switches and/or logical routers) that form logical networks or portions thereof. Many examples of LFEs, logical switches, logical routers and logical networks exist today, including those provided by VMware's NSX network and service virtualization platform.

Some embodiments provide novel methods for providing different types of services for a logical network associated with an edge forwarding element executed by an edge device acting between the logical network and an external network. The edge device receives data messages for forwarding and performs a service classification operation to select a set of services of a particular type for the data message. FIG. 1 conceptually illustrates a process 100 performed by the edge device to perform the service classification operation to select a set of services of a particular type for the data message and identify forwarding information for the data message.

In some embodiments, the process is performed as part of an edge datapath that, for data messages coming in to the network precedes a routing operation. The process, in some embodiments, is performed by a network interface card (NIC) that is designed or programmed to perform the service classification operation. In some embodiments, process 100 is additionally, or alternatively, performed by the edge device as part of logical processing at multiple virtual interfaces of a logical edge forwarding element including a set of virtual tunnel interfaces (VTIs) used to connect the edge forwarding element to compute nodes outside of the datacenter. In some embodiments, particular interfaces are configured to perform the service classification operation (e.g., by toggling a service classification tag to "1") while other interfaces are not configured to perform a service classification operation (e.g., if the service classification tag is set to "0"). In some embodiments, a centralized (e.g. service) router calls a set of service insertion and service transport layer modules (such as modules in element 735 of FIG. 7) as part of a processing pipeline.

Process 100 begins by receiving (at 110) a data message at an interface (e.g., the NIC, a VTI) connected to an external network (e.g., a router outside of a datacenter implementing the logical network). The data message, in some embodiments, is received from the external network as part of a communication between a client in the external network and a compute node (e.g. a server, or service node) in the logical network (or vice versa). In some embodiments, the data message is a data message between two compute nodes in the external network that receives services at the edge of logical network.

Figure 2:
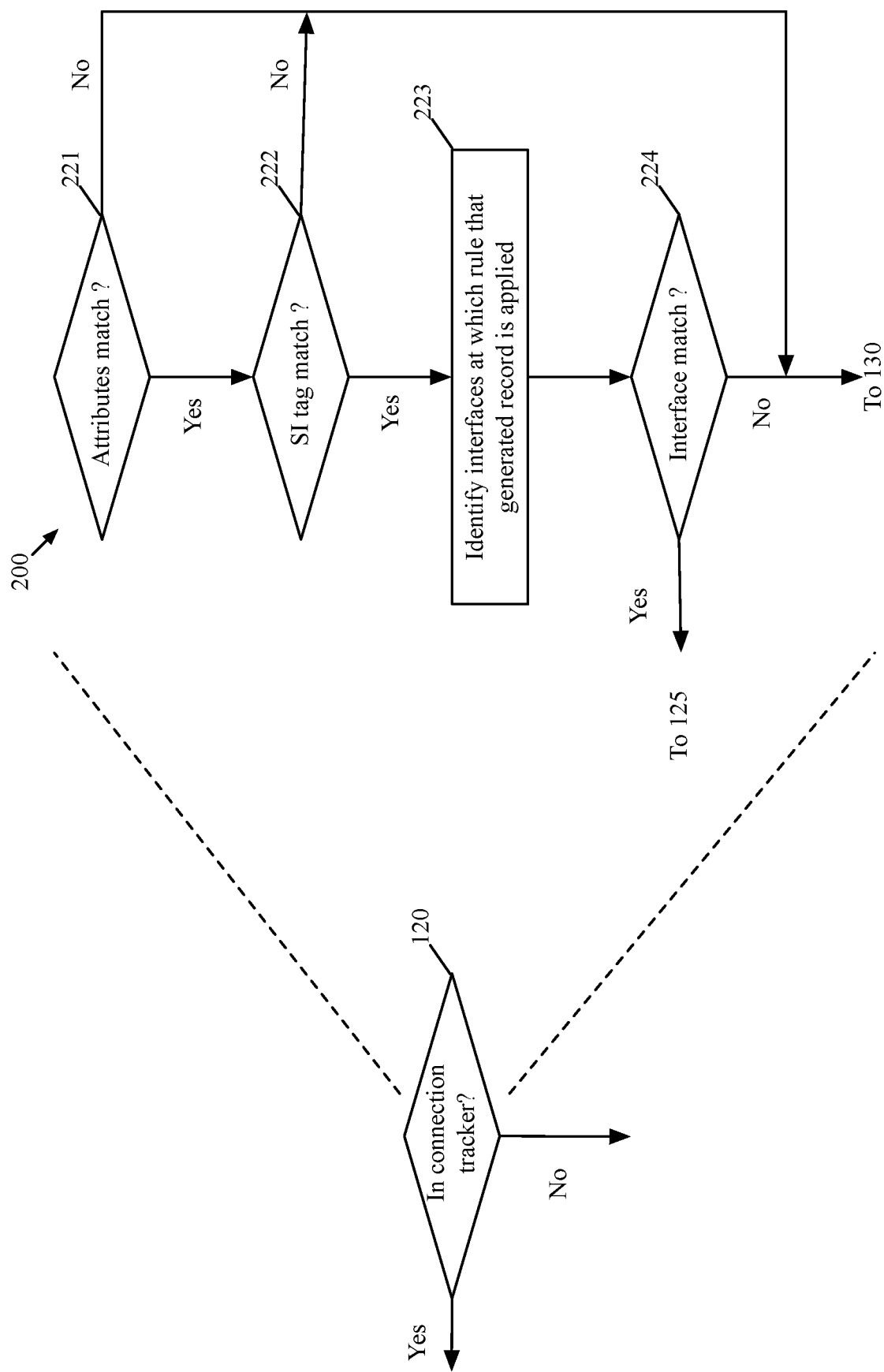
FIG. 2 conceptually illustrates a process for identifying whether a connection tracker record is stored in the connection tracker storage used in some embodiments.

The process 100 continues by determining (at 120) if a connection tracker record is stored in a connection tracker for the data message flow to which the data message belongs. FIG. 2 conceptually illustrates a process 200 for identifying whether a connection tracker record is stored in the connection tracker storage used in some embodiments. The determination (at 120) includes determining (at 221) whether the connection tracker storage stores any records (i.e., entries in the connection tracker storage) with a flow identifier that matches the flow identifier of the received data message. The flow identifier, in some embodiments, is a set of header values (e.g., a five-tuple), or a value generated based on a set of header values (e.g., a hash of a set of header values). If no matching entries are found, the process 200 determines that no connection tracker record is stored for the data message and the process 200 produces a "no" at operation 120 of process 100. In some embodiments, the connection tracker storage stores multiple possible matching entries distinguished by the tag indicating the type of stateful operation that created the connection tracker record (e.g., a preliminary firewall operation or a service classification operation). In other embodiments, separate connection tracker storages are maintained for the different types of stateful operations. The connection tracker records created by service classification operations, in some embodiments, include a rule identifier associated with a service insertion rule that (1) was applied to a first data message in a data message flow and (2) determines the content of the connection tracker record.

If at least one matching connection tracker record is found in the connection tracker storage the process 200 determines (at 222) if a tag (e.g., a flag bit) identifying whether the record was created as part of a service classification operation or as part of a different stateful processing (e.g., an independent firewall operation). In some embodiments, the tag is compared to a value stored in a buffer associated with the data message that is used during the logical processing to store data beyond that which is normally included in a data message (e.g., context data, interface on which the data message was received, etc.). If the tag of the record(s) with a matching flow identifier does not indicate that it is relevant to a service classification operation, the process 200 produces a "no" at operation 120 of process 100.

However, if at least one record includes both a matching flow identifier (at 221) and a matching service classification operation tag (at 222), the process identifies (at 223) interfaces at which a service insertion rule that was used to generate each potentially matching record is applied (i.e., interfaces in the "applied_to" field of the rule that was hit by a first data message of the potentially matching record). In some embodiments, a rule identifier is stored in the connection tracker record and the rule identifier is associated with (e.g., points to) a data storage (e.g., a container) that stores a list of interfaces at which it is applied. In such embodiments, identifying the interfaces at which a rule that was used to generate each potentially matching record is applied includes identifying the interfaces stored in the data storage associated with the rule.

The process 200 then determines (at 224) if any interfaces at which a rule is applied is the interface at which the current data message was received. In some embodiments, data messages of a same data message flow are received at different interfaces based on a load balancing operation (e.g., equal cost multipathing (ECMP)) performed by a forwarding element (e.g., a router) in an external network. Additionally, some data messages are necessarily received at multiple interfaces at which different service rules are applied as part of a processing pipeline. For example, a data message that is received at a first VTI at which a particular service rule applies identifies a second VTI to which to redirect the data message for providing a service required by the data message. The second VTI is connected to a service node that provides the required service and, after the data message is serviced, the data message is returned to the second VTI. The flow identifier matches the connection tracker record for the original data message, but, the service insertion rule identified in the connection tracker record is not applied to data messages received at the second VTI (e.g., the applied_to field of the service insertion rule does not include the second VTI) such that the data message is not redirected to the second VTI to be serviced again.

In some embodiments, the interface is identified by a UUID (e.g., a 64-bit or 128-bit identifier) that is too large to store in the connection tracker record. The UUIDs (or other identifiers) of interfaces identified (at 223) are compared to the UUID of the interface on which the data message was received which, as described above, is stored in a buffer associated with the data message in some embodiments. If no interfaces at which a rule (of a potentially matching connection tracker record) is applied match the interface at which the data message was received, the process 200 produces a "no" at operation 120 of process 100. If, however, a connection tracker record is associated with the interface at which the data message was received (i.e., a rule that was used to generate the connection tracker record is applied at the interface at which the data message was received), the process 200 produces a "yes" at operation 120 of process 100). In some embodiments, a further state value associated with service node state is checked as will be discussed in relation to FIG. 13.

If the process 100 determines (at 120) that the data message belongs to a flow that has a connection tracker record, the process 100 retrieves (at 125) a service action based on the information in the connection tracker record. The service action, in some embodiments, includes a service type and a set of forwarding information stored in the connection tracker record. Additional details of retrieving the service action are described in relation to FIGS. 12 and 13. The service type, in some embodiments, identifies the transport mechanism (e.g., logical service forwarding element, L3 VPN, or L2 bump-in-the-wire). The forwarding information, in some embodiments, includes different types of forwarding information for different types of service insertion types. For example, the forwarding information for services provided by a service chain includes a service path identifier and a next hop MAC address. Forwarding information for a bump-in-the-wire service node or a service node connected through a virtual private network include a next hop IP. The service type and forwarding information is then provided (at 170) to the edge forwarding element (e.g., a virtual routing and forwarding (VRF) context of the edge forwarding element) and the process ends. In some embodiments, the service type and forwarding information are provided (at 170) to a transport layer module that redirects the data message to a service node using a transport mechanism identified by the service type to a destination identified by the forwarding information as described in relation to FIG. 3.

If the process 100 determines (at 120) that no connection tracker storage entry exists for the received data message for any of the reasons identified in process 200, the process 100 performs (at 130) a first service classification lookup for a set of service insertion rules to find a highest priority rule that is defined for data messages with a set of attributes shared by the received data message. The set of data message attributes, in some embodiments, in a particular service insertion rule may include any of: header values at layer 2, layer 3, or layer 4, or a hash value based on any of the header values, and may include wildcard values for certain attributes (e.g., fields) that allow for any value of the attribute. The service insertion rule, in the embodiment described in relation to process 100, identifies a universally unique identifier (UUID) that is associated with a set of actions for data messages matching the service insertion rule. In other embodiments, service insertion rules include a set of actions (e.g., redirect to a particular address using a particular transport mechanism) to perform for the received data message. In some embodiments, a lowest-priority (e.g., default) rule that applies to all data messages (e.g., that specifies all wildcard values) is included in the set of service insertion rules and will be identified if no other service insertion rule with higher priority is identified. The default rule, in some embodiments, will specify a no-op that causes the data message to be provided to the routing function of the edge forwarding element to be routed without any services being performed on the data message. In other embodiments, the default rule will cause the data message to be provided to the routing function along with an indication that the data message does not require further service classification operations.

After identifying (at 130) the UUID associated with the service insertion rule (and data message), the process 100 performs (at 140) a policy lookup based on the UUID identified (at 130) based on the service insertion rule. In some embodiments, the separation of service insertion rule lookup and UUID (policy) lookup is used to simplify the updating of policies for multiple service insertion rules by changing a policy associated with a single UUID rather than having to update each service insertion rule. The UUID lookup is used to identify a set of forwarding information and to identify a particular service type (e.g., a service using a particular transport mechanism). For example, for different data messages, the UUID lookups may identify any one of a next hop IP address (for a tunneling mechanism), a dummy next hop IP address (for a bump-in-the-wire mechanism), or a set of forwarding data including at least a service path ID, a service index, and a next hop layer 2 (e.g., MAC) address (for a mechanism using a service logical forwarding element). In some embodiments, the type of transport mechanism is inferred from the type of forwarding information identified for the data message. Some embodiments using a service logical forwarding element identify the next hop using a layer 3 (e.g., IP) address. In such embodiments, it may be necessary to include a service type identifier.

In using the UUID to identify a set of forwarding information and to identify a particular service type, some embodiments perform a load balancing operation to select among multiple next hops to provide an identified service. In some embodiments, the identified next hops are service nodes that provide different services. The service nodes, in some embodiments, include at least one of service virtual machines and service appliances. The load balancing operation, in some embodiments, are based on any of: a round robin mechanism, a load-based selection operation (e.g., selecting a service node with a lowest current load), or a distance-based selection operation (e.g., selecting a closest service node as measured by a selected metric).

After the service action and forwarding information are determined (at 140), data message flow identifiers and forwarding information are identified (at 150) for a reverse direction flow. Data message flow identifiers for reverse direction flows are, in many cases, are based on a same set of header values as a forward direction data message flow with source and destination addresses switched. Forwarding information for reverse data message flows for certain types of service insertion (i.e., particular types of transport mechanisms) is different for forward direction flows and reverse direction flows. For some types of service insertion (i.e., transport mechanisms), the forwarding information for a reverse direction flow identifies a next hop for the reverse direction flow that is a last hop for the forward direction flow. For other types of service insertion (e.g., a tunneling mechanism) the reverse direction forwarding information identifies the same next hop (e.g., the next hop IP address of the tunnel endpoint). In some embodiments, operation 150 is skipped as a connection tracker record for the reverse direction is not necessary. For example, some rules specify that they only apply to data messages in a particular direction.

Based on the data message flow identifiers and forwarding information identified for the forward and reverse direction flows, a set of connection tracker records is generated (at 160) for the forward and reverse direction data message flows with the state information (e.g., data message identifiers and forwarding information) for the forward and reverse direction data message flows respectively. In some embodiments, generating the connection tracker records includes querying a flow programming table for a state value stored in the flow programming table that reflects a current state version of a set of service node types associated with the service type identified for the data message. In some embodiments, a flow ID for forward and reverse direction data message flows are the same except for a directionality bit that indicates whether it is a forward or reverse direction data message.

The reverse flow identifier, in some embodiments, is different from a reverse flow identifier that would be generated based on the data message received in the forward direction. For example, a naïve reverse direction identifier generation operation would switch the source and destination IP (L3) and MAC (L2) addresses and generate the identifier based on the switched header values, but if the service node performs a NAT operation, a data message received in the reverse direction would generate a reverse flow identifier based on the translated address and not based on the original (forward direction) data message header addresses. In some embodiments, the return data message with a different set of flow identifiers (e.g., header values, etc.) will be considered a new flow and a new connection tracker record for forward and reverse directions of the data message flow associated with the reverse direction data message flow of the original data message.

Additional details about the connection tracker records and flow programming table are discussed below in relation to FIG. 14. In some embodiments, after creating the connection tracker records for the forward and reverse direction data message flows, the data message along with the forwarding information and service type are provided (at 170) to the component of the edge forwarding element responsible for providing the data message to the service nodes, to be processed by the component of the edge forwarding element as described below in relation to FIG. 3.

Figure 3:
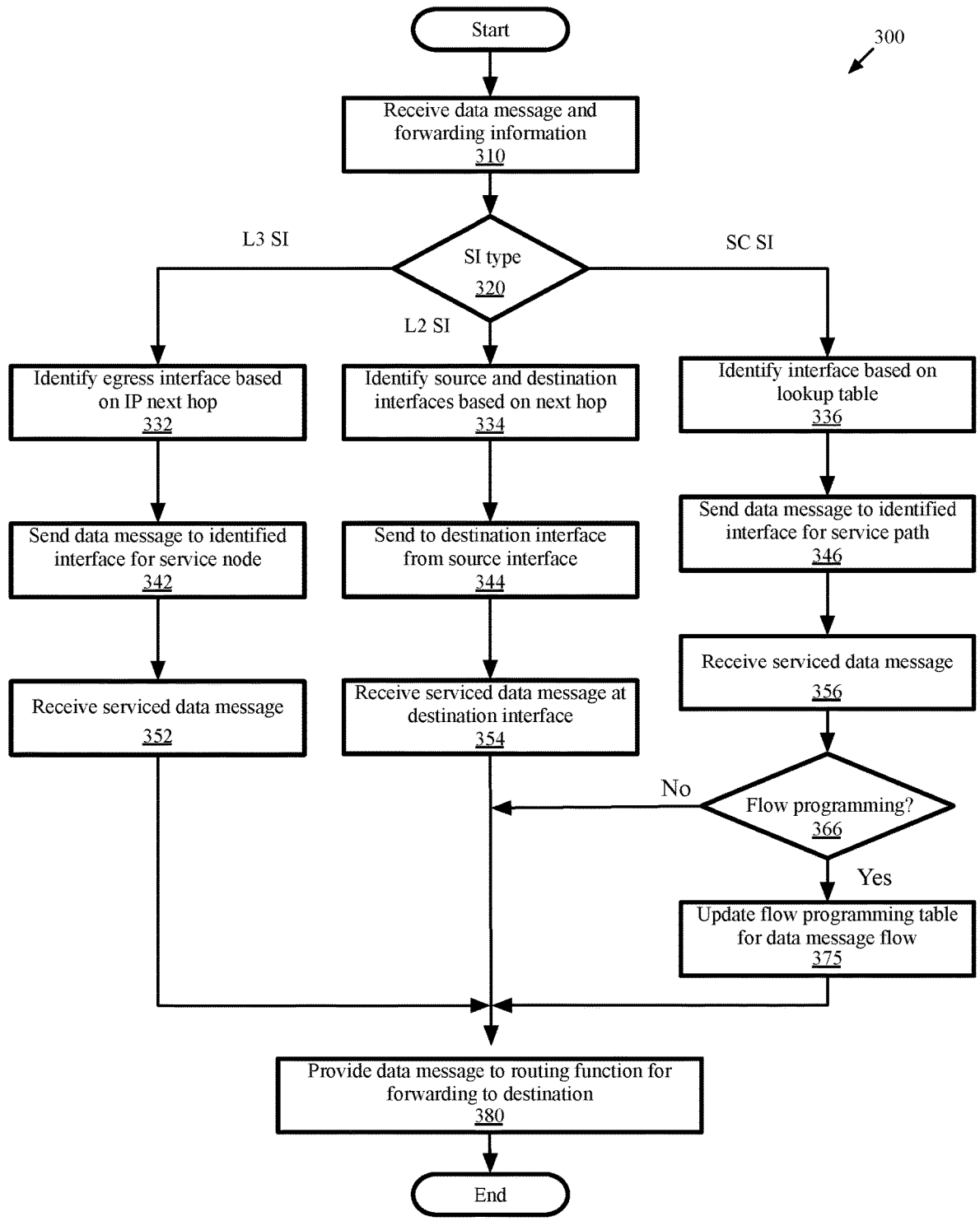
FIG. 3 conceptually illustrates a process for forwarding data messages at the edge forwarding component that was provided the service type and forwarding information by the process of FIG. 1.

FIG. 3 conceptually illustrates a process 300 for forwarding data messages at the edge forwarding component that was provided the service type and forwarding information by process 100. Process 300, in some embodiments, is performed by an edge forwarding element executing on the edge device. The edge forwarding element, in some embodiments, is executed as a virtual machine while in other embodiments the edge forwarding element is a managed forwarding element (e.g., a virtual routing and forwarding context) executing on the edge device. In some embodiments, some operations of the process are performed by service insertion layer and service transport layer modules (e.g., elements 720-729 of FIG. 7) called by a service (e.g., centralized) router (e.g., 730). Process 300 begins by receiving (at 310) a data message along with service type and forwarding information for the data message determined using, in some embodiments, the service classification operation of process 100.

The process 300 determines (at 320) a service insertion type associated with the received data message. In some embodiments, the determination is made based on the service type information received from the service classification operation. In other embodiments, the determination is made implicitly based on the type of forwarding information received from the service classification operation. For example, an IP address provided as forwarding information for a particular data message that is for a virtual tunnel interface (VTI) indicates that the transport mechanism is a tunneling mechanism. Alternatively, a dummy IP address provided as the forwarding information indicates that the transport mechanism is a layer 2, bump-in-the-wire mechanism. If the forwarding information includes a service path identifier and a next hop MAC address, the transport mechanism is understood to be a logical service forwarding plane for a service chain.

If the process 300 determines (at 320) that the service type uses a tunneling transport mechanism, the process 300 identifies (at 332) an egress interface based on an IP address provided by the service classification operation. In some embodiments, the egress interface is identified by a routing function associated with a service transport layer module. Based on the identified egress interface, the data message is provided (at 342) to the VTI which encapsulates the data message for delivery over a virtual private network (VPN) tunnel to a service node to provide the service. In some embodiments, the tunnel uses an internet protocol security (IPsec) protocol to tunnel the data message to the service node. In some embodiments using a secure VPN (e.g., IPsec), the data message is encrypted before being encapsulated for forwarding using the tunneling mechanism. In some embodiments, the encryption and encapsulation is performed as part of a datapath of the virtual tunnel interface used to connect to the service node (e.g., referred to as an L3 service node below).

The encapsulated (and encrypted) data message is then sent to the L3 service node over the VPN for the L3 service node to provide the service and return the serviced data message to the edge forwarding element. After the service node provides the service, the serviced data message is received (at 352) at the edge forwarding element (e.g., the service transport layer module), and the data message is provided (at 380) to a routing function (e.g., the routing function implemented by the edge forwarding element) for forwarding to the destination. In some embodiments, the routing is based on an original destination IP address associated with the data message that is maintained in a memory buffer of the edge device associated with the data message that, in some embodiments, stores additional metadata such as the interface on which the data message was received and for data associated with features of the edge forwarding element such as IP fragmentation, IPsec, access control lists (ACL), etc.

If the process 300 determines (at 320) that the service type uses a layer 2, bump-in-the-wire transport mechanism, the process 300 identifies (at 334) source and destination interfaces based on a set of next hop dummy IP addresses provided by the service classification operation. The next hop dummy IP addresses are used to identify source and destination layer 2 (e.g., MAC) addresses associated with a bump-in-the-wire service node (i.e., a service node that does not change the source and destination layer 2 (e.g., MAC) addresses of the data message). In some embodiments, the set of next hop dummy IP addresses include a set of source and destination dummy IP addresses that are resolved into source and destination layer 2 (e.g., MAC) addresses associated with different interfaces of the edge forwarding element. In some embodiments, the different interfaces are identified by a routing function associated with a service transport layer module. The different interfaces are used, in some embodiments, to differentiate data messages traversing the edge device (e.g., the edge forwarding element) in different directions (e.g., north to south traffic vs. south to north traffic) such that data messages going in one direction (e.g., from within the logical network to the external network) use a first interface as the source and a second interface as a destination, and data messages going in the opposite direction (e.g., from the external network to the logical network) use the second interface as a source and the first interface as a destination.

The data message is then sent (at 344) to the destination interface from the source interface using the identified source and destination layer 2 addresses. After the data message is sent (at 344) to the service node using the identified interfaces, the edge forwarding element receives (at 354) the serviced data message from the service node at the destination interface. The serviced data message is then provided (at 380) to a routing function (e.g., the routing function implemented by the edge forwarding element) for forwarding to the destination. In some embodiments, the routing is based on an original destination IP address associated with the data message that is maintained throughout the processing of the data message. In other embodiments, the original destination IP address is maintained in a memory buffer of the edge device associated with the data message that, in some embodiments, stores additional metadata such as the interface on which the data message was received and for data associated with features of the edge forwarding element such as IP fragmentation, IPsec, access control lists (ACL), etc.

If the process 300 determines (at 320) that the service type uses a service logical forwarding element transport mechanism, the process 300 identifies (at 336) an interface associated with the service logical forwarding element based on a table that stores associations between logical forwarding elements (e.g., an edge forwarding element implemented as a virtual routing forwarding (VRF) context) and interfaces of the logical forwarding elements that connect to a service logical forwarding plane. In some embodiments the table is a global table supplied by a network management or control compute node and includes information for all logical forwarding elements in the logical network that connect to any of a set of service logical forwarding elements. In some embodiments, an interface associated with the logical service forwarding element is identified based on the forwarding information (e.g., based on a service path identifier or service virtual network identifier provided as part of the forwarding information).

The data message is then sent (at 346) to the identified interface (or a logical service plane data message processor) along with service path information and service metadata (SMD) to be encapsulated with a logical network identifier (LNI) for delivery to a first service node in the service path identified in the service path information. In some embodiments, the service path information provided as part of the forwarding information includes (1) a service path identifier (SPI) that is used by the logical forwarding element and each service node to identify a next hop service node, (2) a service index (SI) indicating the location of the hop in the service path, and, in some embodiments, (3) a time to live. In some embodiments, the LNI is a service virtual network identifier (SVNI). Additional details of the use of service forwarding planes can be found in U.S. patent application Ser. No. 16/444,826 filed on Jun. 18, 2019, now issued as U.S. Pat. No. 11,042,397, which is hereby incorporated by reference.

After being serviced by the service nodes in the service path, the data message is received (at 356) at the edge forwarding element. In some embodiments, the edge forwarding element receives the data message as a routing service node that is identified as a last hop in the service path identified for the data message. In such embodiments, the service router implements a service proxy to receive the data message in accordance with a standard protocol for service chaining using service paths. The edge forwarding element, in some embodiments, receives the serviced data message along with service metadata that identifies the original source and destination addresses to be used to forward the data message to its destination. In some embodiments, the service metadata also includes any flow programming instructions sent by service nodes or service insertion proxies on the service path. The flow programming instructions, in some embodiments, include instructions for modifying how the service classification operation selects service chains, service paths, and/or forwards data message flows along service paths. In other embodiments, this flow programming involves other modifications to how a data message flow is processed by the service plane. Flow programming will be further described below.

The process 300 then determines (at 366) whether the received serviced data message includes flow programming instructions. If the process 300 determines that flow programming instructions are included with the serviced data message, a flow programming table is updated (at 375) by adding the flow programming instructions to the table to be used in processing subsequent data messages in the data message flow. In some embodiments, the flow programming instructions identify the flow that the flow programming instruction relates to and a new service action (e.g., a pf_value) for the identified flow. A new service action, in some embodiments, is an instruction to skip a particular service node (e.g., a firewall service node) for a next data message, or for all subsequent data messages in a data message flow (e.g., if the firewall service node determines that the data message flow is allowed), or to drop all subsequent data messages of the data message flow (e.g., if the firewall service node determines that the data message flow is not allowed).

In some embodiments, the connection tracker record for the flow identified in the flow programming instruction is updated during the processing of the next data message in the data message flow. For example, each time a flow programming instruction is added to the flow programming table, in some embodiments, a flow programming version value (e.g., flow_program_gen) is updated (e.g., incremented) to indicate that a flow programming instruction has been received and that state information generated using a previous flow programming version value may be out of date. Upon identifying a connection tracker record for a particular data message, if the flow programming version value is not equal to the current value, the flow programming table is consulted to see if the connection tracker record must be updated based on a flow programming instruction contained in the flow programming table. The use of the flow programming version value is discussed in more detail in relation to FIG. 13 below.

If the process 300 determines (at 366) that there are no flow programming instructions or after updating the flow programming table, the data message is then provided (at 380) to a routing function (e.g., the routing function implemented by the edge forwarding element) for forwarding to the destination. In some embodiments, the original set of data message headers are carried through the service path in service metadata. In other embodiments, the original set of header values are stored in a buffer at the edge device and are restored after the data message is received from the last hop in the service path. One of ordinary skill in the art will appreciate that operations 366 and 375, in some embodiments, are performed in parallel with operation 380 as they do not depend on each other.

The service classification operations are provided, in some embodiments, in a virtualized networking environment. The virtualized networking environment, in some embodiments, is comparable to the virtualized networking environment described in U.S. Pat. No. 9,787,605, which is hereby incorporated by reference. A basic introduction to the virtualized networking environment is presented here, with additional details provided in the above-referenced Patent.

Figure 4:
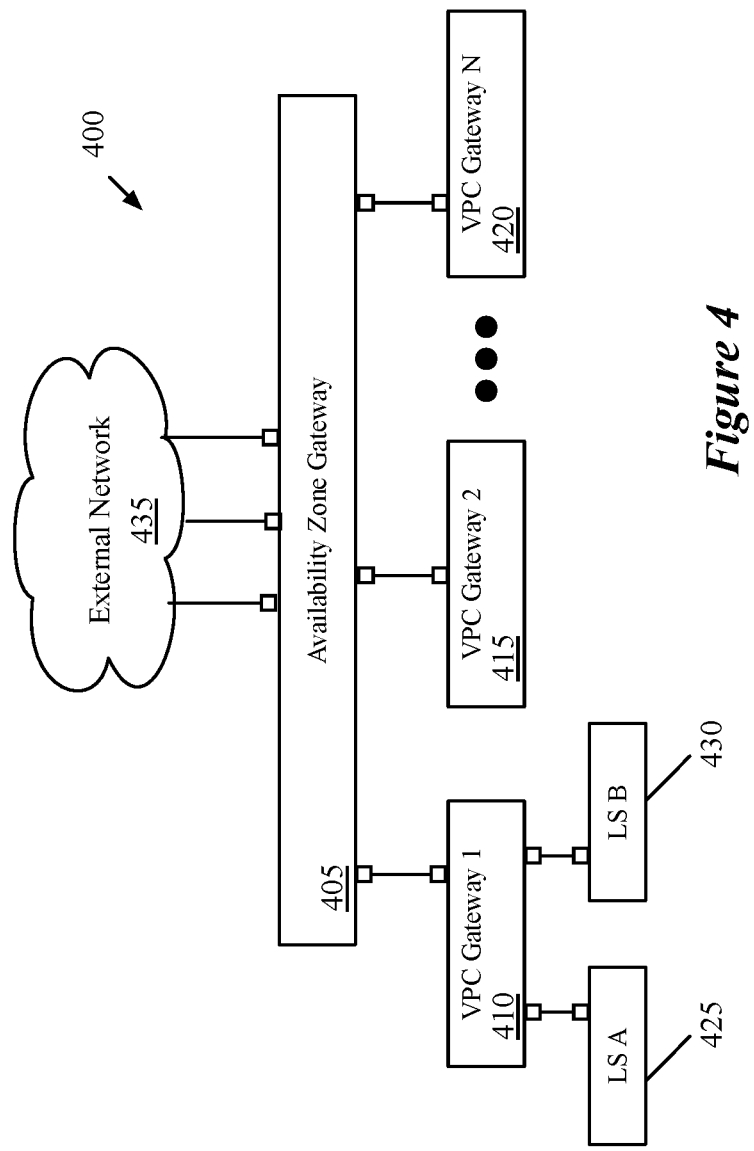
FIG. 4 conceptually illustrates a logical network with two tiers of logical routers, an availability zone logical gateway router.

FIG. 4 conceptually illustrates a logical network 400 with two tiers of logical routers. As shown, the logical network 400 includes, at the layer 3 level, an availability zone logical gateway router (AZG) 405, several virtual private cloud logical gateway routers (VPCGs) 410-420 for logical networks implemented in the availability zone. AZG 405 and VPCGs 410-420 are sometimes referred to as tier 0 (T0) and tier 1 (T1) routers respectively to reflect the hierarchical relationship between the AZG and VPCGs. The first virtual private cloud gateway 410 has two logical switches 425 and 430 attached, with one or more data compute nodes coupling to each of the logical switches. For simplicity, only the logical switches attached to the first VPCG 410 are shown, although the other VPCGs 415-420 would typically have logical switches attached (to which data compute nodes couple). The availability zone, in some embodiments, is a datacenter In some embodiments, any number of VPCGs may be attached to an AZG such as the AZG 405. Some datacenters may have only a single AZG to which all VPCGs implemented in the datacenter attach, whereas other datacenters may have numerous AZGs. For instance, a large datacenter may want to use different AZG policies for different VPCs, or may have too many different VPCs to attach all of the VPCGs to a single AZG. Part of the routing table for an AZG includes routes for all of the logical switch domains of its VPCGs, so attaching numerous VPCGs to an AZG creates several routes for each VPCG just based on the subnets attached to the VPCG. The AZG 405, as shown in the figure, provides a connection to the external physical network 435; some embodiments only allow the AZG to provide such a connection, so that the datacenter (e.g., availability zone) provider can manage this connection. Each of the separate VPCGs 410-420, though part of the logical network 400, are configured independently (although a single tenant could have multiple VPCGs if they so choose).

Figure 5:
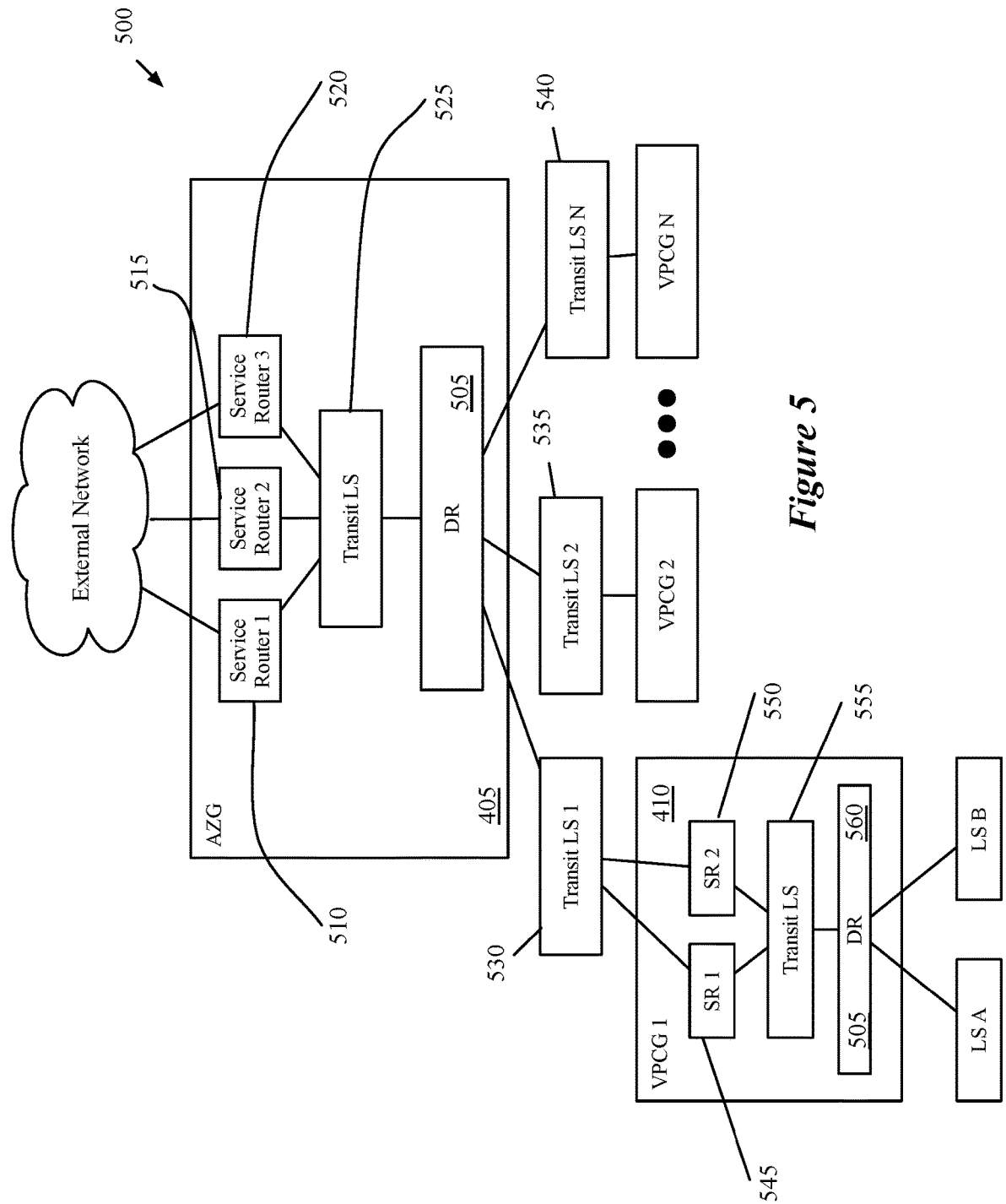
FIG. 5 illustrates one possible management plane view of the logical network in which both the AZG and VPCG include a centralized component.

FIG. 5 illustrates one possible management plane view of the logical network 400 in which both the AZG 405 and VPCG 410 include a centralized component. In this example, the routing aspects of the AZG 405 and VPCG 410 are distributed using a DR. However, because the configuration of the AZG 405 and VPCG 410 include the provision of stateful services, the management plane view of the AZG and VPCG (and thus the physical implementation) includes active and standby service routers (SRs) 510-520 and 545-550 for these stateful services.

FIG. 5 illustrates the management plane view 500 for the logical topology 400 when the VPCG 410 has a centralized component (e.g., because stateful services that cannot be distributed are defined for the VPCG). In some embodiments, stateful services such as firewalls, NAT, load balancing, etc. are only provided in a centralized manner. Other embodiments allow for some or all of such services to be distributed, however. Only details of the first VPCG 410 are shown for simplicity; the other VPCGs may have the same defined components (DR, transit LS, and two SRs) or have only a DR if no stateful services requiring an SR are provided). The AZG 405 includes a DR 505 and three SRs 510-520, connected together by a transit logical switch 525. In addition to the transit logical switch 525 within the AZG 405 implementation, the management plane also defines separate transit logical switches 530-540 between each of the VPCGs and the DR 505 of the AZG. In the case in which a VPCG is completely distributed, the transit logical switch 530 connects to a DR that implements the configuration of the VPCG. Thus, as is described in U.S. Pat. No. 9,787,605, a packet sent to a destination in the external network by a data compute node attached to the logical switch 425 will be processed through the pipelines of the logical switch 425, the DR of the VPCG, the transit logical switch 530, the DR 505 of the AZG 405, the transit logical switch 525, and one of the SRs 510-520. In some embodiments, the existence and definition of the transit logical switches 525 and 530-540 are hidden from the user that configures the network through the API (e.g., an administrator), with the possible exception of troubleshooting purposes.

The partially centralized implementation of the VPCG 410, illustrated in FIG. 5, includes a DR 560 to which the logical switches 425 and 430 attach, as well as two SRs 545 and 550. As in the AZG implementation, the DR and the two SRs each have interfaces to a transit logical switch 555. This transit logical switch serves the same purposes as the switch 525, in some embodiments. For VPCGs, some embodiments implement the SRs in active-standby manner, with one of the SRs designated as active and the other designated as standby. Thus, so long as the active SR is operational, packets sent by a data compute node attached to one of the logical switches 425 and 430 will be sent to the active SR rather than the standby SR.

The above figure illustrates the management plane view of logical routers of some embodiments. In some embodiments, an administrator or other user provides the logical topology (as well as other configuration information) through an API. This data is provided to a management plane, which defines the implementation of the logical network topology (e.g., by defining the DRs, SRs, transit logical switches, etc.). In addition, in some embodiments a user associates each logical router (e.g., each AZG or VPCG) with a set of physical machines (e.g., a pre-defined group of machines in the datacenter) for deployment. For purely distributed routers, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. Described herein, an uplink is a northbound interface of a logical router in the logical topology. For a VPCG, its uplinks connect to an AZG (all of the uplinks connect to the same AZG, generally). For an AZG, its uplinks connect to external routers. Some embodiments require all of the uplinks of an AZG to have the same external router connectivity, while other embodiments allow the uplinks to connect to different sets of external routers. Once the user selects a group of machines for the logical router, if SRs are required for the logical router, the management plane assigns each of the uplinks of the logical router to a physical machine in the selected group of machines. The management plane then creates an SR on each of the machines to which an uplink is assigned. Some embodiments allow multiple uplinks to be assigned to the same machine, in which case the SR on the machine has multiple northbound interfaces.

As mentioned above, in some embodiments the SR may be implemented as a virtual machine or other container, or as a VRF context (e.g., in the case of DPDK-based SR implementations). In some embodiments, the choice for the implementation of an SR may be based on the services chosen for the logical router and which type of SR best provides those services.

In addition, the management plane of some embodiments creates the transit logical switches. For each transit logical switch, the management plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous VPCGs (e.g., the network topology 400), each of which may have its own transit logical switch. That is, in FIG. 5, transit logical switch 525 within the AZG implementation, transit logical switches 530-540 between the AZG and the VPCGs, and transit logical switch 520 (as well as the transit logical switch within the implementation of any of the other VPCGs) each require a unique subnet. Furthermore, in some embodiments, the SR may need to initiate a connection to a VM in logical space, e.g. HA proxy. To ensure that return traffic works, some embodiments avoid using link local IP addresses.

Some embodiments place various restrictions on the connection of logical routers in a multi-tier configuration. For instance, while some embodiments allow any number of tiers of logical routers (e.g., an AZG tier that connects to the external network, along with numerous tiers of VPCGs), other embodiments only allow a two-tier topology (one tier of VPCGs that connect to the AZG). In addition, some embodiments allow each VPCG to connect to only one AZG, and each logical switch created by a user (i.e., not a transit logical switch) is only allowed to connect to one AZG or one VPCG. Some embodiments also add the restriction that southbound ports of a logical router must each be in different subnets. Thus, two logical switches may not have the same subnet if connecting to the same logical router. Lastly, some embodiments require that different uplinks of an AZG must be present on different gateway machines. It should be understood that some embodiments include none of these requirements, or may include various different combinations of the requirements.

Figure 6:
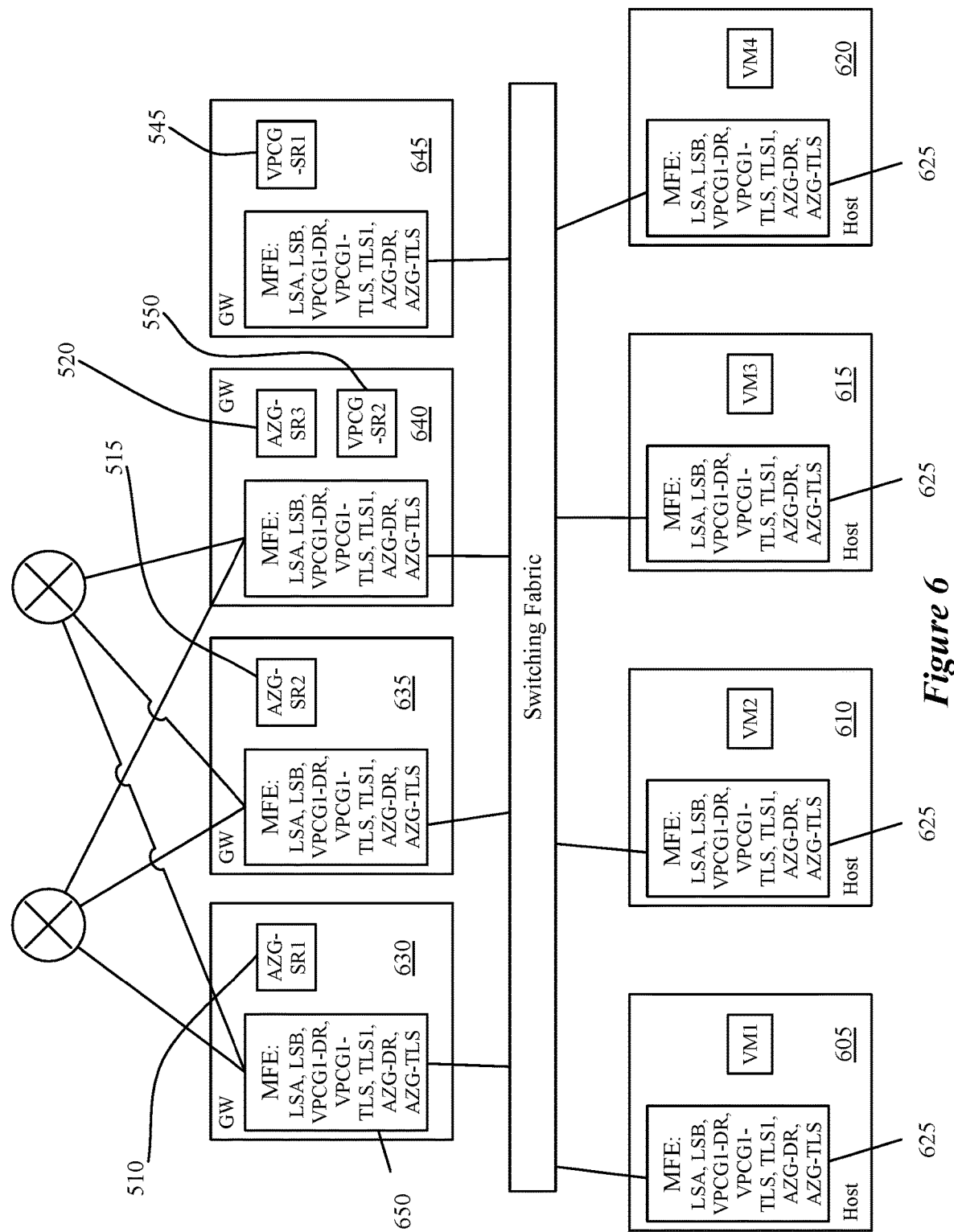
FIG. 6 conceptually illustrates a physical implementation of the management plane constructs for a two-tiered logical network shown in FIG. 5, in which the VPCG and the AZG both include SRs as well as a DR.

FIG. 6 conceptually illustrates a physical implementation of the management plane constructs for a two-tiered logical network shown in FIG. 5, in which the VPCG 410 and the AZG 405 both include SRs as well as a DR. It should be understood that this figure only shows the implementation of the VPCG 410, and not the numerous other VPCGs, which might be implemented on numerous other host machines, and the SRs of which might be implemented on other gateway machines.

This figure assumes that there are two VMs attached to each of the two logical switches 425 and 430, which reside on the four physical host machines 605-620. Each of these host machines includes a managed forwarding element (MFE) 625. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case, they execute a pipeline for each logical forwarding element that may be required to process a packet.

Thus, as shown in FIG. 6, the MFEs 625 on the physical host machines include configuration to implement both logical switches 425 and 430 (LSA and LSB), the DR 560 and transit logical switch 555 for the VPCG 410, and the DR 505 and transit logical switch 525 for the AZG 405. Some embodiments, however, only implement the distributed components of the AZG on the host machine MFEs 625 (those that couple to the data compute nodes) when the VPCG for a data compute node residing on the host machine does not have a centralized component (i.e., SRs). As discussed below, northbound packets sent from the VMs to the external network will be processed by their local (first-hop) MFE, until a transit logical switch pipeline specifies to send the packet to a SR. If that first SR is part of the VPCG, then the first-hop MFE will not perform any AZG processing, and therefore the AZG pipeline configuration need not be pushed to those MFEs by the centralized controller(s). However, because of the possibility that one of the VPCGs 415-420 may not have a centralized component, some embodiments always push the distributed aspects of the AZG (the DR and the transit LS) to all of the MFEs. Other embodiments only push the configuration for the AZG pipelines to the MFEs that are also receiving configuration for the fully distributed VPCGs (those without any SRs).

In addition, the physical implementation shown in FIG. 6 includes four physical gateway machines 630-645 (also called edge nodes, in some embodiments) to which the SRs of the AZG 405 and the VPCG 410 are assigned. In this case, the administrators that configured the AZG 405 and the VPCG 410 selected the same group of physical gateway machines for the SRs, and the management plane assigned one of the SRs for both of these logical routers to the third gateway machine 640. As shown, the three SRs 510-520 for the AZG 405 are each assigned to different gateway machines 630-640, while the two SRs 545 and 550 for the VPCG 410 are also each assigned to different gateway machines 640 and 645.

This figure shows the SRs as separate from the MFEs 650 that operate on the gateway machines. As indicated above, different embodiments may implement the SRs differently. Some embodiments implement the SRs as VMs (e.g., when the MFE is a virtual switch integrated into the virtualization software of the gateway machine), in which case the SR processing is performed outside of the MFE. On the other hand, some embodiments implement the SRs as VRFs within the MFE datapath (when the MFE uses DPDK for the datapath processing). In either case, the MFE treats the SR as part of the datapath, but in the case of the SR being a VM (or other data compute node), sends the packet to the separate SR for processing by the SR pipeline (which may include the performance of various services). As with the MFEs 625 on the host machines, the MFEs 650 of some embodiments are configured to perform all of the distributed processing components of the logical network.

Figure 7:
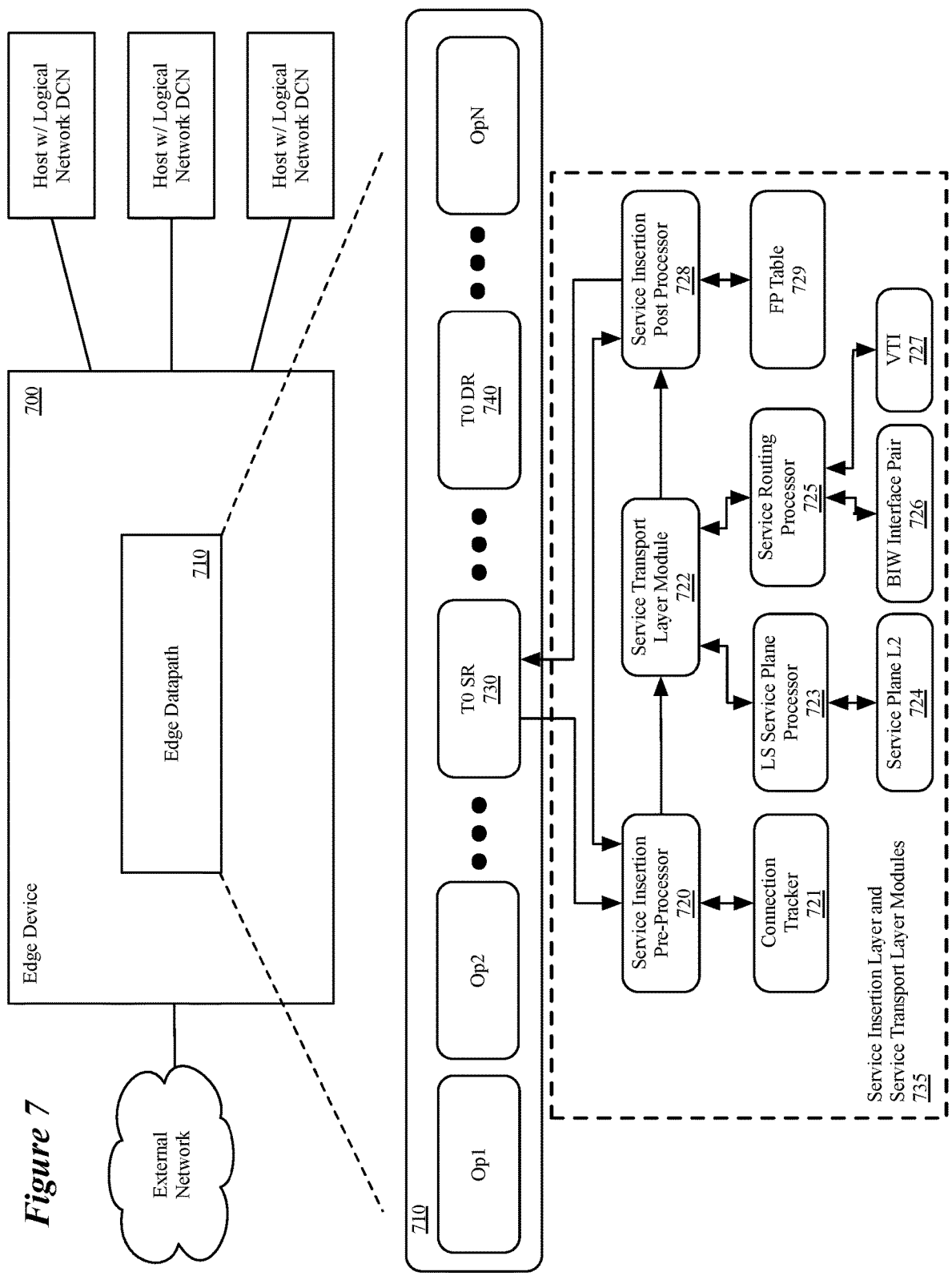
FIG. 7 illustrates logical processing operations for availability zone (T0) logical router components that are included in an edge datapath executed by an edge device for data messages.
Figure 10:
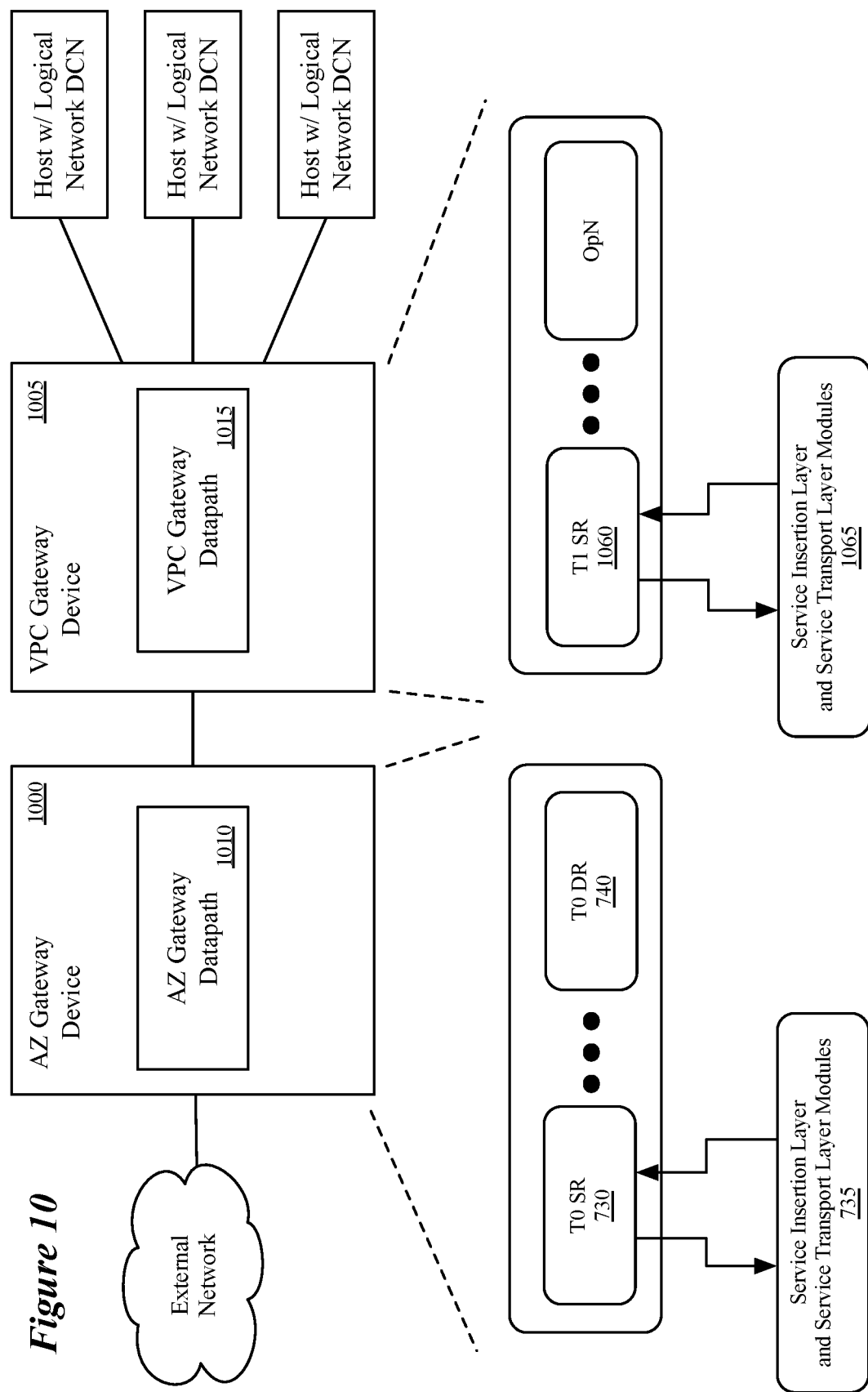
FIG. 10 illustrates a second embodiment including two edge devices and executing an availability zone gateway datapath and virtual private cloud gateway datapath respectively.

FIGS. 7 and 10 illustrate a set of logical processing operations related to availability zone (T0) and VPC (T1) logical routers. FIG. 7 illustrates logical processing operations for availability zone (T0) logical router components that are included in edge datapath 710 executed by an edge device 700 for data messages. In some embodiments, edge datapath 710 is executed by an edge forwarding element of edge device 700. Edge datapath 710 includes logical processing stages for a plurality of operations including an availability zone (T0) service (e.g., centralized) router 730 and an availability zone (T0) distributed router 740. As shown, the T0 SR 730 calls a set of service insertion layer and service transport layer modules 735 to perform service classification operations (or service insertion (SI) classification operations). In some embodiments, edge datapath 710 includes logical processing operations for VPC (T1) service and distributed routers. As for the availability zone (T0) SR, the VPC (T1) SR, in some embodiments, calls a set of service insertion layer and service transport layer modules to perform service classification operations.

Service insertion layer and service transport layer modules 735 include a service insertion pre-processor 720, a connection tracker 721, a service layer transport module 722, a logical switch service plane processor 723, a service plane layer 2 interface 724, a service routing function 725, bump-in-the-wire (BIW) pair interfaces 726, a virtual tunnel interface 727, a service insertion post-processor 728, and a flow programming table 729. Service insertion pre-processor 720, in some embodiments, performs the process 100 to determine service type and forwarding information for a received data message. Service transport layer module 722, in some embodiments, performs the process 300 to direct the data message to the appropriate service nodes to have required services performed and to return the data message to the T0 SR 730 for routing to a destination of the data message.

The function of the modules of the service insertion layer and service transport layer 735 are described in more detail in relation to FIGS. 11, 12, 18, and 19 below. In some embodiments, the service insertion pre-processor 720 is called for data messages received on each of a set of interfaces of the edge forwarding element that is not connected to a service node. The service insertion (SI) pre-processor 720 applies service classification rules (e.g., service insertion rules) defined for application at the T0 SR 730 (e.g., defined by a provider or by a tenant having multiple VPCGs behind a single AZG). Each service classification rule, in some embodiments, is defined in terms of flow identifiers that identify a data message flow that require a service insertion operation (e.g., servicing by a set of service nodes). The flow identifiers, in some embodiments, include a set of data message attributes (e.g., any one of, or combination of, a set of header values (e.g., a 5-tuple) that define a data message flow), a set of contextual data associated with the data message, or a value derived from the set of header values or contextual data (e.g., a hash of a set of header values or of an application identifier for an application associated with the data message).

In some embodiments, interfaces connected to service nodes are configured to mark data messages being returned to the edge forwarding element as serviced so that they are not provided to the SI pre-processor 720 again. After the service classification operations are performed by the SI pre-processor 720 the result of the classification operation is passed to the service transport layer module 722 to be used to forward the data message to a set of service nodes that provides a required set of services.

After the service node(s) process the data message the serviced data message is returned to the service transport layer module 722 for post-processing at SI post-processor 728 before being returned to the T0 SR 730 for routing. The T0 SR 730 routes the data message and provides the data message to the T0 DR 740. In some embodiments the T0 SR 730 is connected to the T0 DR 740 through a transit logical switch (not shown) as described above in relation to FIGS. 5 and 6. The T0 SR 730 and T0 DR 740 perform logical routing operations to forward the incoming data message to the correct virtual private cloud gateway and ultimately to the destination compute node. The logical routing operations, in some embodiments, include identifying egress logical ports of the logical router used to forward the data message to a next hop based on a destination IP address of the data message.

In some embodiments, edge datapath 710 also includes logical processing stages for T1 SR and T1 DR operations as well as the T0 SR 730 and T0 DR 740. Some embodiments insert a second service classification operation performed by a set of service insertion layer and service transport layer modules called by a T1 SR. The SI pre-processor called by the VPCG applies service classification rules (e.g., service insertion rules) defined for the VPCG (e.g., service insertion rules for a particular VPC logical network behind the VPCG). The VPCG-specific service classification rules, in some embodiments, are included in a same set of rules as the AZG-specific service classification rules and are distinguished by a logical forwarding element identifier. In other embodiments, the VPCG-specific service classification rules are stored in a separate service classification rule storage or database used by the SI pre-processor called by the VPCG.

The SI pre-processor called by the VPCG performs the same operations as the SI pre-processor 720 to identify data messages that require a set of services and the forwarding information and service type for the identified data messages. As for SI pre-processor 720, the SI pre-processor performs the service classification operations and after the services are provided, the data message is returned to the logical processing stage for the T1 SR. The T1 SR routes the data message and provides the data message to the T1 DR. In some embodiments, the T1 SR is connected to the T1 DR through a transit logical switch (not shown) as described above in relation to FIGS. 5 and 6. The T1 SR and T1 DR perform logical routing operations to forward the incoming data message to the destination compute node through a set of logical switches as described in relation to FIGS. 5 and 6. The logical routing operations, in some embodiments, include identifying egress logical ports of the logical router used to forward the data message to a next hop based on a destination IP address of the data message. Multiple T1 SRs and DRs may be identified by the T0 DR 740 and the above discussion applies, in some embodiments, to each T1 SR/DR in the logical network. Accordingly, one of ordinary skill in the art will understand that edge device 700, in some embodiments, performs edge processing for multiple tenants each of which shares a same set of AZG processing stages but has its own VPCG processing stages.

For outgoing messages the edge datapath is similar but, in some embodiments, will include T1 and T0 DR components only if the source compute node is executing on the edge device 700 or the T1 SR executes on the edge device 700 respectively. Otherwise the host of the source node (or the edge device that executes the T1 SR) will perform the logical routing associated with the T1/T0 DR. Additionally, for outgoing data messages, data messages are logically routed by SRs (e.g., T0 SR 730) before calling the service insertion layer and service transport layer modules. The function of the service insertion layer and service transport layer modules is similar to the forward direction (e.g., the incoming data messages discussed above) and will be discussed in more detail below. For data messages requiring services, the serviced data message is returned to the SR (e.g., T0 SR 730) to be sent over the interface identified by the logical routing processing.

Figure 8:
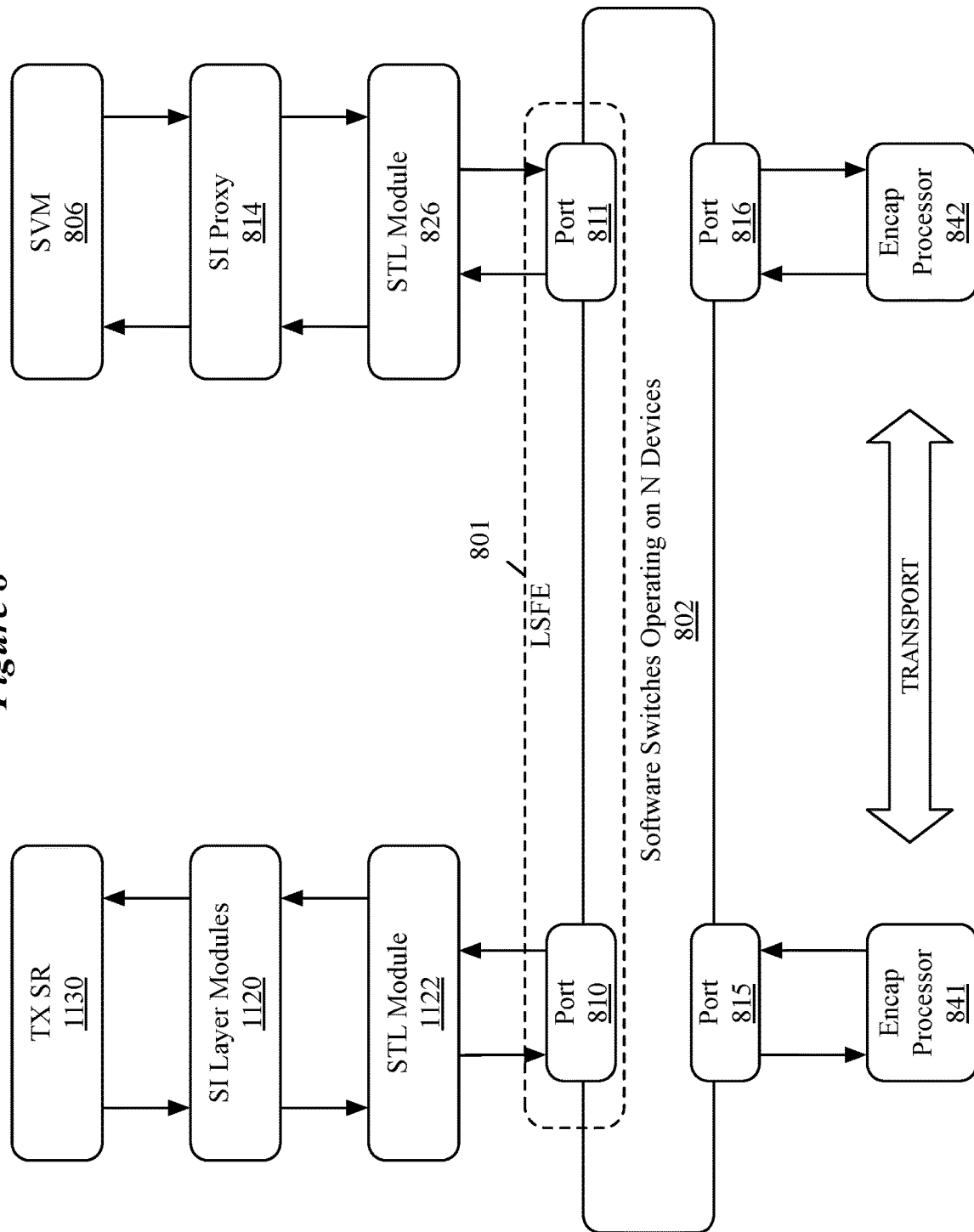
FIG. 8 illustrates a TX SR acting as a source for traffic on a logical service forwarding element.

FIG. 8 illustrates a TX SR 1130 acting as a source for traffic on a logical service forwarding element 801 (e.g., a logical service switch). The logical service forwarding element (LSFE) is implemented by a set of N software switches 802 executing on N devices. The N devices includes a set of devices on which service nodes (e.g., service virtual machine 806) execute. The TX SR 1130, through the SIL and STL modules 1120 and 1122 respectively, sends a data message that requires servicing by the SVM 806. The SI layer modules 1120 identifies the forwarding information necessary to send the data message over the LSFE to the SVM 806 as was discussed above in relation to FIG. 1 and will be discussed below in relation to FIGS. 11 and 12. The forwarding information and the data message is then provided to the STL module 1122 to be processed for delivery to the SVM 806 over the LSFE using port 810. Because the SVM 806 executes on a separate device, the data message sent out of software switch port 815 is encapsulated by encapsulation processor 841 for transport across an intervening network.

The encapsulated data message is then unencapsulated by encapsulation processor 842 and provided to port 816 for delivery to the SVM 806 through its STL module 826 and SI proxy 814. A return data message traverses the modules in the reverse order. The operations of STL module 826 and SI proxy 814 are discussed in more detail in U.S. patent application Ser. No. 16/444,826.

Figure 9:
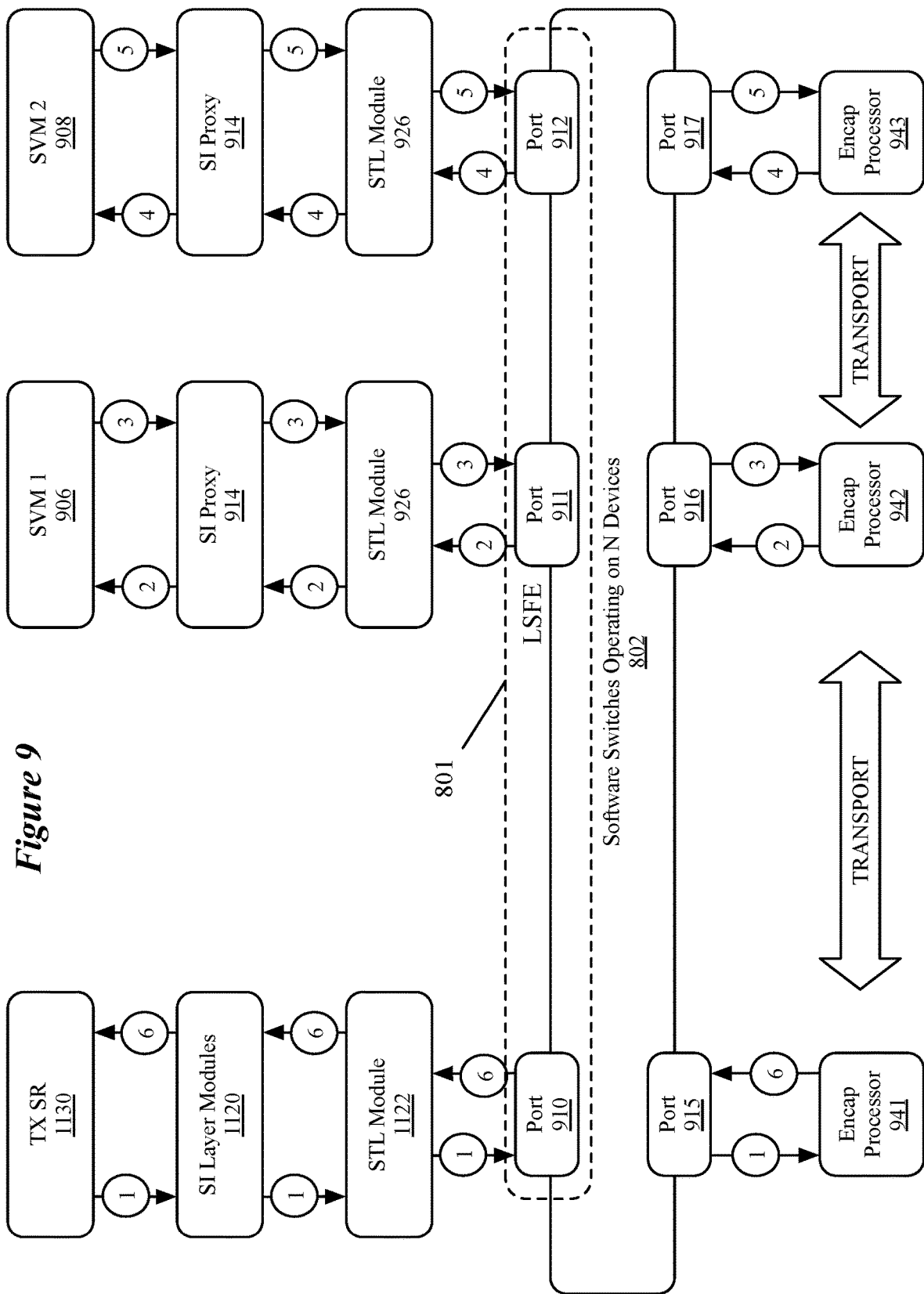
FIG. 9 illustrates a service path including two service nodes accessed by the TX SR through a LSFE.

FIG. 9 illustrates a service path including two service nodes 906 and 908 accessed by the TX SR 1130 through LSFE 801. As shown, TX SR 1130 sends a first data message as described in relation to FIG. 8. The data message is received by SVM 1 906 which provides a first service in a service path and forwards the data message to the next hop in the service path, in this case SVM 2 908. SVM2 908 receives the data message, provides a second service and forwards the data message to the TX SR 1130 which in some embodiments is identified as a next hop in the service path. In other embodiments, the TX SR 1130 is identified as the source to which to return the serviced data message after the last hop (e.g., SVM 2 908) has provided its service. As for FIG. 8, additional details of the processing at each module is explained in more detail in U.S. patent application Ser. No. 16/444,826.

FIG. 10 illustrates a second embodiment including two edge devices 1000 and 1005 executing an AZ gateway datapath 1010 and VPC gateway datapath 1015 respectively. The functions of similarly numbered elements that appear in FIGS. 7 and 10 are equivalent. The difference between FIGS. 7 and 10 is that in FIG. 10 the VPC edge datapath (T1 SR 1060 and service insertion layer and service transport layer modules 1065) is executed in edge device 1005 instead of edge device 1000. As discussed above, distributed routers, in some embodiments, are performed at whichever device performs the immediately previous processing step.

Figure 11:
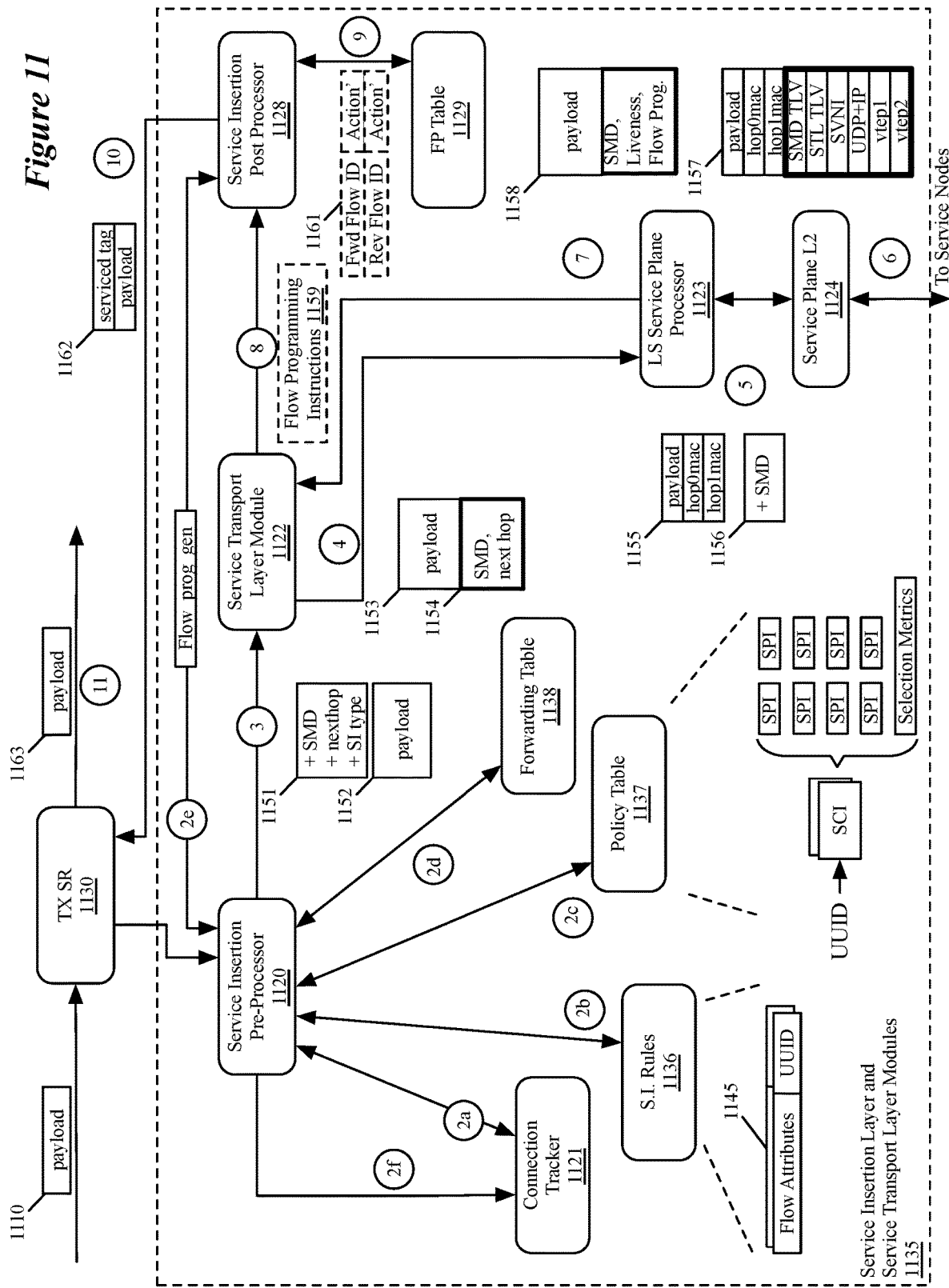
FIG. 11 illustrates a set of operations performed by a set of service insertion layer and service transport layer modules called by a service router at either T0 or T1 for a first data message in a data message flow that requires services from a set of service nodes that define a service path.

An edge forwarding element is configured, in some embodiments, to provide services using the service logical forwarding element as a transport mechanism as described in relation to FIG. 11. The edge forwarding element is configured to connect different sets of virtual interfaces of the edge forwarding element to different network elements of the logical network using different transport mechanisms. For example, a first set of virtual interfaces is configured to connect to a set of forwarding elements internal to the logical network using a set of logical forwarding elements connecting source and destination machines of traffic for the logical network. Traffic received on the first set of interfaces is forwarded to a next hop towards the destination by the edge forwarding element without being returned to the forwarding element from which it was received, in some embodiments. A second set of virtual interfaces is configured to connect to a set of service nodes to provide services for data messages received at the edge forwarding element.

Each connection made for the second set of virtual interfaces may use different transport mechanisms such as a service logical forwarding element, a tunneling mechanism, and a bump-in-the-wire mechanism, and in some embodiments, some or all of the transport mechanisms are used to provide data messages to the service nodes as discussed below in relation to FIGS. 11, 12, 18 and 19. Each virtual interface in a third set of virtual interfaces (e.g., a subset of the second set) is configured to connect to a logical service forwarding element connecting the edge forwarding element to at least one internal forwarding element in the set of internal forwarding elements as described below in relation to FIGS. 30-32A-B. The virtual interfaces are configured to be used (1) to receive data messages from the at least one internal forwarding element to be provided a service by at least one service node in the set of service nodes and (2) to return the serviced data message to the internal forwarding element network.

The transport mechanisms, in some embodiments, include a logical service forwarding element that connects the edge forwarding element to a set of service nodes that each provide a service in the set of services. In selecting the set of services, the service classification operation of some embodiments identifies a chain of multiple service operations that has to be performed on the data message. The service classification operation, in some embodiments, includes selecting, for the identified chain of services, a service path to provide the multiple services. After selecting the service path, the data message is sent along the selected service path to have the services provided. Once the services have been provided the data message is returned to the edge forwarding element by a last service node in the service path that performs the last service operation and the edge forwarding element performs a forwarding operation to forward the data message as will be discussed further in relation to FIGS. 11 and 12.

FIG. 11 illustrates a set of operations performed by a set of service insertion layer and service transport layer modules 1135 called by a service router at either T0 or T1 (e.g., TX SR 1130) for a first data message 1110 in a data message flow that requires services from a set of service nodes that define a service path. FIG. 11 is illustrated for TX SR 1130, and service insertion layer (SIL) and service transport layer (STL) modules 1135. TX SR 1130 and SIL and STL modules 1135 represent the function of a centralized service router and SIL and STL modules at either of T0 and T1, in some embodiments. T0 and T1 datapaths, in some embodiments, share a same set of SIL and STL modules, while in others separate SIL and STL modules are used by T0 and T1 datapaths. SIL and STL modules 1135 include a service insertion pre-processor 1120, a connection tracker 1121, a service layer transport module 1122, a logical switch service plane processor 1123, a service plane layer 2 interface 1124, a service insertion post-processor 1128, and a flow programming table 1129.

Data message 1110 is received at the edge device and provided to the edge TX SR 1130. In some embodiments, the TX SR 1130 receives the data message at an uplink interface or at a virtual tunnel interface of the TX SR 1130. In some embodiments, the SI Pre-processor 1120 is called at different processing operations for an uplink interface and a virtual tunnel interface (VTI). In some embodiments, the calls for data messages received at an uplink interface and a virtual tunnel interface are implemented by different components of the edge device. For example, the SI pre-processor 1120 is called for data messages received at the uplink interface, in some embodiments, by a NIC driver as part of a standard data message pipeline, while the SI pre-processor 1120 is called for data messages received at a VTI is called after (before) a decapsulation and decryption (encryption and encapsulation) operation as part of a separate VTI processing pipeline. In some embodiments implementing the SI pre-processor 1120 differently for uplinks and VTIs, a same connection tracker is used to maintain a consistent state for each data message even if it traverses a VTI and an uplink.

The SI pre-processor 1120 performs a set of operations similar to the operations of process 100. The SI pre-processor 1120 performs a lookup in connection tracker storage 1121 to determine if a connection tracker record exists for the data message flow to which the data message belongs. As discussed above, the determination is based on a flow identifier including, or derived from, flow attributes (e.g., header values, contextual data, or values derived from the header values and, alternatively or conjunctively, the contextual data). In the illustrated example, the data message 1110 is a first data message in a data message flow and no connection tracker record is identified for the data message flow to which data message 1110 belongs. The connection tracker storage lookup is equivalent to operation 120 of process 100, and if an up-to-date connection tracker record had been found, the SI pre-processor 1120 would have forwarded the information in the identified connection tracker record to the LR-SR as in operations 120, 125, and 170 of process 100.

Since, in this example, no connection tracker record is found, SI pre-processor 1120 performs a lookup in a service insertion rule storage 1136 to determine if any service insertion (service classification) rules apply to the data message. In some embodiments, the SI rules for different interfaces are stored in the SI rule storage 1136 as separate rule sets that are queried based on an incoming interface identifier (e.g., an incoming interface UUID stored as metadata in a buffer of the edge device). In other embodiments, the SI rules for different interfaces are stored as a single rule set with potential matching rules examined to see if they apply to the interface on which the data message was received. As will be discussed below, the SI rule set(s) are received from a controller that generates the rule sets based on policies defined at a network manager (by an administrator or by the system). The SI rules 1145 in the SI rule storage 1136, in some embodiments, are specified in terms of flow attributes that identify data message flows to which the rule applies and a service action. In the illustrated example, the service action is a redirection to a UUID that is used to identify the service type and forwarding information.

Assuming that the lookup in the SI rule storage 1136 results in identifying a service insertion rule that applies to the data message 1110, the process uses the UUID identified from the service applicable insertion rule to query a policy table 1137. In some embodiments, the UUID is used to simplify the management of service insertion such that each individual rule specifying a same service node set does not need to be updated if a particular service node in the service node set fails and instead the set of service nodes associated with the UUID can be updated, or a selection (e.g., load balancing) operation can be updated for the UUID. The current example illustrates a UUID that identifies a service chain identifier associated with multiple service paths identified by multiple service path identifiers (SPIs) and a set of selection metrics. The selection metrics can be selection metrics for a load balancing operation that is any of: a round robin mechanism, a load-based selection operation (e.g., selecting a service node with a lowest current load), or a distance-based selection operation (e.g., selecting a closest service node as measured by a selected metric). The set of service paths, in some embodiments, is a subset of all the possible service paths for the service chain. In some embodiments, the subset is selected by a controller that assigns different service paths to different edge devices. The assignment of service paths to different edge devices, in some embodiments, provides a first level of load balancing over the service nodes.

Once a service path is selected, the SI pre-processor 1120 identifies forwarding information associated with the selected service path by performing a lookup in forwarding table 1138. The forwarding table 1138 stores forwarding information for the service path (e.g., a MAC address for a first hop in the service path). In some embodiments, the forwarding information includes a service index that indicates a service path length (i.e., the number of service nodes included in the service path). In some embodiments, the forwarding information also includes a time to live (TTL) value that indicates the number of service nodes in the service path. The next hop MAC address, service index, and TTL values, in other embodiments, are stored with the SPI in the policy table 1137 and the forwarding table 1138 is unnecessary.

In some embodiments, selecting a service path for a forward direction data message flow includes selecting a corresponding service path for a reverse direction data message flow. In such embodiments, forwarding information for each direction is determined at this point. The service path for the reverse direction data message flow, in some embodiments, includes the same service nodes as the service path for the forward direction data message flow but traverses the service nodes in the opposite order. In some embodiments, the service path for the reverse direction data message flow traverses the service nodes in the opposite order when at least one service node modifies the data message. The service path for the reverse direction data message flow, for some data message flows, is the same service path as for the forward direction flow. In some embodiments, the SR is made available as a service node to provide an L3 routing service and is identified as a last hop for each service path. The SR L3 routing service node, in some embodiments, is also a first hop for each service path to ensure that traversing the service path in the opposite order will end at the SR, and the SR performs the first hop processing of the service path as a service node.

Once the service path has been selected and the forwarding information has been identified, connection tracker records are created for the forward and reverse direction flows and are provided to the connection tracker storage 1121. In some embodiments, a service insertion post-processor 1128 is queried for a state value (e.g., a flow programming version value "flow_prog_gen") that indicates a current state of a set of service nodes (e.g., a set of service nodes associated with the identified service type). As discussed below, the connection tracker records includes the forwarding information (e.g., the SPI, the service index, a next hop MAC address, and a service insertion rule identifier for the service insertion rule that was identified as matching the attributes of data message 1110) used to process subsequent data messages in the forward and reverse data message flows. In some embodiments, the connection tracker record also includes the flow programming version value to indicate a current flow programming version value at the time the connection tracker record is created for comparison to then-current values for subsequent data messages in the data message flow for which the record is created.

The data message 1152 along with the forwarding information 1151 are then provided to the STL module 1122. The forwarding information, in this example, for a data message requiring services provided by a service chain includes service metadata (SMD) that includes, in some embodiments include any or all of a service chain identifier (SCI), a SPI, a service index, a TTL value, and a direction value. The forwarding information, in some embodiments, also includes a MAC address for a next hop and a service insertion type identifier to identify the data message as using a logical service forwarding element transport mechanism.

The STL module 1122, as shown, provides the data message 1153 along with an encapsulating header 1154 that includes, in some embodiments, the SMD and liveness attributes that indicate that the L3 routing service node is still operational to a layer 2 service plane processor 1123 that prepares the data message for sending to the service plane L2 interface 1124 based on the information included in the encapsulating header 1154. In some embodiments, instead of an encapsulating header, the forwarding information is sent or stored as separate metadata that includes, in some embodiments, the SMD and liveness attributes that indicate that the L3 routing service node is still operational. The logical switch service plane processor 1123 functions similarly to a port proxy described in U.S. patent application Ser. No. 16/444,826 filed on Jun. 18, 2019. As shown, the logical switch service plane processor 1123 removes the header 1154 and records the SMD and next hop information. The data message is then provided to service plane L2 interface 1124 (e.g., a software switch port associated with the logical service forwarding element).

The data message is then encapsulated for delivery to a first service node in the service path by an interface (e.g., a port or virtual tunnel endpoint (VTEP)) of the software forwarding element to produce 1157. In some embodiments, the SMD is a modified set of SMD that enables the original data 1110 message to be reconstructed when the serviced data message is returned to the logical switch service plane processor 1123. In some embodiments, the encapsulation is only necessary when the next hop service node executes on another device so that the encapsulated data message 1157 can traverse an intervening network fabric.

The encapsulation, in some embodiments, encapsulates the data message with an overlay header to produce data message 1157. In some embodiments, the overlay header is a Geneve header that stores the SMD and STL attributes in one or more of its TLVs. As mentioned above, the SMD attributes in some embodiments include the SCI value, the SPI value, the SI value, and the service direction. Other encapsulation headers are described in U.S. patent application Ser. No. 16/444,826 filed on Jun. 18, 2019. The illustrated datapath for data message 1110 assumes that the first service node in the service path is on an external host (a host machine that is not the edge device). If, instead, the edge device is hosting the next service node in the service path, the data message will not require encapsulation and instead will be sent to the next service node over the logical service forwarding plane using the SVNI associated with the logical service plane and the MAC address of the next hop service node.

If flow programming instructions are included in encapsulation header 1158, the flow programming instructions 1159 are provided to a flow programming table 1129 and a flow programming version value is updated (e.g., incremented). The flow programming instruction in the flow programming table 1129, in some embodiments, includes a new action (e.g., pf_value) that indicates that subsequent data messages should be dropped, allowed, or a new service path is identified to skip a particular service node (e.g., a firewall that has determined that the connection is allowed) while traversing the other service nodes in the original service path. The use of the flow programming version value will be discussed further in relation to FIG. 13.

Figure 12:
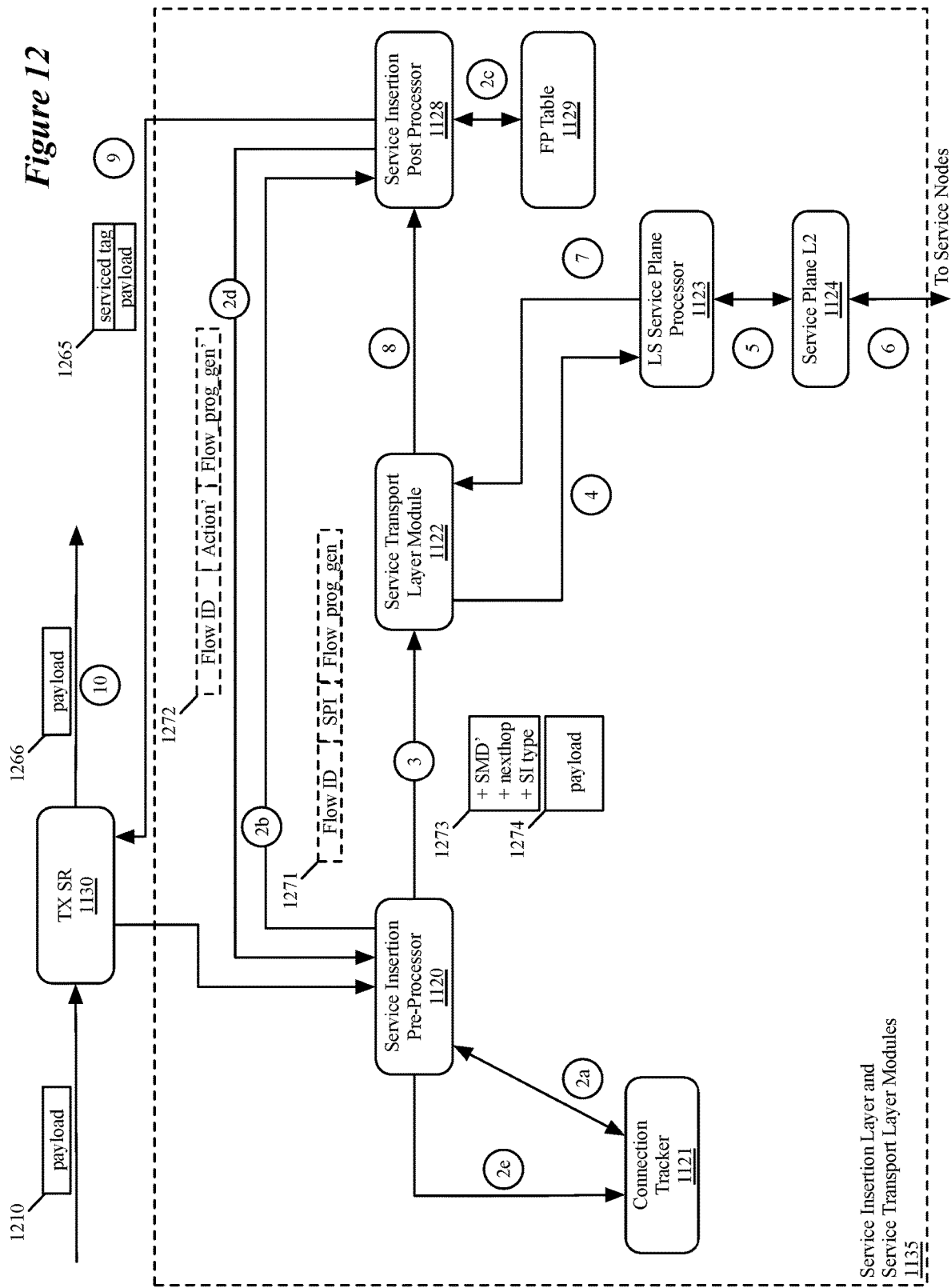
FIG. 12 illustrates a set of operations performed by a set of service insertion layer and service transport layer modules called by a service router at either T0 or for a data message in a data message flow that requires services from a set of service nodes that define a service path.

FIG. 12 illustrates a set of operations performed by a set of service insertion layer and service transport layer modules 1135 called by a service router at either T0 or T1 (e.g., TX SR 1130) for a data message 1210 in a data message flow that requires services from a set of service nodes that define a service path. FIG. 12 is illustrated for TX SR 1130, and service insertion layer (SIL) and service transport layer (STL) modules 1135. TX SR 1130 and SIL and STL modules 1135 represent the function of a centralized service router and SIL and STL modules at either of T0 and T1, in some embodiments. T0 and T1 datapaths, in some embodiments, share a same set of SIL and STL modules, while in others separate SIL and STL modules are used by T0 and T1 datapaths. SIL and STL modules 1135 include a service insertion pre-processor 1120, a connection tracker 1121, a service layer transport module 1122, a logical switch service plane processor 1123, a service plane layer 2 interface 1124, a service insertion post-processor 1128, and a flow programming table 1129.

Data message 1210 is received at the edge device and provided to the edge TX SR 1130. In some embodiments, the TX SR 1130 receives the data message at an uplink interface or at a virtual tunnel interface of the TX SR 1130. In some embodiments, the SI Pre-processor 1120 is called at different processing operations for an uplink interface and a virtual tunnel interface (VTI). In some embodiments, the calls for data messages received at an uplink interface and a virtual tunnel interface are implemented by different components of the edge device. For example, the SI pre-processor 1120 is called for data messages received at the uplink interface, in some embodiments, by a NIC driver as part of a standard data message pipeline, while the SI pre-processor 1120 is called for data messages received at a VTI is called after (before) a decapsulation and decryption (encryption and encapsulation) operation as part of a separate VTI processing pipeline. In some embodiments implementing the SI pre-processor 1120 differently for uplinks and VTIs, a same connection tracker is used to maintain a consistent state for each data message even if it traverses a VTI and an uplink.

The SI pre-processor 1120 performs a set of operations similar to the operations of process 100. The SI pre-processor 1120 performs a lookup in connection tracker storage 1121 to determine if a connection tracker record exists for the data message flow to which the data message belongs. As discussed above, the determination is based on a flow identifier including, or derived from, flow attributes (e.g., header values, contextual data, or values derived from the header values and, alternatively or conjunctively, the contextual data). In the illustrated example, the data message 1210 is a data message in a data message flow that has a connection tracker record in the connection tracker storage 1121. The connection tracker storage lookup begins with operation 120 of process 100. FIG. 12 illustrates a set of additional operations that will be used as examples of the operations discussed in FIG. 13.

Some embodiments provide a method of performing stateful services that keeps track of changes to states of service nodes to update connection tracker records when necessary. At least one global state value indicating a state of the service nodes is maintained at the edge device. In some embodiments, different global state values are maintained for service chain service nodes (SCSNs) and layer 2 bump-in-the-wire service nodes (L2 SNs). The method generates a record in a connection tracker storage including the current global state value as a flow state value for a first data message in a data message flow. Each time a data message is received for the data message flow, the stored state value (i.e., a flow state value) is compared to the relevant global state value (e.g., SCSN state value or L2 SN state value) to determine if the stored action may have been updated.

After a change in the global state value relevant to the flow, the global state value and the flow state value do not match and the method examines a flow programming table to determine if the flow has been affected by the flow programming instruction(s) that caused the global state value to change (e.g., increment). The instructions stored in the flow programming table, in some embodiments, include a data message flow identifier and an updated action (e.g., drop, allow, update selected service path, update a next hop address). If the data message flow identifiers stored in the flow programming table do not match the current data message flow identifier, the flow state value is updated to the current global state value and the action stored in the connection tracker record is used to process the data message. However, if at least one of the data message flow identifiers stored in the flow programming table matches the current data message flow identifier, the flow state value is updated to the current global state value and the action stored in the connection tracker record is updated to reflect the execution of the instructions with a matching flow identifier stored in the flow programming table and the updated action is used to process the data message.

Figure 13:
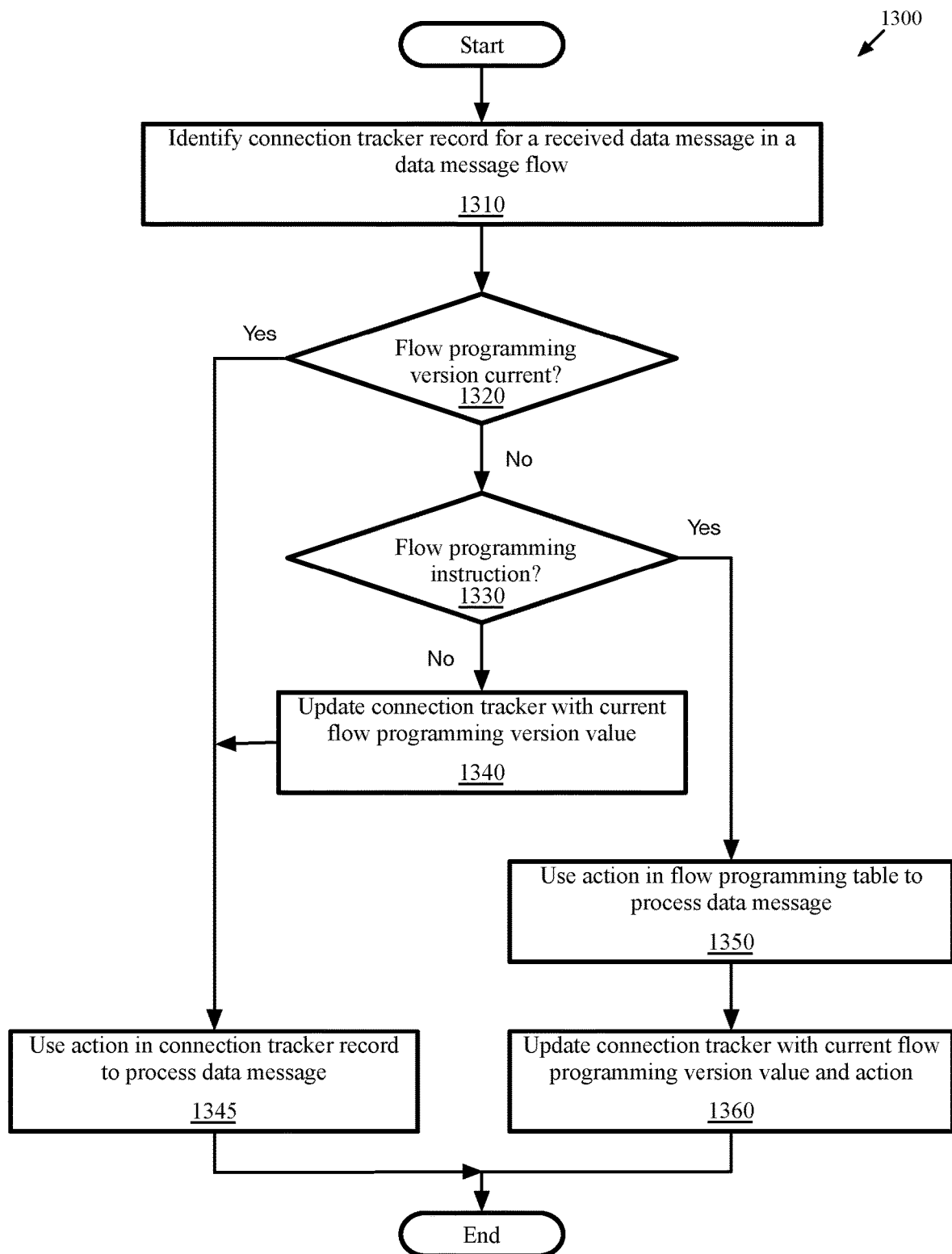
FIG. 13 conceptually illustrates a process for validating or updating an identified connection tracker record for a data message flow.

FIG. 13 conceptually illustrates a process 1300 for validating or updating an identified connection tracker record for a data message flow. Process 1300 in some embodiments is performed by an edge forwarding element executing on an edge device. In the example of FIG. 12, the process is performed by SI pre-processor 1120. The process 1300 begins by identifying (at 1310) a connection tracker record for a data message received at the edge forwarding element. A flow programming version value is stored in the connection tracker record that reflects the flow programming version value at the time of connection tracker record generation. Alternatively, in some embodiments, the flow programming version value reflects the flow programming version value at the last update of the connection tracker record. The connection tracker record stores the forwarding information for the data message flow. However, if a flow programming instruction exists for the data message flow, the stored information may be out of date.

For some data message flows, a previous data message in the data message flow will have been received that includes a set of flow programming instructions. The data message, in some embodiments, is a serviced data message that has been serviced by a set of service nodes in a service path and the set of flow programming instructions is based on flow programming instruction from a set of service nodes in the service path. The set of flow programming instructions, in some embodiments, includes a flow programming instruction for both a forward direction data message flow and a reverse direction data message flow that are affected by the flow programming instruction. In some embodiments, the forward and reverse flow ID are the same and a direction bit distinguishes between forward and reverse data message flows in the connection tracker record.

The set of flow programming instructions are recorded in a flow programming table and a flow programming version value is updated (incremented) at the flow programming table to reflect that flow programming instructions have been received that may require information in at least one connection tracker record to be updated. The flow programming instructions, in some embodiments, are based on any of the following events: the failure of a service node, an identification of a service node that is no longer required to be part of the service path, a decision to drop a particular data message in a data message flow, or a decision to drop a particular data message flow. Based on the event, the flow programming instruction includes forwarding information that specifies a different service path than was previously selected (based on service node failure or the identification of a service node that is no longer required) or a new action (e.g., pf_value) for a next data message (based on a decision to drop a particular data message in a data message flow) or for the data message flow (based on a decision to drop a particular data message flow). The flow programming table, in some embodiments, stores records relevant to individual flows and a record of failed service nodes (or the service paths that they belong to) used to determine available service paths during service path selection operations. Records stored for individual flows, persist until they are executed, which, in some embodiments, occurs upon receiving the next data message for the data message flow as will be discussed below.

The process 1300 then determines (at 1320) whether the flow programming generation value is current (i.e., is not equal to the flow programming version value stored by the flow programming table). In the described embodiment, determining (at 1320) whether the flow programming version value (e.g., flow_prog_gen or BFD_gen) is current includes a query to the flow programming table 1129 including only the flow programming version value to perform a simple query operation to determine whether a further, more complicated query must be performed. If the flow programming version value is current the action stored in the connection tracker record can be used to forward the data message to service nodes to provide the required services and the process ends.

If the process 1300 determines (at 1320) that the flow programming version value is not current, the process 1300 then determines (at 1330) whether there is a flow programming instruction that applies to the received data message (i.e., the data message flow to which the data message belongs). In some embodiments, this second determination is made using a query (e.g., 1271) that includes a flow ID that is used as a key to identify a flow programming record stored in the flow programming table. In some embodiments, the query also includes a service path identifier (SPI) that can be used to determine whether the service path has failed. The flow programming generation value is not current, in some embodiments, because a flow programming instruction has been received that causes the flow programming version value to update (e.g., increment). The flow programming instruction, in some embodiments, is relevant to the data message flow, while in other embodiments, the flow programming instruction is relevant to a different data message flow or a failed service node.

If the process 1300 determines (at 1330) that there is no relevant flow programming instruction for the received data message, the flow programming version value stored in the connection tracker record is updated (at 1340) to reflect the flow programming version value returned from the flow programming table. The data message is then processed (at 1345) based on the action stored in the connection tracker record and the process ends. If, however, the process 1300 determines (at 1330) that there is a relevant flow programming instruction for the received data message, the action in the flow programming table is used (at 1350) to process the data message. In some embodiments, the determination that there is a relevant flow programming instruction for the received data message is based on receiving a non-empty response (e.g., 1272) to the query. The connection tracker record is then updated (at 1360) based on the query response to update the service action and the flow programming version value and the process ends. One of ordinary skill in the art will appreciate that operations 1350 and 1360 are performed together or in a different order without affecting the functionality.

Processing the data message according to the forwarding information based on the flow programming record and connection tracker record, for some data messages, includes forwarding the data message to the service transport layer module 1122 that forwards the data message along the service path identified in the forwarding information. For other data messages, processing the data message according to the forwarding information includes dropping (or allowing) the data message based on the flow programming instruction. A similar process is performed for L2 BIW service nodes based on a bidirectional forwarding detection (BFD) version value (e.g., BFD_gen) that is a state value associated with failures of service nodes connected by a L2 BIW transport mechanism and is stored in a connection tracker record at creation.

Figure 31:
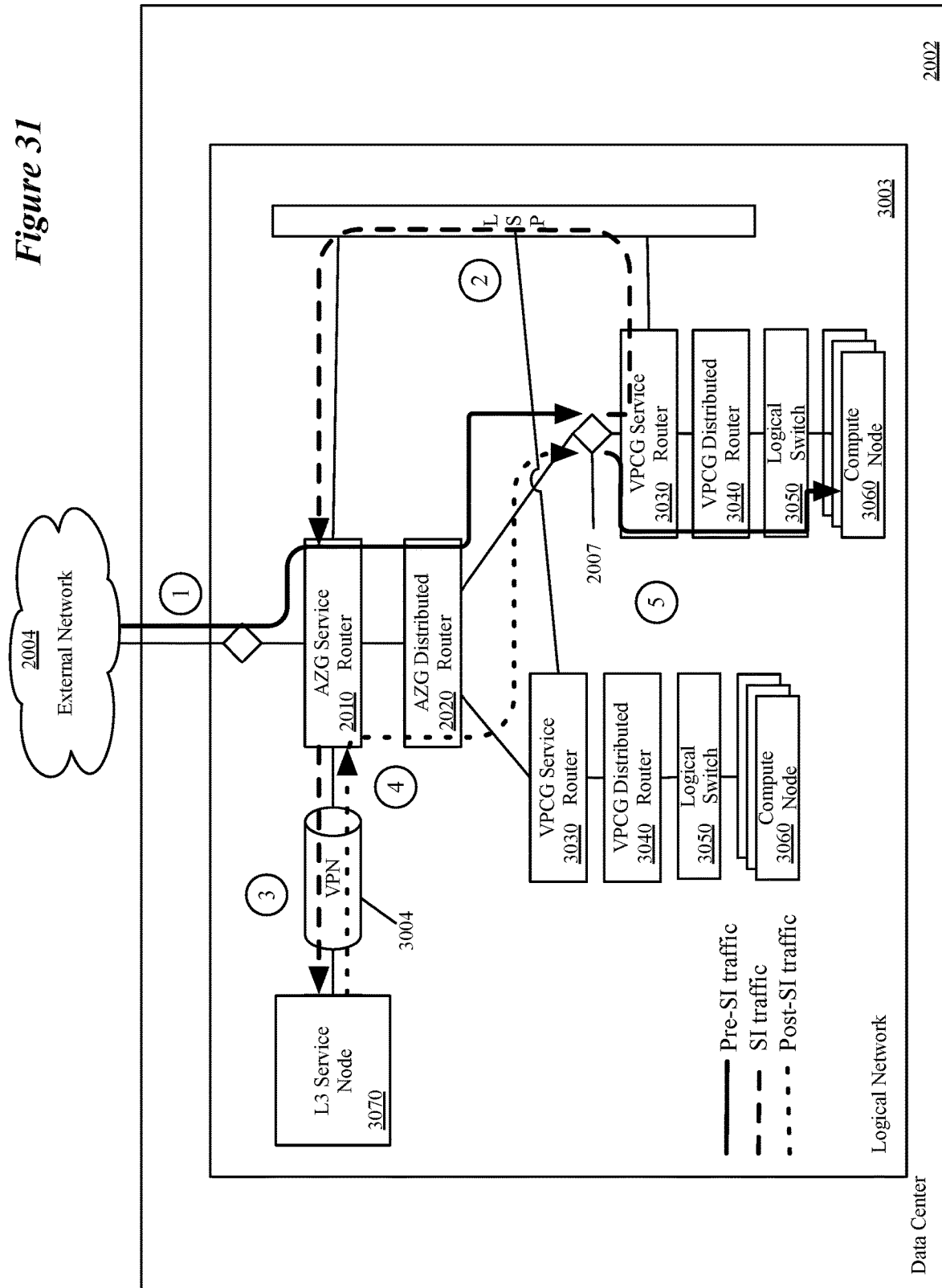
FIG. 31 conceptually illustrates a VPC service router processing a data message sent from an external network to a compute node.

After the data message is processed through SI postprocessor 1128, serviced data message 1162 is provided to the TX SR 1130 marked (e.g., using a tag, or metadata associated with the data message) as having been serviced so that SI pre-processor is not called a second time to classify the data message. TX SR 1130 then forwards the data message 1163 to the next hop. In some embodiments, the marking as serviced is maintained in forwarding the data message, while in some other embodiments, the marking is removed as part of the logical routing operation of the TX SR 1130. In some embodiments, metadata is stored for the data message that indicates that the data message has been serviced. FIG. 31 will discuss an example of an embodiment that maintains the identification of the data message as having been serviced to avoid creating a loop from a T1 SR service classification operation.

Figure 14:
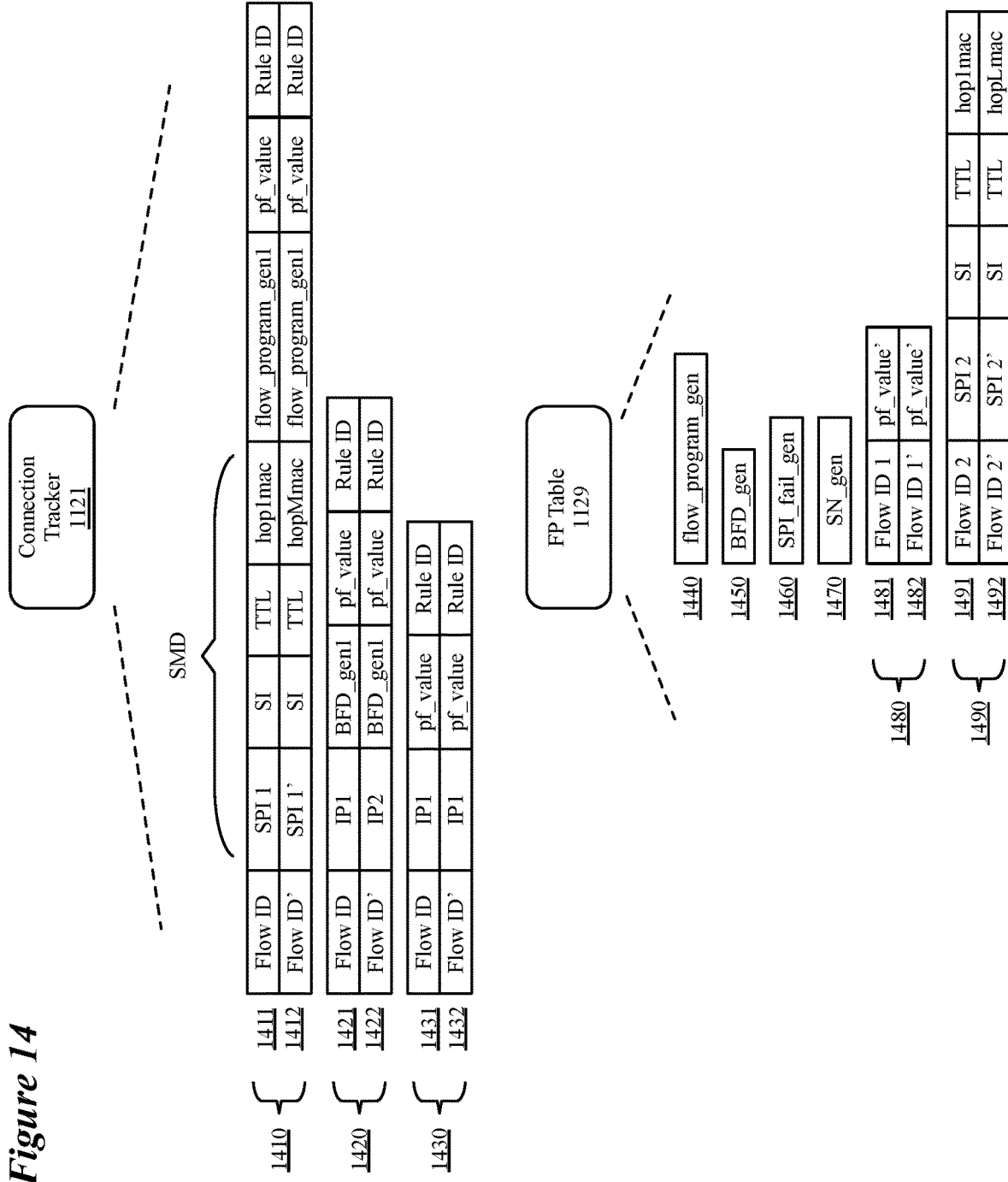
FIG. 14 illustrates sets of connection tracker records in a connection tracker storage and an exemplary sets of flow programming records in a flow programming table.

FIG. 14 illustrates sets of connection tracker records 1410-1430 in a connection tracker storage 1121 and an exemplary sets of flow programming records 1440-1490 in a flow programming table 1129. Connection tracker storage 1121 is shown storing connection tracker records 1410-1430. Connection tracker record sets 1410-1430 include connection tracker record sets for different transport mechanisms each including separate records for forward and reverse direction data message flows.

Connection tracker record set 1410 is a set of connection tracker records for a forward and reverse direction data message flow that use a logical service plane (e.g., logical service forwarding element) transport mechanism. Connection tracker record set 1410, in some embodiments, includes a connection tracker record 1411 for a forward direction data message flow and a connection tracker record 1412 for a reverse direction data message flow. Each connection tracker record 1411 and 1412, includes a flow identifier (e.g., Flow ID or Flow ID'), a set of service metadata, a flow programming version value (e.g., flow_program_gen), an action identifier (e.g., pf_value), and a rule ID identifying a service rule that was used to create the connection tracker record. The flow ID for the forward and reverse direction data message flows, in some embodiments, are different flow IDs that are based on the switching of the source and destination addresses (e.g., IP and MAC addresses). The different flow IDs for the forward and reverse direction data message flows, in other embodiments, is based on different values for source and destination addresses that are the result of a network address translation provided by a service node in the set of service nodes. In some embodiments, the forward and reverse flow IDs are the same except for a bit that indicates the directionality. In some embodiments, the directionality bit is stored in a separate field and forward and reverse flow IDs are the same.

In some embodiments, the service metadata (SMD) includes a service path ID (e.g., SPI 1 and SPI 1), a service index (e.g., SI which should be the same for the forward and reverse direction data message flows), a time to live (TTL), and a next hop MAC address (e.g., hop1mac and hopMmac). The use of the SMD in processing data messages has been described above in relation to FIGS. 3 and 11. The SMD, in some embodiments, includes the network service header (NSH) attributes per RFC (Request for Comments) 8300 of IETF (Internet Engineering Task Force). The SMD includes, in some embodiments, a service chain identifier (SCI) and a direction (e.g., forward or reverse) along with the SPI and SI values, for processing the service operations of the service chain.

The rule ID, in some embodiments, is used (as described in operation 223) to identify a set of interfaces at which the rule is applied by using the rule ID as a key in an applied_to storage 1401 that stores records including a rule ID field 1402 identifying the rule ID and an applied_to field 1403 containing a list of interfaces at which the identified rule is applied. In some embodiments, the interfaces are logical interfaces of the service router identified by a UUID. The applied_to storage 1401, in some embodiments, is configured by a controller that is aware of the service insertion rules, service policies, and interface identifiers.

Connection tracker record set 1420 is a set of connection tracker records for a forward and reverse direction data message flow that use a layer 2 bump-in-the-wire (BIW) transport mechanism. Connection tracker record set 1420, in some embodiments, includes a connection tracker record 1421 for a forward direction data message flow and a connection tracker record 1422 for a reverse direction data message flow. Each connection tracker record 1421 and 1422, includes a flow identifier (e.g., Flow ID or Flow ID'), an IP address (e.g., a dummy IP address associated with an interface connected to an L2 service node), a bidirectional forwarding detection (BFD) version value (e.g., BFD_gen) that is a state value associated with failures of service nodes connected to an LR-SR (e.g., an AZG-SR or VPCG-SR) by a L2 BIW transport mechanism, an action identifier (e.g., pf_value), and a rule ID identifying a service rule that was used to create the connection tracker record. The flow ID for the forward and reverse direction data message flows is the same as that described for connection tracker record 1410. In some embodiments, the pf_value is a value that identifies whether a flow should be allowed or dropped, bypassing the service node.

Connection tracker record set 1430 is a set of connection tracker records for a forward and reverse direction data message flow that use a layer 3 tunneling transport mechanism. Connection tracker record set 1430, in some embodiments, includes a connection tracker record 1431 for a forward direction data message flow and a connection tracker record 1432 for a reverse direction data message flow. Each connection tracker record 1431 and 1432, includes a flow identifier (e.g., Flow ID or Flow ID'), an IP address (e.g., an IP address of the virtual tunnel interface connecting the LR-SR to the service node), an action identifier (e.g., pf_value), and a rule ID identifying a service rule that was used to create the connection tracker record. The flow ID for the forward and reverse direction data message flows is the same as that described for connection tracker record 1410. In some embodiments, the pf_value is a value that identifies whether a flow should be allowed or dropped, bypassing the service node.

The flow programming table 1129, in some embodiments, stores state values 1440-1470. The state value "flow_program_gen" 1440 is a flow programming state value that is used to identify a state of changes to a flow programming table. As described above, the flow_program_gen value is used to determine whether a flow programming table should be consulted (e.g., if a connection tracker record stores an out-of-date flow_program_gen value) to determine forwarding information for a data message, or if the forwarding information stored in the connection tracker record is current (e.g., the connection tracker record stores a current flow_program_gen value).

The state value "BFD_gen" 1450 is a liveness state value that is used to identify a state of changes to liveness values of service nodes connected using the L2 BIW transport mechanism. Similarly to the flow_program_gen value, the BFD_gen value is used to determine whether a BFD_gen value stored in a connection tracker record is a current BFD_gen value and the forwarding information is still valid, or whether the BFD_gen value stored in the connection tracker is out-of-date and the SI pre-processor needs to determine if the forwarding information is still valid (e.g., to determine if a service node corresponding to the stored IP address is still operational). In some embodiments, a separate storage structure stores a list of failed service nodes using BFD (e.g., L2 BIW service nodes) to detect failure that is consulted when a BFD_gen value stored in a connection tracker record does not match a global BFD_gen value.

The state value "SPI_fail_gen" 1460 is a liveness state value that is used to identify a state of changes to liveness values of service paths (i.e., ordered sets of service nodes) connected to an LR-SR using the logical service plane (e.g., logical service forwarding element) transport mechanism. In some embodiments, the SPI_fail_gen value is provided from a controller implementing a central control plane that is aware of service node failures and updates the SPI_fail_gen value upon service node failure detection. Similarly to the BFD_gen value, the SPI_fail_gen is used to determine whether a SPI_fail_gen value associated with a service path identifier that is associated with a UUID in a policy storage is up-to-date. If the SPI_fail_gen value is not up-to-date, a determination must be made as to whether a service path currently enumerated as a possible service path is still functional. In some embodiments, a separate storage structure stores a list of failed service paths that is consulted when a SPI_fail_gen value is not up-to-date (i.e., does not match the stored SPI_fail_gen state value 1460).

The state value "SN_gen" 1470 is a liveness state value that is used to identify a state of changes to liveness values of service nodes connected using the L3 tunneling transport mechanism. Similarly to the flow_program_gen value, the SN_gen value is used to determine whether a SN_gen value stored in a connection tracker record is a current SN_gen value and the forwarding information is still valid, or whether the SN_gen value stored in the connection tracker is out-of-date and the SI pre-processor needs to determine if the forwarding information is still valid (e.g., to determine if a service node corresponding to the stored IP address is still operational). In some embodiments, a separate storage structure stores a list of failed L3 service nodes that is consulted when a SN_gen value stored in a connection tracker record does not match a global SN_gen value.

Flow programming table 1129 also stores sets of flow programming instructions. In some embodiments, a single flow programming instruction received from a service node (through its service proxy) generates a flow programming record for each of a forward and reverse direction data message flow. Flow programming record set 1480 illustrates a flow programming record that updates a pf_value for a forward direction data message flow identified by Flow ID 1 (1481) and a reverse direction data message flow identified by Flow ID 1' (1482). Flow ID 1 and flow ID 1', in some embodiments are identical except for a bit that identifies the flow ID as a forward or reverse data message flow. In some embodiments, the pf_value' included in the flow programming table record 1480 is an action value that specifies that the data messages for the data message flow should be dropped or allowed.

In some embodiments, the flow programming instruction is indicated by a flow programming tag that can specify the following operations (1) NONE when no action is required (which causes no flow programming operation to be performed), (2) DROP when no further data messages of this flow should be forwarded along the service chain and instead should be dropped at the LR-SI classifier, and (3) ACCEPT when no further data messages of this flow should be forwarded along the service chain and instead the flow should be forwarded to the destination by the LR-SR. In some embodiments, the flow programming tag can also specify DROP_MESSAGE. The DROP_MESSAGE is used when the service node needs to communicate with the proxy (e.g. to respond to a ping request) and wants the user data message (if any) to be dropped, even though no flow programming at the source is desired.

In some embodiments, an additional action is available for the service proxies to internally communicate failure of their SVMs. This action would direct the SI pre-processor in some embodiments to select another service path (e.g., another SPI) for the data message's flow. This action in some embodiments is carried in-band with a user data message by setting an appropriate metadata field in some embodiments. For instance, as further described below, the service proxies communicate with the SI post-processor (or a controller computer responsible for generating and maintaining lists of available service paths) through OAM (Operation, Administration, and Maintenance) metadata of the NSH attributes through in-band data message traffic over the data plane. Given that by design flow programming actions are affected by signaling delays and are subject to loss, an SVM or service proxy might still see data messages belonging to a flow that was expected to be dropped, accepted or re-directed at the source for some time after communicating the flow programming action to the proxy. In this case, the service plane should continue to set the action to drop, allow, or redirect at the LR-SI classifier (or the connection tracker record).

Flow programming record set 1480 illustrates a flow programming record that updates a set of service metadata for a forward direction data message flow identified by Flow ID 2 (1481) and a reverse direction data message flow identified by Flow ID 2' (1482). The updated SPI (e.g., SPI 2 or SPI 2') in some embodiments represents a different set of service nodes. As discussed above, the updated service path may be based on a service node failure or based on a determination that a particular service node is no longer necessary (e.g., a service node that provides a firewall decision to allow the data message that applies to all subsequent data messages).

Figure 15:
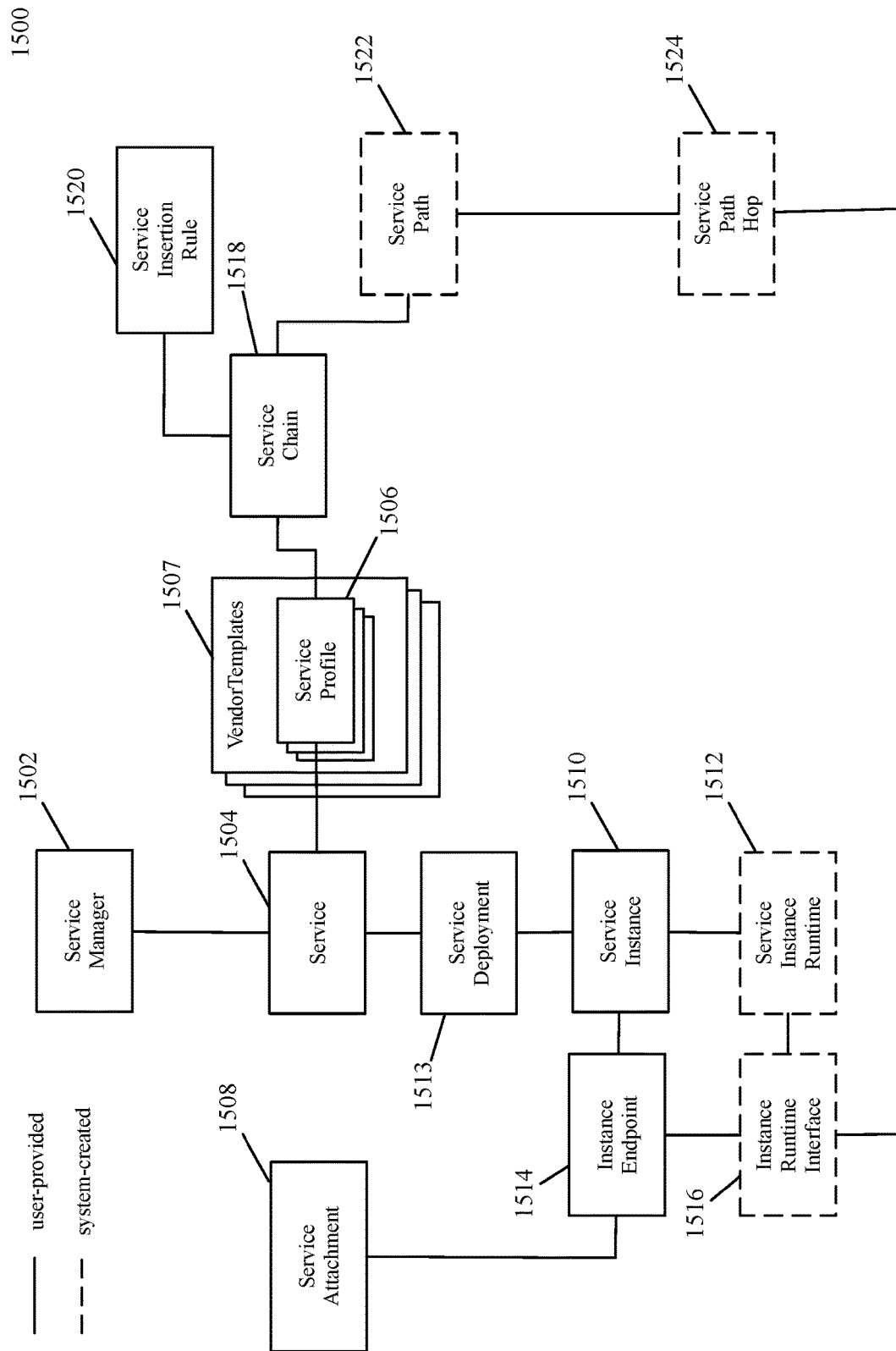
FIG. 15 illustrates an object data model of some embodiments.
Figure 16:
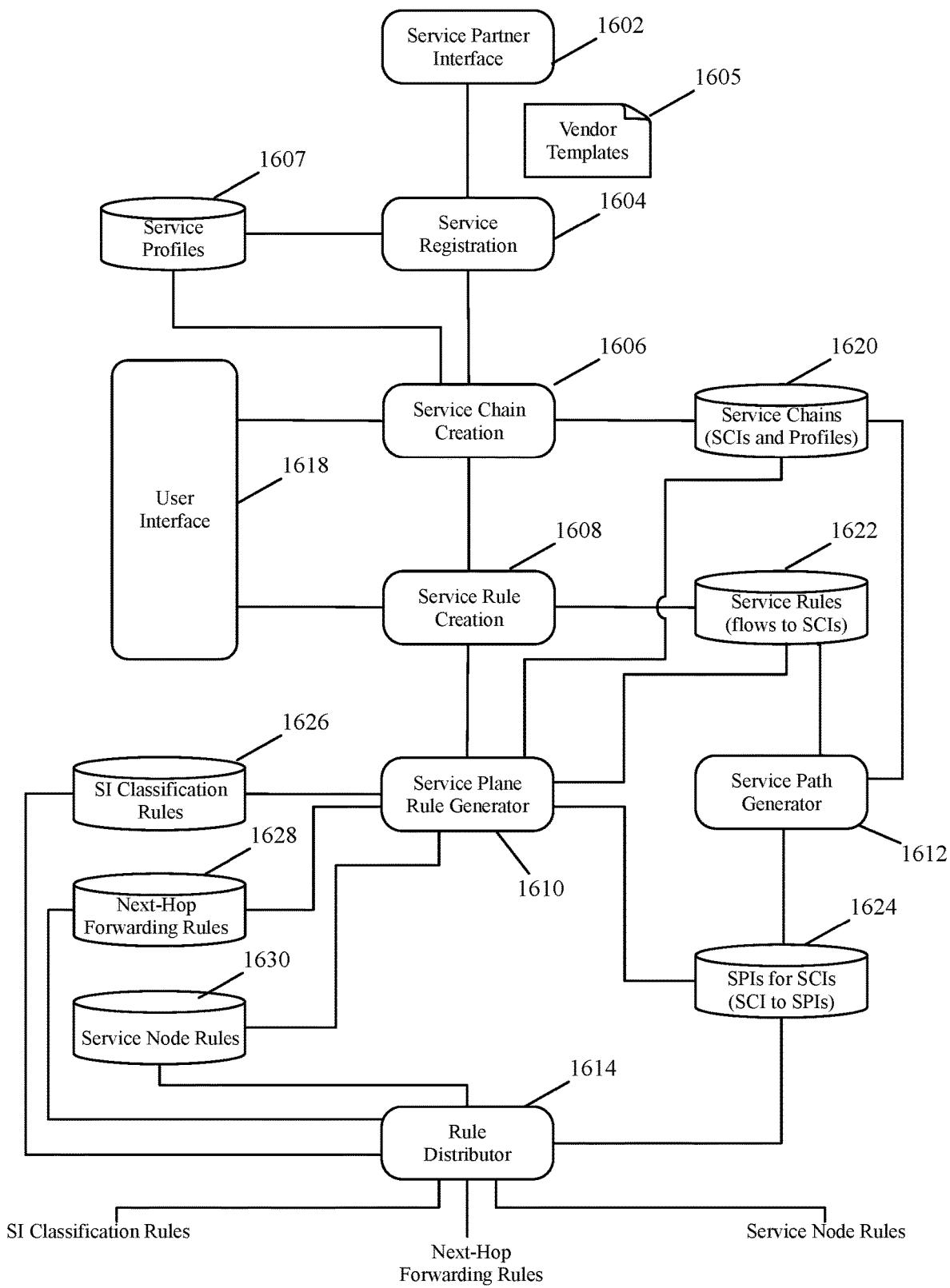
FIG. 16 conceptually illustrates several operations that the network managers and controllers perform in some embodiments to define rules for service insertion, next service hop forwarding, and service processing.

Additional details relating to service chain and service path creation and management are discussed in relation to FIGS. 15 and 16. FIG. 15 illustrates an object data model 1500 of some embodiments. In this model, objects shown in solid lines are provided by the user, while objects shown in dashed lines are generated by the service plane managers and controllers. As shown, these objects include service managers 1502, services 1504, service profiles 1506, vendor templates 1507, a service attachment 1508, service instances 1510, service deployment 1513, service instance runtime (SIR) 1512, instance endpoint 1514, instance runtime port 1516, service chains 1518, service insertion rules 1520, service paths 1522, and service path hops 1524.

In some embodiments, a service manager object 1502 can be created before or after the creation of a service object 1504. An administrator or a service management system can invoke service manager APIs to create a service manager. A service manager 1502 can be associated with a service at any point of time. In some embodiments, the service manager 1502 includes service manager information, such as the vendor name, vendor identifier, restUrl (for callbacks) and authentication/certificate information.

As mentioned above, the service plane does not require the presence or use of a service manager as service nodes can operate in zero-awareness mode (i.e., have zero awareness of the service plane). In some embodiments, zero-awareness mode only allows basic operations (e.g., redirecting traffic towards the service's SVMs). In some such embodiments, no integration is provided to distribute object information (such as service chain information, service profiles, etc.) to the service manager servers. Instead, these servers can poll the network manager for objects of interest.

A service object 1504 represents a type of service that is provided by a service node. The service object has a transport type attribute, which specifies its mechanism (e.g., NSH, GRE, QinQ, etc.) for receiving service metadata. Each service object also has a state attribute (which can be enabled or disabled) as returned by service manager, and a reference to a service manager that may be used for exposing REST API endpoints to communicate events and perform API calls. It also includes a reference to an OVA/OVF attribute used to deploy instances of the service.

Vendor template objects 1507 include one or more service profile objects 1506. In some embodiments, service managers can register vendor templates, and the service profiles can be defined on a per service basis and based on a vendor template with potentially specialized parameters. In some embodiments, a vendor template object 1507 is created for a L3 routing service that can be used to represent the LR-SR components with an attribute that can be used to distinguish LR-SR components of different edge forwarding elements. A service chain can be defined by reference to one or more service profiles. In some embodiments, service profiles are not assigned tags and are not identified explicitly on the wire. In order to determine which function to apply to traffic, service nodes perform a look up (e.g., based on service chain identifier, service index and the service direction, as mentioned above) in order to identify the applicable service profile. The mapping for this lookup is provided by the management plane to service managers whenever a service chain is created or modified.

A service profile object 1506 in some embodiments includes (1) a vendor template attribute to identify its associated vendor template, (2) one or more custom attributes when the template exposes configurable values through the service profile, and (3) an action attribute, such as a forward action, or a copy-and-redirect, which respectively direct the service proxies to either forward the received data messages to their service nodes, or to forward a copy of the received data messages to their service nodes while forwarding the received data message to the next service hop or back to the original source GVM when their service node is the last hop.

The service attachment object 1508 represents the service plane (i.e., is a representation of the service plane of a perspective of a user, such as tenant's network administrator in a multi-tenant datacenter, or the network administrator in a private datacenter). This service attachment object is an abstraction that support any number of different implementations of the service plane (e.g., logical L2 overlay, logical L3 overlay, logical network overlay etc.). In some embodiments, each endpoint (on a service instance runtime (SIR) or a GVM) that communicates over the service plane specifies a service attachment. The service attachment is a communication domain. As such, services or GVMs outside a service attachment may not be able to communicate with one another.

In some embodiments, service attachments can be used to create multiple service planes with hard isolation between them. A service attachment has the following attributes (1) logical identifier (e.g., SVNI for a logical switch) that identifies a logical network or logical forwarding element that carries traffic for the service attachment, (2) a type of service attachment (e.g., L2 attachment, L3 attachment, etc.), and (3) an applied_To identifier that specifies a scope of the service attachment (e.g., Transport node 0 and Transport node 1 for north-south operations and a cluster or set of hosts for East-West operations). In some embodiments, the control plane (e.g., a central control plane) converts the service attachment representation that it receives from the management plane to a particular LFE or logical network deployment based on parameters specified by a network administrator (e.g., a datacenter administrator of a private or public cloud, or network virtualization provider in a public cloud).

A service instance object 1510 represents an actual deployed instance for a service. Hence, each such object is associated with one service object 1504 through a service deployment object 1513 that specifies the relationship between the service object 1504 and the service instance object 1510. The deployed service instance can be a standalone service node (e.g., standalone SVM) or it can be a high availability (HA) service node cluster. In some embodiments, the service deployment object 1513 describes the service instance type, e.g., standalone or HA. As described below, the service deployment object's API can be used in some embodiments to deploy several service instances for a service.

The service instance runtime (SIR) object 1512 represents an actual runtime service node that operates in a standalone mode, or an actual runtime service node of an HA cluster. The service instance object in some embodiments includes the following attributes (1) a deployment mode attribute that specifies whether the service instance is operating in a standalone mode, an active/standby mode, or an active/active model, (2) a state attribute that specifies whether the instance is enabled or disabled, and (3) a deployed_to attribute that in the case of north-south operations includes a reference to a service attachment identifier.

In some embodiments, SVM provisioning is initiated manually. To this end, the management plane provides, in some embodiments, APIs for (1) creating a service instance of an existing service, (2) deleting a service instance, (3) growing a service instance that is already configured as a high availability cluster by adding additional SIRs, and (4) shrinking a service instance by removing one of its SIRs. When creating a service instance of an existing service, the service instance may be created in some embodiments on the basis of a template contained in the service. The caller can pick between a stand-alone instance or an HA cluster, in which case all the VMs in the HA cluster are provisioned. Again, in some embodiments, the API for the service instance deployment allows multiple service instances (e.g., for an HA cluster) to be deployed through just one API call.

In some embodiments, an API that creates one or more SVMs specifies one or more logical locations (e.g. clusters, host, resource pool) in which the SVMs should be placed. In some embodiments, the management plane tries to place SVMs belonging to the same service instance on different hosts whenever possible. Anti-affinity rules may also be configured as appropriate to maintain the distribution of SVMs across migration events (such as VMotion events supported by Dynamic Resource Scheduler of VMware, Inc.). Similarly, the management plane may configure affinity rules with specific hosts (or groups of hosts) when available or the user provisioning the service instance may explicitly pick a host or a cluster.

As mentioned above, a service instance runtime object 1512 represents an actual SVM running on a host to implement a service. In embodiments in which LR-SRs provide an L3 routing service, the service instance runtime object 1512 also represents the edge forwarding element. An SIR is part of a service instance. Each SIR can have one or more traffic interfaces completely dedicated to service plane traffic. In some embodiments, at least one service proxy instance runs per SIR to handle data plane signaling and data message format conversion for the SIR as needed. When a service instance is deployed, the SIRs are created for every SVM associated with the service instance in some embodiments. The network manager also creates an instance endpoint for every service instance in an east-west service insertion. Each SIR object 1512 has the following attributes in some embodiments (1) a state attribute which is active for SVMs that can process traffic and inactive for all others, regardless of reason, and (2) a runtime state that specifies whether the data plane liveness detection detects that the SIR is up or down.

The instance runtime interface 1516 is the per-endpoint version of the service instance endpoint 1514. In some embodiments, the instance runtime interface 1516 is used to identify an interface for an SIR or GVM that can be the source or sink service plane traffic. In East-West service insertion, the lifecycle of an instance runtime interface in some embodiments is linked to the lifecycle of the service instance runtime. In some embodiments, no user action is required to configure an instance runtime interface.

In some embodiments, the instance runtime interface 1516 has the following attributes: an endpoint identifier, a type, a reference to a service attachment, and a location. The endpoint identifier is a data plane identifier for the SIR VNIC. The endpoint identifier is generated when the SIR or GVM is registered with the service transport layer, and may be a MAC address or part of a MAC address. The type attribute can be shared or dedicated. SIR VNICs are dedicated, meaning that only service plane traffic is able to reach them, while GVM VNICs are shared, meaning they will receive and transmit both service plane and regular traffic. The service-attachment reference is a reference to the service attachment that implements the service plane used to transmit and receive service plane traffic. This reference in some embodiments is to the SVNI of the service plane. The location attribute in some embodiments specifies the location of the instance runtime interface, which is the UUID of the host on which the instance runtime interface is currently located.

In some embodiments, a user defines a service chain object 1518 in terms of an ordered list of service profiles 1506. In some embodiments, each service chain conceptually provides separate paths for forward and reverse traffic directions, but if only one direction is provided at creation time, the other one is generated automatically by reversing service profile order. Either direction of the service chain (and even both directions) can be empty, meaning no services will process traffic in that direction. In some embodiments, the data plane will perform a lookup even for an empty service chain.

Service chains are abstract concepts. They do not point to a specific set of service nodes. Rather, the network controllers that are part of the service plane platform automatically generate service paths that point to sequences of service nodes for the service chain and direct messages/flows along the generated service paths. In some embodiments, a service chain is identified in the management plane or control plane by its UUID, a unique identifier of the service chain. Service nodes are provided with the meaning of service chain IDs through management plane APIs received through their service managers. Further details are described in U.S. patent application Ser. No. 16/444,826 filed on Jun. 18, 2019.

A service chain tag in some embodiments may be used to identify a service chain in the dataplane because UUIDs are too long to be carried in encapsulating headers. A service chain ID in some embodiments is an unsigned integer like rule ID. Each data message redirected to a service carries the service chain tag for the service chain it is traversing. The management plane advertises UUID to service chain tag mappings when a service chain is created or modified. Service chain tags have a 1 to 1 mapping with service chain UUIDs, whereas a single service chain can have 0 to many service path indexes.

In addition to a service chain ID, a service chain in some embodiments has the following attributes: (1) references to all computed service paths, (2) failure policies, and (3) references to service profiles. References to computed service paths were described above. The failure policy is applied when a service path selected for a service chain cannot be traversed. In some embodiments, the failure policies may be PASS (forward traffic) and FAIL (drop traffic). The references to service profiles of the service chain may include an egress list of service profiles that egress traffic (e.g., data messages traveling from a GVM to a switch) must traverse, and an ingress list of service profiles that ingress traffic (e.g., data messages traveling from the switch to a GVM) must traverse. In some embodiments, the ingress list is initialized by default as the reverse of the egress list.

Different techniques can be used in some embodiments to define the service paths for the service chain. For instance, in some embodiments, a service chain can have an associated load balancing strategy, which can be one of the following strategies. The load balancing strategy is responsible for load balancing traffic across different service paths of a service chain. According to an ANY strategy, the service framework is free to redirect the traffic to any service path regardless of any load balancing consideration or flow pinning. Another strategy is a LOCAL strategy, which specifies that local service instances (e.g., SVMs executing on the same host computer as the source GVM) are to be preferred over remote service instances (e.g., SVMs executing on other host computers or external service appliances).

Some embodiments generate scores for service paths based on how many SIRs are local and the highest score is selected regardless of load. Another strategy is the cluster strategy, which specifies that service instances implemented by VMs that are co-located on the same host are preferred, whether that host is the local one or a different one. A ROUND ROBIN strategy directs that all active service paths are hit with equal probability or based on probabilities that are specified by a set of weight values.

An SI rule object 1520 associates a set of data message attributes with a service chain represented by the service chain object 1518. The service chain is implemented by one or more service paths, each of which is defined by a service path object 1522. Each service path has one or more service hops, which are represented by one or more service path hop objects 1524 with each hop being associated with one instance runtime interface 1516. Each service hop also refers to an associated service profile, an associated service path, and a next hop SIR endpoint identifier in some embodiments.

In some embodiments, a service path object has several attributes, some of which may be updated by the management or control plane when underlying conditions change. These properties include a service path index, a state (e.g., enabled or disabled), an administrative mode (e.g., enabled or disabled) used when a service path must be manually disabled (e.g., for debugging reasons), a host crossing count (indicating how many times a data message traversing the service path crosses hosts), a locality count (indicating how many of the SIRs along this path are located on the local host), a list of backup service paths, a length of the service path, a reverse path (listing the same set of SIRs in the reverse order), and a maintenance mode indicator (in some embodiments a bit indicating true if any hop in the service path is in maintenance mode).

The host crossing count is an integer and indicates how many times a data message going through the service path must be sent out of a PNIC. In some embodiments, a local or central control plane uses this metric to determine preferred paths when multiple available alternatives exist. This value is populated by the management plane or control plane and is the same for each host using the service path. The locality count in some embodiments is not initialized by the management plane or the control plane but rather computed by the local control plane when a service path is created or updated. Each LCP may potentially compute a different number. This value is used by the local control plane to identify preferred paths when multiple available alternatives exist. The service path length is one parameter that is used by the service plane to set the initial service index.

In some embodiments, the list of backup service paths is a pointer to a sorted list of all service paths for the same service chain. It lists all possible alternatives to be tried when a specific SIR along the path is down. This list may contain a service path for all possible permutations of SVMs in each HA cluster traversed by the service path. In some embodiments, the list will not contain SIRs belonging to different HA clusters.

In some embodiments a service path is disabled when at least one service hop is inactive. Such a condition is temporary and is triggered by service liveness detection failures. A service path can be disabled in this manner at any time. In some embodiments, a service path is also disabled when at least one service hop has no matching SIR. The service hop enters this condition when an SIR it is referring to disappears, but the service path still exists in the object model.

The service plane must be able to uniquely identify each SPI. In some embodiments, the control plane generated UUIDs are sent for each service path. Due to data message header limitations in the service plane, a large ID is not sent with each data message in some embodiments. In some embodiments, when the control plane generates a UUID for each service path, it also generates a small unique ID for it and this ID is sent with each data message in these embodiments.

To support using LR-SRs as service plane traffic sinks, in some embodiments, the network manager or controller generates an internal service representing the edge forwarding element and creates a vendor template representing L3 routing with a configurable setting representing the LR-SR. For each LR-SR, the network manager or controller, in some embodiments, creates (1) a service profile specializing the L3 routing vendor template, (2) service instances, and (3) service instance endpoints. The network manager or controller then allows the service profile in service chains and configures failure policies for the service paths including the LR-SR. A service link connected to the logical service plane is then provisioned for the LR-SR and the data plane is configured to inject service plane traffic into the regular routing pipeline of the LR-SR.

FIG. 16 conceptually illustrates several operations that the network managers and controllers perform in some embodiments to define rules for service insertion, next service hop forwarding, and service processing. As shown, these operations are performed by a service registrator 1604, a service chain creator 1606, a service rule creator 1608, a service path generator 1612, a service plane rule generator 1610, and a rule distributor 1614. In some embodiments, each of these operators can be implemented by one or more modules of a network manager or controller and/or can be implemented by one or more standalone servers.

Through a service partner interface 1602 (e.g., a set of APIs or a partner user interface (UI) portal), the service registrator 1604 receives vendor templates 1605 that specify services that different service partners perform. These templates define the partner services in terms of one or more service descriptors, including service profiles. The registrator 1604 stores the service profiles in a profile storage 1607 for the service chain creator 1606 to use to define service chains.

Specifically, through a user interface 1618 (e.g., a set of APIs or a UI portal), the service chain creator 1606 receives from a network administrator (e.g., a datacenter administrator, a tenant administrator, etc.) one or more service chain definitions. In some embodiments, each service chain definition associates a service chain identifier, which identified the service chain, with an ordered sequence of one or more service profiles. Each service profile in a defined service chain is associated with a service operation that needs to be performed by a service node. The service chain creator 1606 stores the definition of each service chain in the service chain storage 1620.

Through the user interface 1618 (e.g., a set of APIs or a UI portal), the service rule creator 1608 receives from a network administrator (e.g., a datacenter administrator, a tenant administrator, etc.) one or more service insertion rules. In some embodiments, each service insertion rule associates a set of data message flow attributes with a service chain identifier. The flow attributes in some embodiments are flow header attributes, like L2 attributes or L3/L4 attributes (e.g., five tuple attributes). In these or other embodiments, the flow attributes are contextual attributes (e.g., AppID, process ID, active directory ID, etc.). Numerous techniques for capturing and using contextual attributes for performing forwarding and service operations are described in U.S. patent application Ser. No. 15/650,251, now published as U.S. Patent Publication 2018/0181423, which is incorporated herein. Any of these techniques can be used in conjunction with the embodiments described herein.

The service rule creator 1608 generates one or more service insertion rules and stores these rules in the SI rule storage 1622. In some embodiments, each service insertion rule has a rule identifier and a service chain identifier. The rule identifier in some embodiments can be defined in terms of flow identifiers (e.g., header attributes, contextual attributes, etc.) that identify data message flow(s) to which the SI rule is applicable. The service chain identifier of each SI rule, on the other hand, identifies the service chain that has to be performed by the service plane for any data message flow that matches the rule identifier of the SI rule.

For each service chain that is part of a service rule, the service path generator 1612 generates one or more service paths, with each path identifying one or more service instance endpoints for one or more service nodes to perform the service operations specified by the chain's sequence of service profiles. In some embodiments, the process that generates the service paths for a service chain accounts for one or more criteria, such as (1) the data message processing load on the service nodes (e.g., SVMs) that are candidate service nodes for the service paths, (2) the number of host computers crossed by the data messages of a flow as they traverse each candidate service path, etc.

The generation of these service paths is further described in U.S. patent application Ser. No. 16/282,802, filed Feb. 22, 2019, now issued as U.S. Pat. No. 11,012,351, which is incorporated herein by reference. As described in this patent application, some embodiments identify the service paths to use for a particular GVM on a particular host based on one or more metrics, such as host crossing count (indicating how many times a data message traversing the service path crosses hosts), a locality count (indicating how many of the SIRs along this path are located on the local host), etc. Other embodiments identify service paths (i.e., select service nodes for service paths) based on other metrics, such as financial and licensing metrics.

The service path generator 1612 stores the identity of the generated service paths in the service path storage 1624. This storage in some embodiments associates each service chain identifier to one or more service path identifiers, and for each service path (i.e., each SPI) it provides a list of service instance endpoints that define the service path. Some embodiments store the service path definitions in one data storage, while storing the association between the service chain and its service paths in another data storage.

The service rule generator 1610 then generates rules for service insertion, next service hop forwarding, and service processing from the rules stored in storages 1620, 1622 and 1624, and stores these rules in rule storages 1626, 1628 and 1630, from where the rule distributor 1614 can retrieve these rules and distribute them to the SI pre-processors, service proxies and service nodes. The distributor 1614 also distributes in some embodiments the path definitions from the service path storage 1624. The path definitions in some embodiments includes the first hop network address (e.g., MAC address) of the first hop along each path. In some embodiments, the service rule generator 1610 and/or the rule distributor 1614 specify and distribute different sets of service paths for the same service chain to different host computers, as different sets of service paths are optimal or preferred for different host computers.

In some embodiments, the SI classification rules that are stored in the rule storage 1626 associate flow identifiers with service chain identifiers. Hence, in some embodiments, the rule generator 1610 retrieves these rules from the storage 1622 and stores them in the classification rule storage 1626. In some embodiments, the rule distributor 1614 directly retrieves the classification rules from the SI rule storage 1622. For these embodiments, the depiction of the SI classification rule storage 1626 is more of a conceptual illustration to highlight the three types of the distributed rules, along with the next-hop forwarding rules and the service node rules.

In some embodiments, the service rule generator 1610 generates the next hop forwarding rules for each hop service proxy of each service path for each service chain. As mentioned above, each service proxy's forwarding table in some embodiments has a forwarding rule that identifies the next hop network address for each service path on which the proxy's associated service node resides. Each such forwarding rule maps the current SPI/SI values to the next hop network address. The service rule generator 1610 generates these rules. For the embodiments in which the SI pre-processor has to look-up the first hop network address, the service rule generator also generates the first hop look-up rule for the SI pre-processor.

Also, in some embodiments, the service rule generator 1610 generates for the service nodes service rules that map service chain identifier, service index values and service directions to service profiles of the service nodes. To do this, the service rule generator uses the service chain and service path definitions from the storages 1620 and 1624, as well as the service profile definitions from the service profile storage 1607. In some embodiments, the rule distributor forwards the service node rules to a service node through a service manager of the service node when such a service manager exists. The service profile definitions are also distributed by the distributor 1614 to the host computers (e.g., to their LCPs) in some embodiments, so that these host computers (e.g., the LCPs) can use these service profiles to configure their service proxies, e.g., to configure the service proxies to forward received data messages to their service nodes, or to copy the received data messages and forward the copies to their service nodes, while forwarding the original received data messages to their next service node hops or back to their source GVMs when they are the last hops.

In some embodiments, the management and control plane dynamically modify the service paths for a service chain, based on the status of the service nodes of the service paths and the data message processing loads on these service nodes as described in U.S. patent application Ser. No. 16/444,826 filed on Jun. 18, 2019. The components of FIG. 16, in some embodiments, are also used to configure logical forwarding elements to use service chains.

Figure 17:
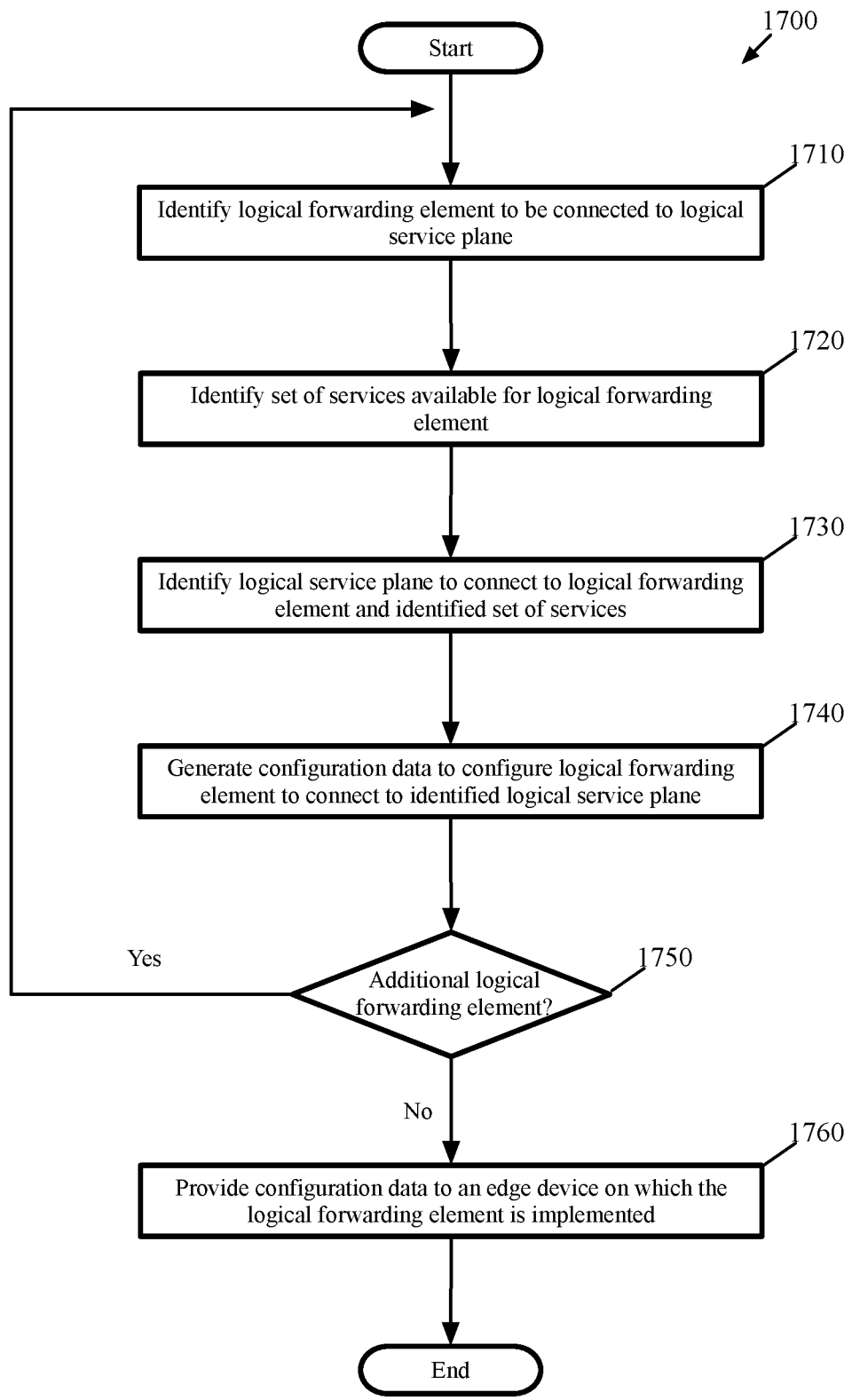
FIG. 17 conceptually illustrates a process for configuring logical forwarding elements to connect to logical service forwarding planes.

FIG. 17 conceptually illustrates a process 1700 for configuring logical forwarding elements (e.g., virtual routing and forwarding (VRF) contexts) to connect to logical service forwarding planes. Process 1700, in some embodiments, is performed by a network controller computer to provide configuration information to the edge device to configure the edge forwarding element to connect to logical service forwarding planes. The process begins by identifying (at 1710) a logical forwarding element to be connected to the logical service forwarding plane. The logical forwarding element, in some embodiments, is a logical router component (e.g., an AZG-SR, AZG-DR, VPCG-SR, or VPCG-DR). The logical router components, in some embodiments, are implemented as a virtual routing and forwarding (VRF) context.

For the identified logical forwarding element, a set of services available at the identified logical forwarding element is identified (at 1720). The set of services available at the logical forwarding element, in some embodiments, is defined by an administrator or the controller computer based on service insertion rules applicable at the logical forwarding element. The set of services, in some embodiments, defines a set of service nodes (e.g., service instances) that are connected to the logical service forwarding plane to provide the set of services.

Once the set of services are identified (at 1720), the process 1700 identifies (at 1730) a logical service forwarding plane to connect the logical forwarding element and the service nodes to provide the identified set of services. The logical service forwarding element, in some embodiments, is identified by a service virtual network identifier (SVNI) that is selected from multiple SVNIs used in the logical network. In some embodiments, a set of the service nodes providing the identified services are connected to multiple logical service forwarding planes identified by multiple SVNIs. The different SVNIs, in some embodiments, are used to distinguish traffic for different tenants.

The process 1700 then generates (at 1740) configuration data to configure the logical forwarding element to connect to the identified logical service forwarding plane. In some embodiments, the configuration data includes an interface mapping table that maps logical forwarding elements (e.g., VRF contexts) to interfaces of logical service forwarding planes. The interface mapping table, in some embodiments, is used by the logical forwarding elements to identify an interface to use to forward data messages to service nodes connected to the logical service forwarding plane.

The process 1700 then determines (at 1750) if additional logical forwarding elements need to be configured to connect to a logical service forwarding plane. If an additional logical forwarding element needs to be required, the process 1700 returns to operation 1710 to identify a next logical forward element that requires connection to a logical service forwarding element. If no additional logical forwarding element needs to be configured, the process 1700 provides (at 1760) the configuration data to a set of edge devices on which the set of identified logical forwarding elements (e.g., edge forwarding elements) is implemented. In some embodiments, the configuration data includes service-insertion data for configuring the logical forwarding element as described above and also includes service forwarding data for configuring logical software forwarding elements that implements logical service forwarding planes associated with the logical forwarding elements implemented by the set of edge devices.

Figure 18:
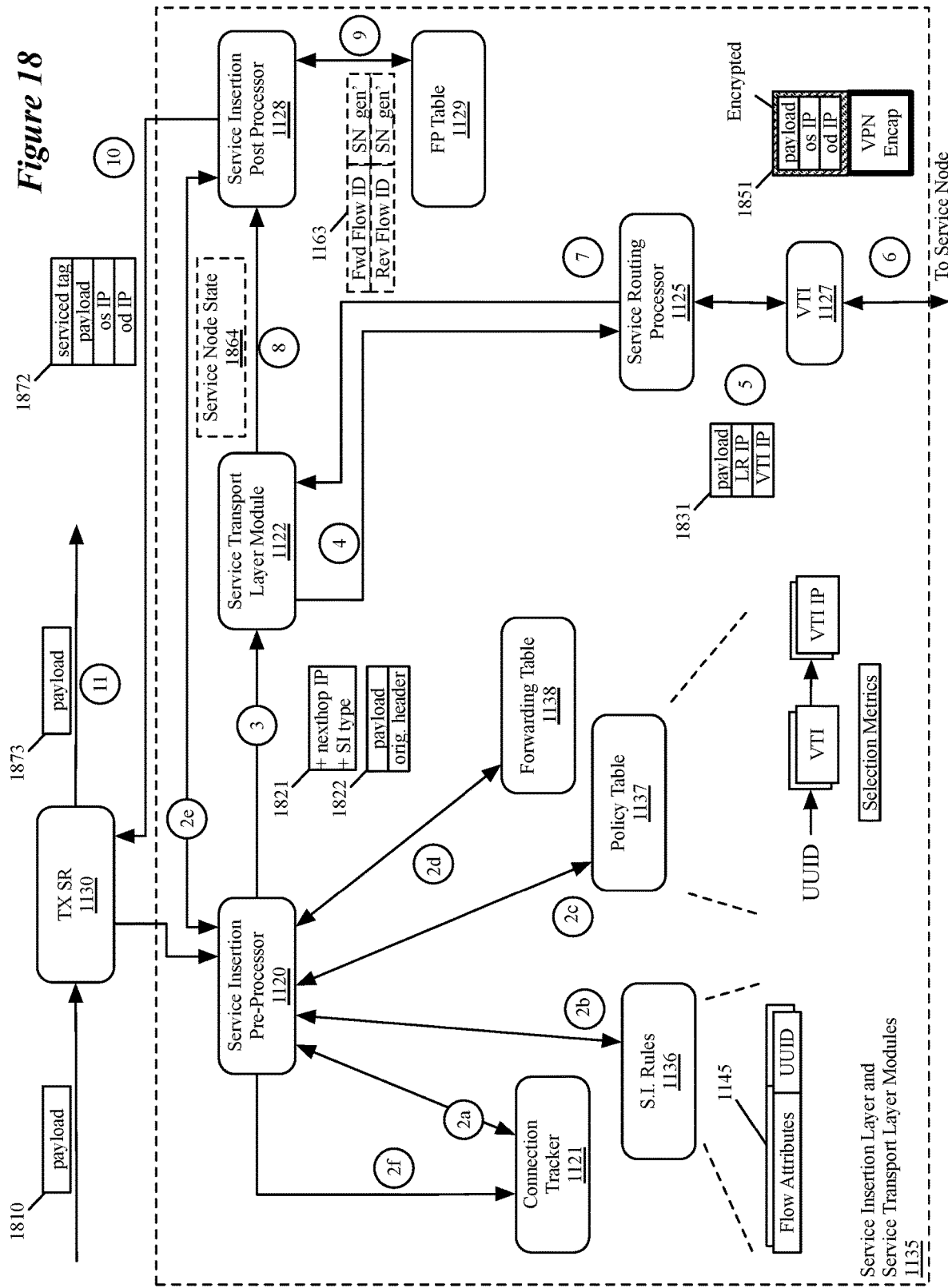
FIG. 18 illustrates a set of operations performed by a set of service insertion layer and service transport layer modules called by a service router at either T0 or T1 for a first data message in a data message flow that requires services from a service node reachable through a tunneling mechanism.

FIG. 18 illustrates a set of operations performed by a set of service insertion layer and service transport layer modules 1135 called by a service router at either T0 or T1 (e.g., TX SR 1130) for a first data message 1810 in a data message flow that requires services from a service node reachable through a tunneling mechanism (e.g., a virtual private network). The basic operations for service classification by the SI pre-processor are as described above for FIG. 11. FIG. 18 illustrates that a UUID identifies a virtual tunnel interface (VTI) or other identifier for a service node accessed through a VPN. In some embodiments, the UUID is associated with multiple service nodes and a set of selection metrics. The selection metrics can be selection metrics for a load balancing operation that is any of: a round robin mechanism, a load-based selection operation (e.g., selecting a service node with a lowest current load), or a distance-based selection operation (e.g., selecting a closest service node as measured by a selected metric).

Once a service node is selected, the process identifies forwarding information associated with the selected service node by performing a lookup in forwarding table 1138. The forwarding table 1138 stores forwarding information for the service node (e.g., an IP address of the VTI). The IP address associated with the selected service node, in other embodiments, are stored with the VTI or service node identifier in the policy table 1137 and the forwarding table 1138 is unnecessary.

In some embodiments, selecting a service node for a forward direction data message flow includes selecting the same service node for a reverse direction data message flow. In such embodiments, forwarding information (e.g., the IP address of the selected service node) for each direction is determined at this point. Once the service node has been selected and the forwarding information has been identified, connection tracker records are created for the forward and reverse direction flows and are provided to the connection tracker storage 1121. As discussed below, the connection tracker record includes the forwarding information (e.g., the IP address for the interface), a service action (if a service action is defined for the data message flow), and a service insertion rule identifier for the service insertion rule that was identified as matching the attributes of data message 1810. In some embodiments, the connection tracker record includes a service insertion type identifier. In some embodiments a service node state value (e.g., SN_gen) is included in the connection tracker record as described above in relation to FIGS. 11 and 14. The information stored in the connection tracker record is used to process subsequent data messages in the forward and reverse data message flows.

The data message 1822 along with the forwarding information 1821 are then provided to the STL module 1122. The forwarding information, in this example, for a data message requiring services provided by a service node accessed through a VPN includes, in some embodiments, a next hop IP address for the virtual tunnel interface and a service insertion type identifier to identify the data message as using a tunneling transport mechanism.

The service routing processor 1125 as shown routes the data message to the VTI based on the IP address identified by the SI pre-processor 1120. In some embodiments, the data message 1831 is provided to the VTI with the original source and destination IP addresses as well as an original data message source and destination port. In other embodiments, the destination IP address is changed to the IP address of the VTI with the original destination IP address stored in a metadata storage of the edge forwarding element to be used by the edge forwarding element to restore the destination IP address of the serviced data message after it is received from the service node. The VTI receives data message 1831 and the processing pipeline, in some embodiments, encrypts and encapsulates the data message to be delivered over the VPN as data message 1851. A return data message is then received at the VTI and processed as described above for the return data message of FIG. 11.

Figure 19:
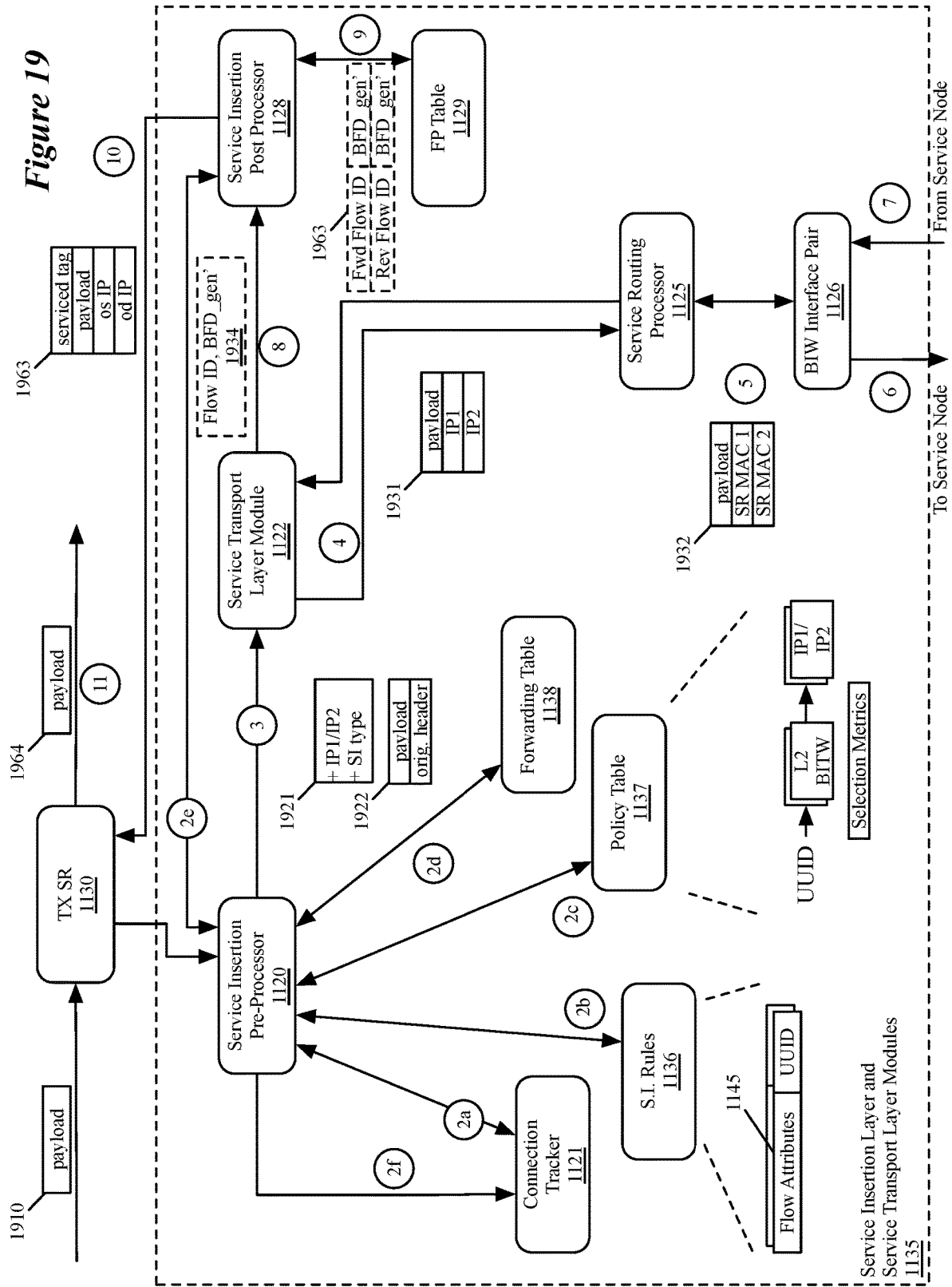
FIG. 19 illustrates a set of operations performed by a set of service insertion layer and service transport layer modules called by a service router at either T0 or T1 for a first data message in a data message flow that requires services from a service node reachable through a L2 BIW mechanism.

FIG. 19 illustrates a set of operations performed by a set of service insertion layer and service transport layer modules 1135 called by a service router at either T0 or T1 (e.g., TX SR 1130) for a first data message 1910 in a data message flow that requires services from a service node reachable through a L2 BIW mechanism. The basic operations for service classification by the SI pre-processor are as described above for FIG. 11.

FIG. 19 illustrates that a UUID identifies a service node accessed through a L2 BIW transport mechanism. In some embodiments, the UUID is associated with multiple service nodes and a set of selection metrics. The selection metrics can be selection metrics for a load balancing operation that is any of: a round robin mechanism, a load-based selection operation (e.g., selecting a service node with a lowest current load), or a distance-based selection operation (e.g., selecting a closest service node as measured by a selected metric).

Once a service node is selected, the process identifies forwarding information associated with the selected service node by performing a lookup in forwarding table 1138. The forwarding table 1138 stores forwarding information for the service node (e.g., a set of dummy IP addresses of interfaces of the TX SR 1130). The dummy IP addresses in some embodiments, are a set of source and destination IP addresses that are associated with first and second virtual interfaces (VIs) of the BIW pair interfaces 1126 that are each connected to the same service node. The dummy IP addresses associated with the selected service node, in other embodiments, are stored with the service node identifier in the policy table 1137 and the forwarding table 1138 is unnecessary.

In some embodiments, selecting a service node for a forward direction data message flow includes selecting the same service node for a reverse direction data message flow. For L2 BIW, the forwarding information for a forward direction data message flow, in some embodiments, identifies the same dummy IP addresses as for the forward direction data message flow but identifies the source IP address for the forward direction data message as a destination IP address for a reverse direction data message and a destination IP address as a source IP address. Once the service node has been selected and the forwarding information has been identified, connection tracker records are created for the forward and reverse direction flows and are provided to the connection tracker storage 1121. As discussed below, the connection tracker record includes the forwarding information (e.g., the dummy IP address for the destination interface), a service action (if a service action is defined for the data message flow), and a service insertion rule identifier for the service insertion rule that was identified as matching the attributes of data message 1910. In some embodiments, the connection tracker record includes a service insertion type identifier. In some embodiments a service node state value (e.g., BFD_gen) is included in the connection tracker record as described above in relation to FIGS. 11 and 14. The information stored in the connection tracker record is used to process subsequent data messages in the forward and reverse data message flows.

The data message 1922 along with the forwarding information 1921 are then provided to the STL module 1122. The forwarding information, in this example, for a data message requiring services provided by a service node accessed through a L2 BIW connection includes, in some embodiments, a set of next hop dummy IP addresses for the virtual interfaces and a service insertion type identifier to identify the data message as using a L2 BIW transport mechanism.

The STL module 1122 as shown provides the data message to the interface in the BIW paired interfaces 1126 identified as a source interface based on the dummy IP address identified by the SI pre-processor 1120. In some embodiments, the data message 1932 is provided to source interface (associated with MAC address MAC 1) in the BIW interface pair 1126 with the original source and destination IP addresses but with source and destination MAC addresses of the BIW interface pair 1126 associated with the L2 BIW service node. The data message is then processed by the L2 service node that returns the serviced data message to the interface in the BIW interface pair identified as the destination interface (associated with MAC address MAC 2). The returned data message is then processed as described above for the return data message of FIG. 11.

As discussed above, the transport mechanisms, in some embodiments, include a tunneling mechanism (e.g. a virtual private network (VPN), internet protocol security (IPSec), etc.) that connects the edge forwarding element to at least one service node through a corresponding set of virtual tunnel interfaces (VTIs). In addition to the VTIs used to connect the edge forwarding element to the service nodes, the edge forwarding element uses other VTIs to connect to other network elements for which it provides forwarding operations. At least one VTI used to connect the edge forwarding element to other (i.e., non-service node) network elements is identified to perform a service classification operation and is configured to perform the service classification operation for data messages received at the VTI for forwarding. The VTIs connecting the edge forwarding element to the service nodes, in some embodiments, are not configured to perform a service classification operation and are instead configured to mark data messages returned to the edge forwarding element as having been serviced. In other embodiments, VTIs connecting the edge forwarding element to the service nodes are configured to perform limited service classification operations using a single default rule that is applied at the VTI that marks data messages returned to the edge forwarding element as having been serviced.

For traffic exiting a logical network through a particular VTI, some embodiments perform a service classification operation for different data messages to identify different VTIs that connect the edge forwarding element to a service node to provide services required by the data messages. Each data message, in some embodiments, is then forwarded to the identified VTI to receive the required service (e.g., from the service node connected to the edge forwarding element through the VTI). The identified VTI does not perform a service classification operation and merely allows the data message to reach the service node. The service node then returns the serviced data message to the edge forwarding element. In some embodiments, the VTI is not configured to perform the service classification operation and is instead configured to mark all traffic directed to the edge forwarding element from the service node as having been serviced. The marked serviced data message is then received at the edge forwarding element and is forwarded to a destination of the data message through the particular VTI. In some embodiments, the particular VTI does not perform additional service insertion operations because the data message is marked as having been serviced.

In some embodiments, the service classification operation is implemented separately from a service classification operation for non-tunneled traffic received at an uplink interface of the edge forwarding element. The different implementation, in some embodiments, is due to the fact that the tunneled data messages are received at the uplink interface in an encapsulated and encrypted format that, if processed by the uplink service classification operation would result in an incorrect service classification (e.g., an incorrect identification of a necessary set of services and forwarding information for the underlying (encapsulated)

data message flow). Therefore, some embodiments, implement a service classification operation as part of the VTI datapath after an incoming data message has been decapsulated (and decrypted, if necessary) or for outgoing data messages before encryption and encapsulation.

Figure 20A:
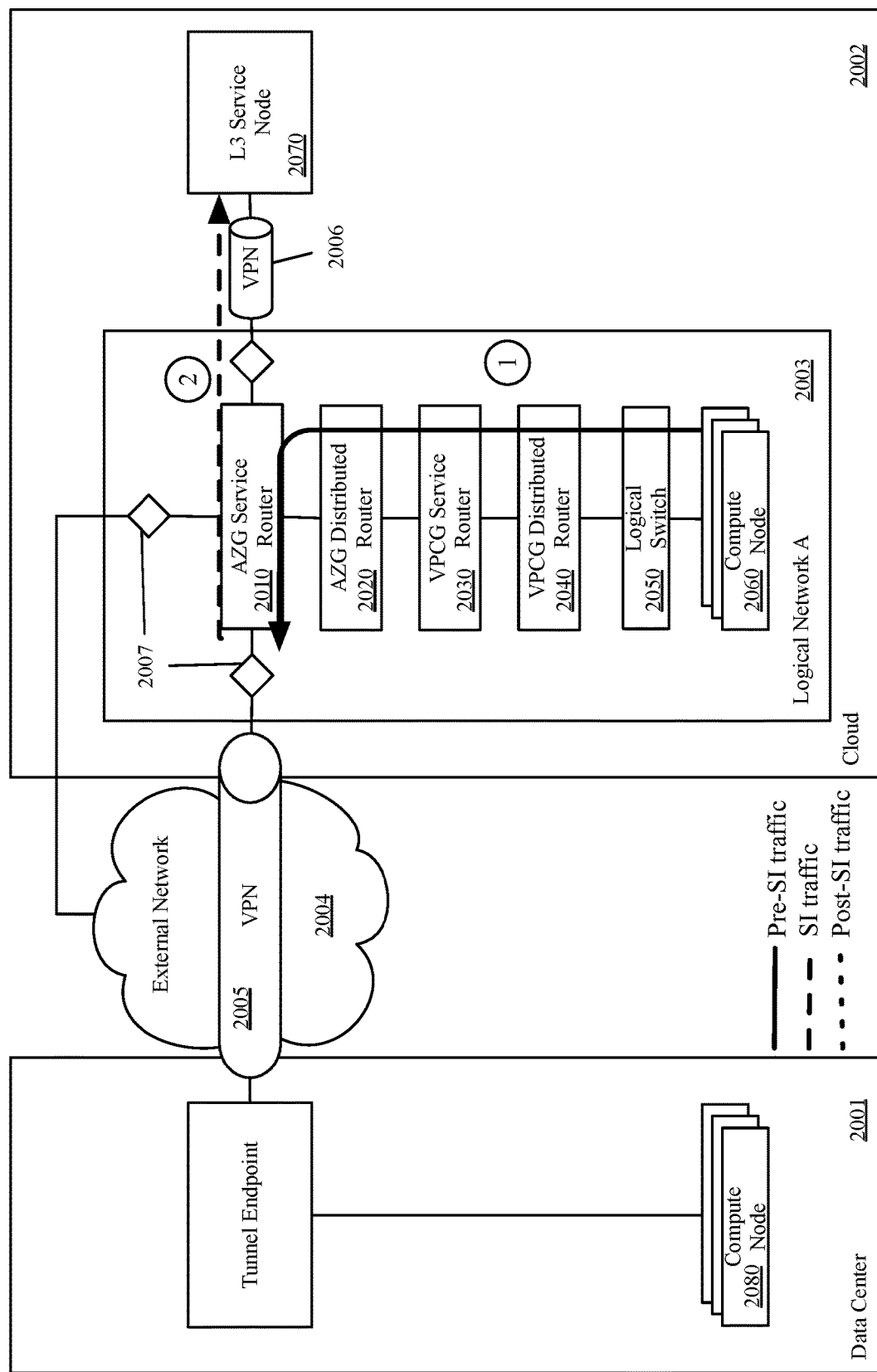
FIGS. 20A-B conceptually illustrate a data message being sent from a compute node in a logical network (e.g., logical network A) implemented in a cloud environment to a compute node in an external datacenter.
Figure 20B:
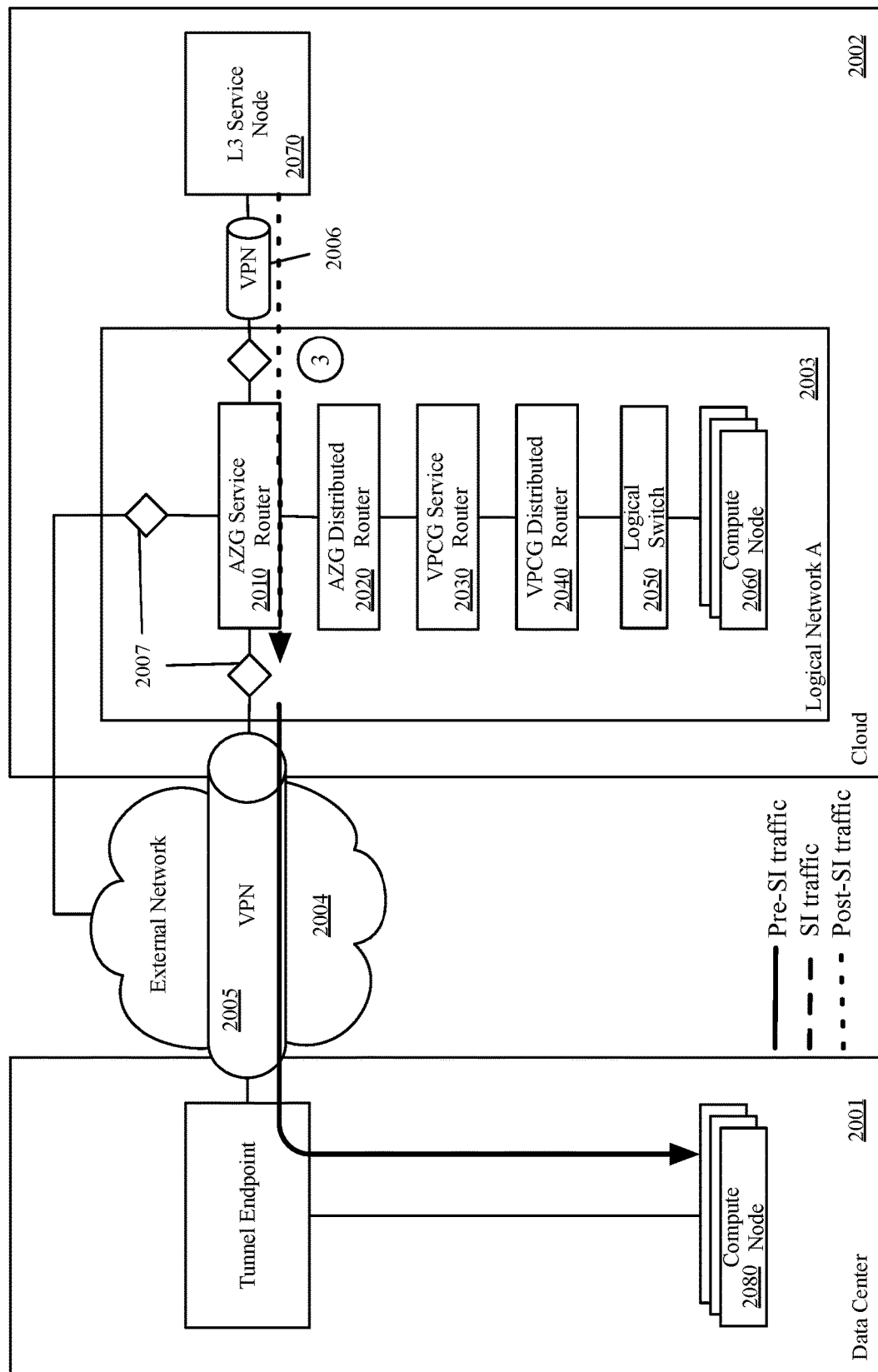

FIGS. 20A-B and 21A-B conceptually illustrate a data message flow through the system described above. FIGS. 20A-B conceptually illustrate a data message being sent from a compute node 2060 in a logical network 2003 (e.g., logical network A) implemented in a cloud environment 2002 to a compute node 2080 in an external datacenter 2001. Compute node 2080 in data center 2001 is connected to the logical network using a VPN (i.e., a tunneling mechanism) 2005 through external network 2004 to the logical network 2003. The tunnel, in some embodiments, uses the physical interface that is identified as an uplink interface of the edge device executing an edge forwarding element, but is logically identified as a separate interface of the edge forwarding element. For the sake of conceptual clarity, the different logical interfaces and associated service classification operations are presented to represent the logical structure of the network. Additionally, internal elements of data center 2001 beyond the tunnel endpoint and destination compute node 2080 are also omitted for clarity.

The communication from compute node 2060 to 2080 begins with standard logical processing through the elements of logical network 2003. Accordingly, the compute node 2060 provides the data message to tenant distributed router 2040 using logical switch 2050. In some embodiments, both the logical switch 2050 and the tenant distributed router 2040 are implemented by a local managed forwarding element on a same host as compute node 2060. VPC distributed router 2040 in turn routes the data message to VPC service router 2030 using, in some embodiments, a transit logical switch (not shown) as described in relation to FIGS. 4-6. The VPC service router 2030 routes the data message to availability zone distributed router 2020. As described above, VPC service router 2030, in some embodiments, executes on a first edge device that also implements the availability zone distributed router 2020 and, in other embodiments, executes on a same edge device as availability zone service router 2010. The availability zone distributed router 2020 in turn routes the data message to availability zone service router 2010 using, in some embodiments, a transit logical switch (not shown) as described in relation to FIGS. 4-6.

The availability zone service router 2010 then routes the data message to the VTI as the next hop for the data message. As part of the VTI processing pipeline, an SI classifier 2007 (e.g., a VTI-SI classifier) performs a service classification operation before encryption and encapsulation that, based on a service insertion rule applied at the VTI, identifies that the data message requires a service that is provided by L3 service node 2070 that sits outside of the logical network 2003. The SI classifier identifies the VTI associated with VPN 2006 as the next hop towards the L3 service node 2070 and sends the data message for processing. The SI classifier sitting between the availability zone service router 2010 and VPN 2006 does not perform service classification operations on service insertion traffic and the data message arrives at the L3 service node 2070 which performs a service on the data message.

FIG. 20B illustrates the serviced data message being returned to the availability zone service router 2010 to be routed to the destination compute node 2080 over VPN 2005. Although shown as post-service insertion traffic from the L3 service node 2070, in some embodiments, marking the data message as serviced (i.e., post-SI) is done at the SI classifier sitting between VPN 2006 and availability zone service router 2010 based on a default rule that is the only SI rule applied at the SI classifier. In other embodiments, the marking is a part of the processing pipeline configured for each interface connecting to an L3 service node without a service classification operation. For this data message the SI classifier sitting between the availability zone service router 2010 does not perform a second service classification operation based on the data message being marked as serviced and the data message is processed (encapsulated or encrypted and encapsulated) for delivery to compute node 2080 over VPN 2005. In some embodiments in which a tag is used to mark the data message as serviced, after the SI classification operation is bypassed based on the tag, further pipeline processing removes the tag. In other embodiments, marking the data message as serviced is a tag stored in local metadata associated with the data message and is deleted once the data message has completed processing for delivery to an external network at the availability zone service router 2010.

Figure 21A:
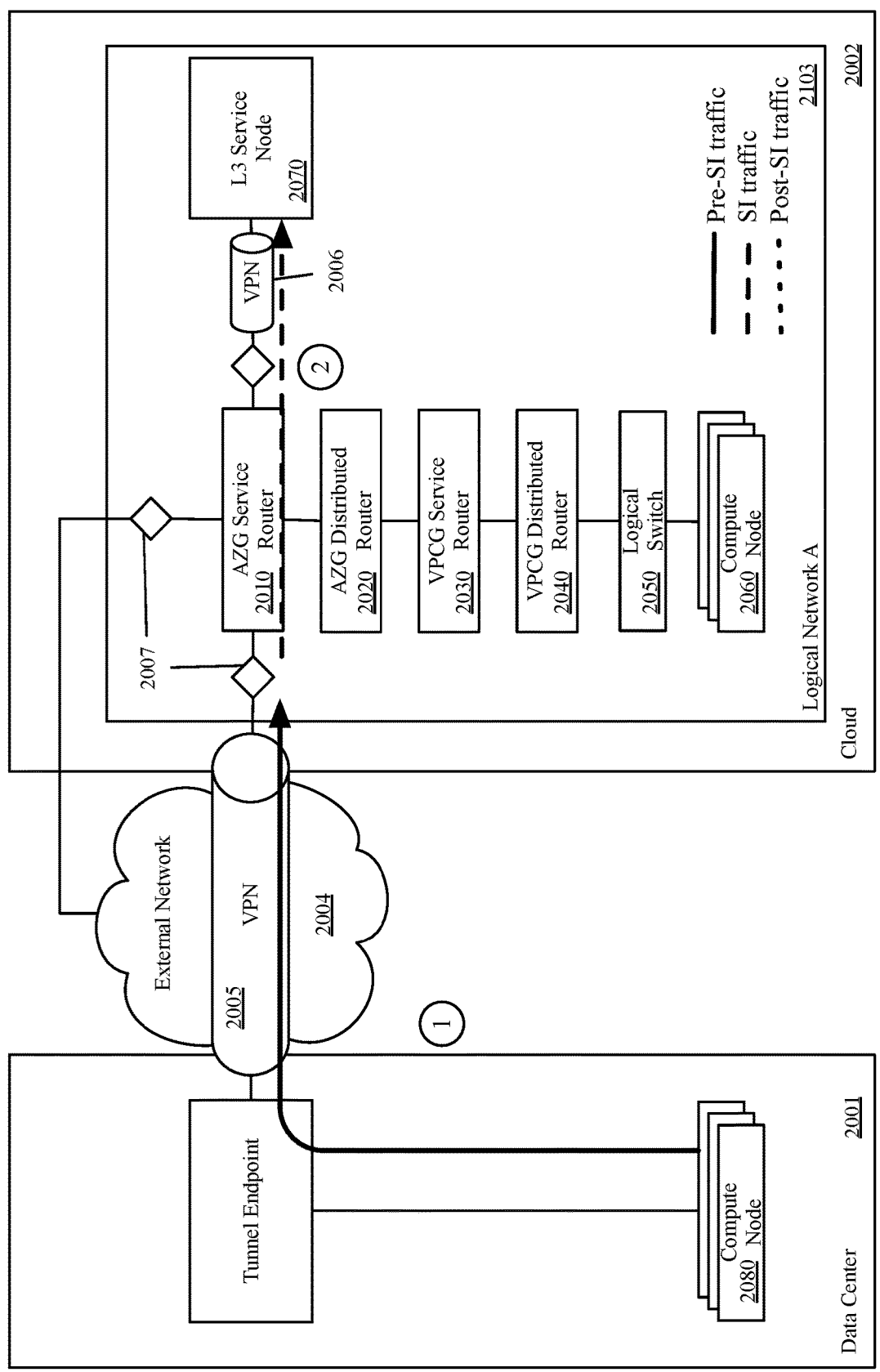
FIGS. 21A-B conceptually illustrate a data message being sent from a compute node in an external datacenter to a compute node in a logical network implemented in a cloud environment.
Figure 21B:
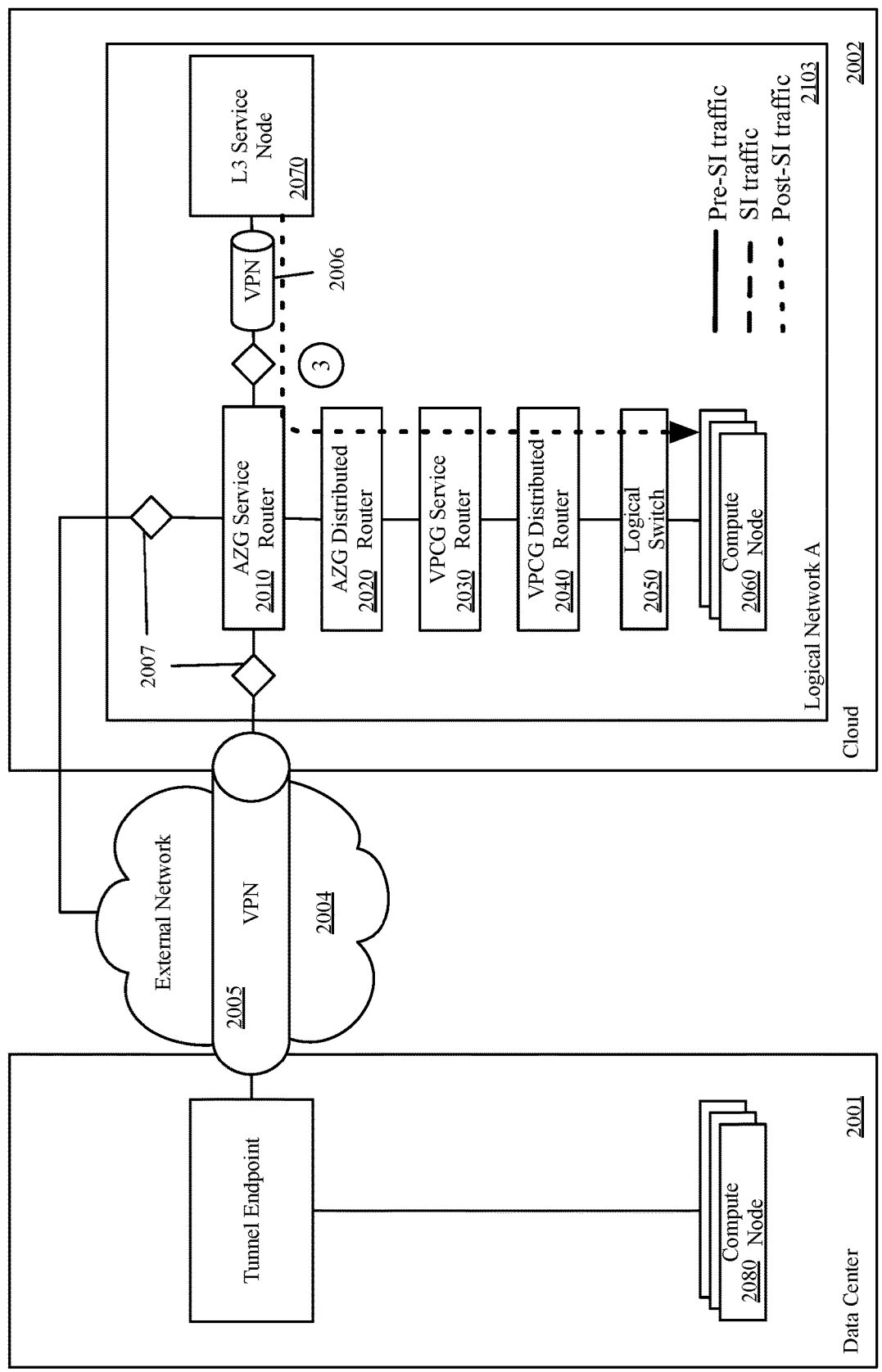

FIGS. 21A-B conceptually illustrate a data message being sent from a compute node 2080 in an external datacenter 2001 to a compute node 2060 in a logical network 2103 (e.g., logical network A) implemented in a cloud environment 2002. The components of FIGS. 20A-B and 21A-B are the same and if the data message sent in FIGS. 20A-B is considered a forward direction data message flow, then the data message sent in FIGS. 21A-B can be considered a reverse direction data message flow. The communication begins by having the compute node 2080 send a data message to the tunnel endpoint in data center 2001 that connects to the VPN 2005 (again ignoring the internal components of data center 2001). The data message is encapsulated (or encrypted and encapsulated) and is sent over external network 2004 using VPN 2005. The data message is then logically processed to arrive at the VTI and to undergo a processing pipeline of the VTI. The data message is unencapsulated and, if necessary, decrypted at which point the SI classifier 2007 performs a service classification operation to determine if any service is required for the data message.

The SI classifier 2007 determines that, based on a service insertion rule applied at the VTI, the data message requires a service that is provided by L3 service node 2070. The SI classifier identifies the VTI associated with VPN 2006 as the next hop towards the L3 service node 2070 and sends the data message for processing. The SI classifier sitting between the availability zone service router 2010 and VPN 2006 does not perform service classification operations on service insertion traffic and the data message arrives at the L3 service node 2070 which performs a service on the data message.

FIG. 21B illustrates the serviced data message being returned to the availability zone service router 2010 to be routed to the destination compute node 2060 through the elements of logical network 2103. Although shown as post-service insertion traffic from the L3 service node 2070, in some embodiments, marking the data message as serviced (i.e., post-SI) is done at the SI classifier sitting between VPN 2006 and availability zone service router 2010 based on a default rule that is the only SI rule applied at the SI classifier. In other embodiments, the marking is a part of the processing pipeline configured for each interface connecting to an L3 service node without a service classification operation. In some embodiments in which a tag is used to mark the data message as serviced, the availability zone service router 2010 processing removes the tag before forwarding the data message to the availability zone distributed router 2020. As discussed below in relation to FIG. 31, some embodiments require the serviced tag to cross logical router boundaries to avoid redundant service classification operations at a VPC service router. In other embodiments, marking the data message as serviced is a tag stored in local metadata associated with the data message and is deleted once the data message has completed processing for delivery to the next hop router component (e.g., the availability zone distributed router 2020). The data is then delivered to the compute node 2060 through the logical network including VPC service router 2030, VPC distributed router 2040, and logical switch 2050.

Figure 22:
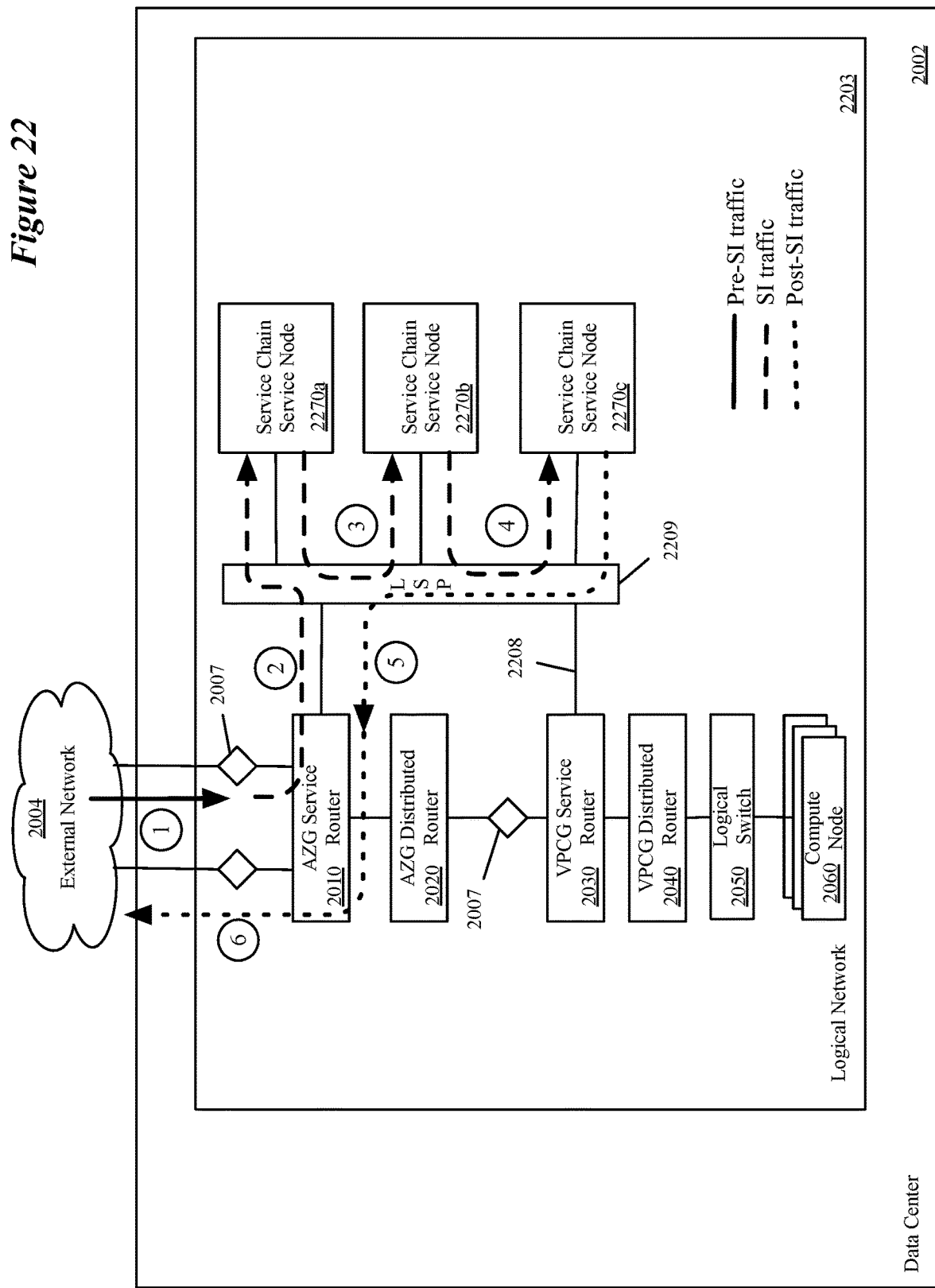
FIG. 22 conceptually illustrates a first method for providing services for data messages at an uplink interface in a set of uplink interfaces.

FIG. 22 conceptually illustrates a first method for providing services for data messages at an uplink interface in a set of uplink interfaces. In some embodiments, the data message is received from a source in the external network 2004 and is destined for a destination in the external network 2004, but requires services provided at the edge forwarding element of the logical network 2203. The services in the embodiment depicted in FIG. 22 are provided by service chain service nodes 2270a-c using a logical service forwarding plane transport mechanism (e.g., logical service forwarding element 2209). One of ordinary skill in the art will understand that alternative transport mechanisms are used in other embodiments. In the depicted embodiment, a data message arrives at a first uplink interface with an external network 2004, and a service classification operation occurs at SI classifier 2007 that determines, based on a service insertion rule that applies to the data message received at the uplink interface, that a set of services is required and identifies forwarding information (e.g., SPI, next hop MAC, etc. as described above) to access the required set of services.

The service classification operation, in the illustrated embodiment is provided before a routing operation of the availability zone service router 2010. Based on the identified forwarding information, the availability zone service router 2010 provides the data message to service chain service node 2270a to provide a first service to the data message and pass the data message along to a next hop in a service path (i.e., service chain service node 2270b). In some embodiments, the availability zone service router 2010 identifies a service chain service node functionality provided by the availability zone service router 2010 as a first hop that then routes the data message to the service chain service node 2270a. In either embodiment, after receiving the data message from service chain service node 2270a, service chain service node 2270b provides a next service in the service chain and provides the data message to service chain service node 2270c to provide an additional service and to identify the service chain service node functionality provided by the availability zone service router 2010 as the last hop in the service path. Each data message sent between service chain service nodes (e.g., SVMs) uses the logical service forwarding element 2209 and, in some embodiments, involves service proxies and service transport layer modules not shown here for the sake of clarity. The use of service proxies and service transport layer modules are described in more detail above in relation to FIG. 11 and in related U.S. patent application Ser. No. 16/444,826.

The serviced data message is then routed to a destination in the external network 2004 by the availability zone service router 2010. The routing identifies a second uplink interface with the external network 2004 and provides the serviced data message with a tag or metadata identifying the data message as a serviced data message. Based on the identification, the service classifier at the second uplink interface does not provide an additional service classification operation, and the data message is forwarded to the destination. As discussed above, in some embodiments using a tag to identify the data message as a serviced data message, the tag is removed before the data message is sent over the uplink interface.

Figure 23:
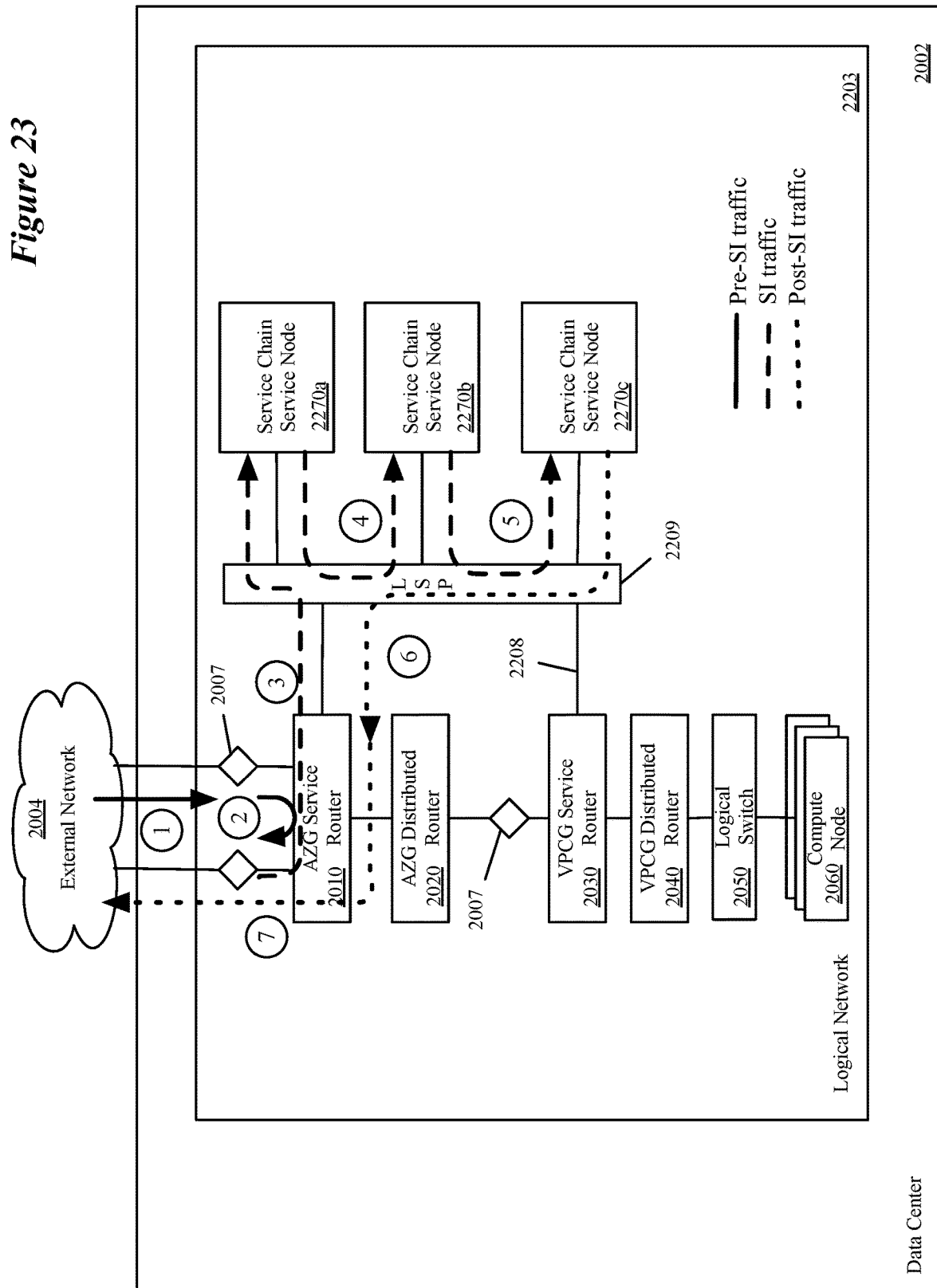
FIG. 23 conceptually illustrates a second method for providing services for data messages at an uplink interface in a set of uplink interfaces.

FIG. 23 conceptually illustrates a second method for providing services for data messages at an uplink interface in a set of uplink interfaces. In some embodiments, the data message is received from a source in the external network 2004 and is destined for a destination in the external network 2004, but requires services provided at the edge forwarding element of the logical network 2203. The services in the embodiment depicted in FIG. 23 are provided by service chain service nodes 2270a-c using a logical service forwarding plane transport mechanism (e.g., logical service forwarding element 2209). One of ordinary skill in the art will understand that alternative transport mechanisms are used in other embodiments. In the depicted embodiment, a data message arrives at a first uplink interface with an external network 2004, and a service classification operation at SI classifier 2007 fails to identify any required set of services as the service classification rule is defined only for data messages received (in either ingress or egress directions) for the second uplink interface. So, in this embodiment, the SI classifier for the first uplink interface provides the data message to availability zone service router 2010 with no service insertion forwarding information. The availability zone service router 2010 routes the data message to the second uplink interface based on a destination IP address of the data message and the SI classifier of the second uplink interface determines, based on a service insertion rule that applies to the data message received at the second uplink interface, that a set of services is required and identifies forwarding information (e.g., SPI, next hop MAC, etc. as described above) to access the required set of services. The rest of the data message processing proceeds as in FIG. 22 above.

Figure 24:
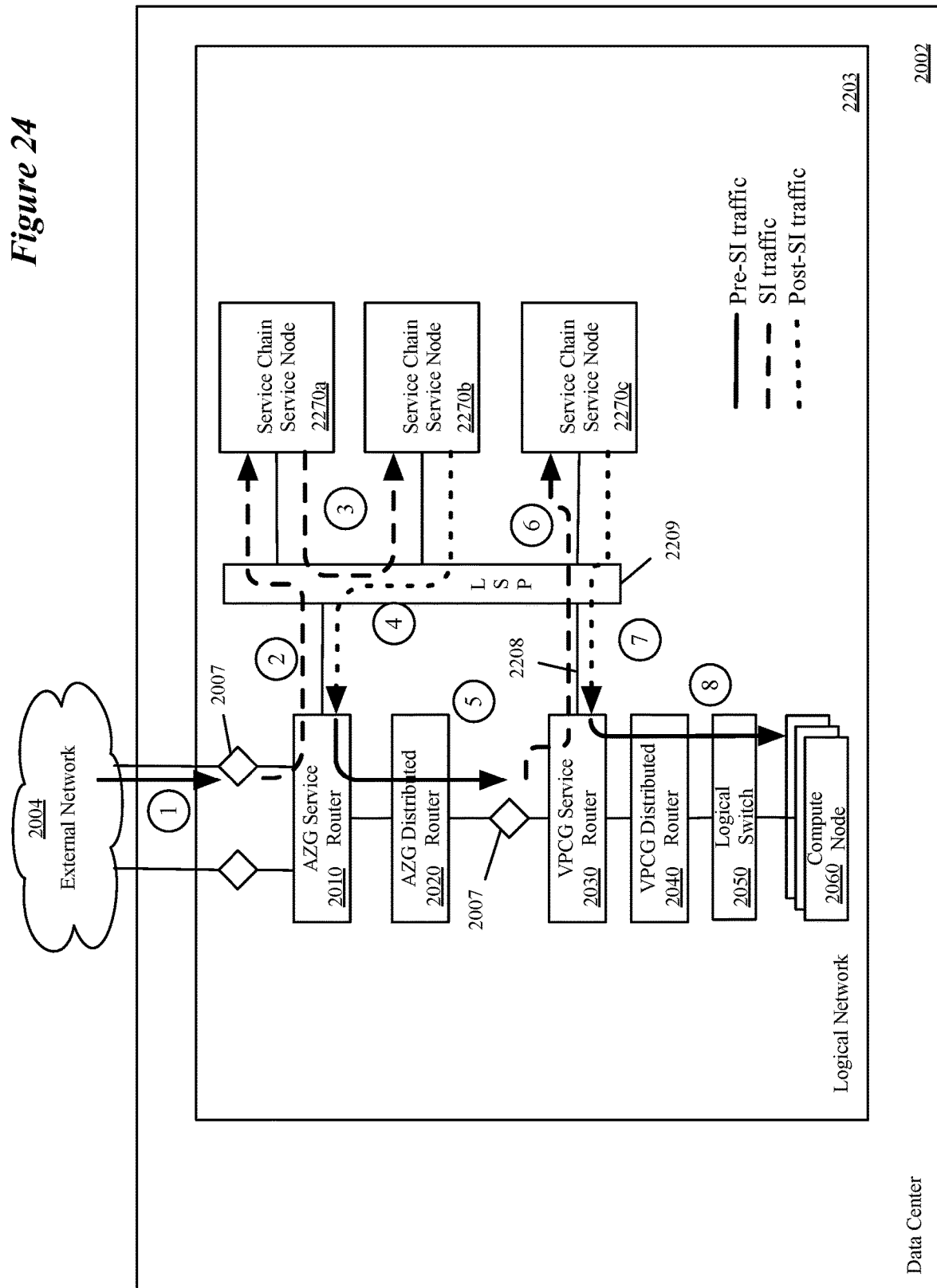
FIG. 24 conceptually illustrates a logical network that provides service classification operations at multiple routers of the logical network.

FIG. 24 conceptually illustrates a logical network 2203 that provides service classification operations at multiple routers of the logical network. As in FIG. 22, a first service classification operation performed before the availability zone service router 2010 identifies a set of services required by the data message. In this example, the set of services includes services provided by the service chain service nodes 2270a and 2270b. The availability zone service router 2010 router provides the data message to service chain service node 2270a as described above, which provides the service and provides the serviced data message to the service chain service node 2270b which provides an additional service and returns the data message to the availability zone service router 2010. In the illustrated embodiment, the availability zone service router 2010 removes a tag identifying the data message as a serviced data message and forwards the data message to VPC service router 2030 (through availability zone distributed router 2020).

Prior to being routed by VPC service router 2030, SI classifier 2007 associated with the VPC service router 2030 performs a service classification operation that determines, based on a service insertion rule that applies to the data message received at the VPC service router 2030 uplink interface, that a set of services is required and identifies forwarding information (e.g., SPI, next hop MAC, etc. as described above) to access the required set of services. The data message is provided to the VPC service router 2030 which uses the forwarding information to provide the data message to service chain service node 2270c which returns the serviced data message to the VPC service router 2030. The VPC service router 2030 then routes the serviced data message to the destination compute node 2060.

Figure 25:
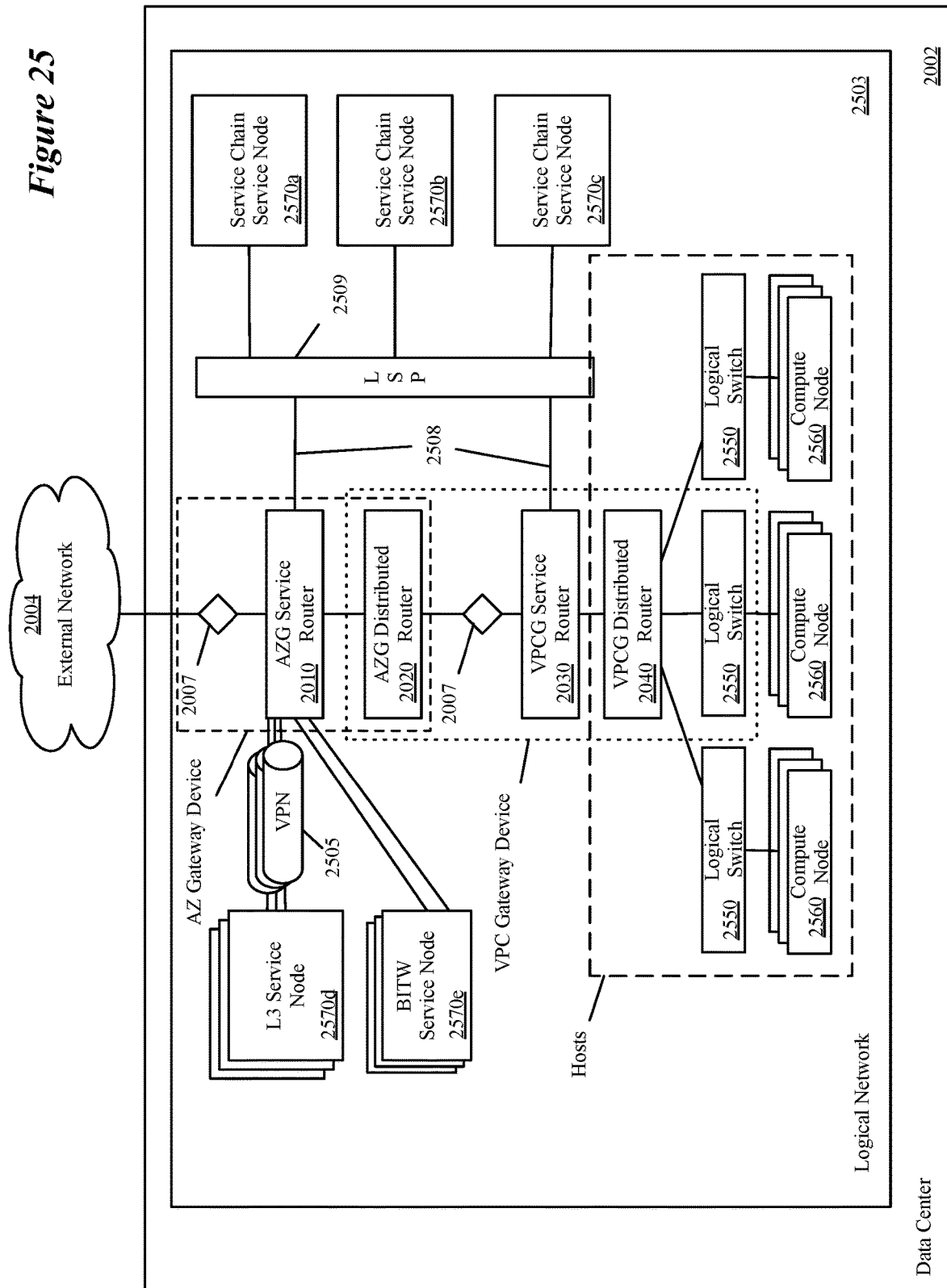
FIG. 25 conceptually illustrates an edge forwarding element connected to service nodes using multiple transport mechanisms.

FIG. 25 conceptually illustrates an edge forwarding element (AZG service router 2010) connected to service nodes 2570a-e using multiple transport mechanisms. Logical network 2503 includes the same logical edge forwarding elements as FIGS. 20A-B: availability zone service router 2010, availability zone distributed router 2020, VPC service router 2030, and VPC distributed router 2040. In some embodiments, the different router components are each defined as a separate VRF context. Dashed and dotted line boxes in FIG. 25 indicate edge devices that implement different edge forwarding element components. In the illustrated embodiment, different edge devices implement availability zone and VPC service routers, however the availability zone distributed router is implemented by both an availability zone edge device and a VPC edge device for ingress and egress data messages respectively, as explained in relation to FIG. 10. Similarly, VPC distributed router 2040 is implemented by both the VPC edge device and the hosts for ingress and egress data messages respectively. As shown, availability zone service router 2010 connects to (1) a set of service chain service nodes 2570a-c over a logical service forwarding plane (or logical service plane (LSP)) 2509 through a service link 2508, (2) a set of L3 service nodes 2570d through a set of VPNs 2505, and (3) a set of L2 BIW service nodes 2570e through a set of interfaces. The availability zone service router 2010 uses the service nodes to provide services as described above in relation to FIGS. 11, 12, 18, and 19. Because different data messages require different services provided by different types of service nodes, some embodiments provide services using multiple service transport mechanisms to access the different types of service nodes as shown in FIG. 25.

Figure 26:
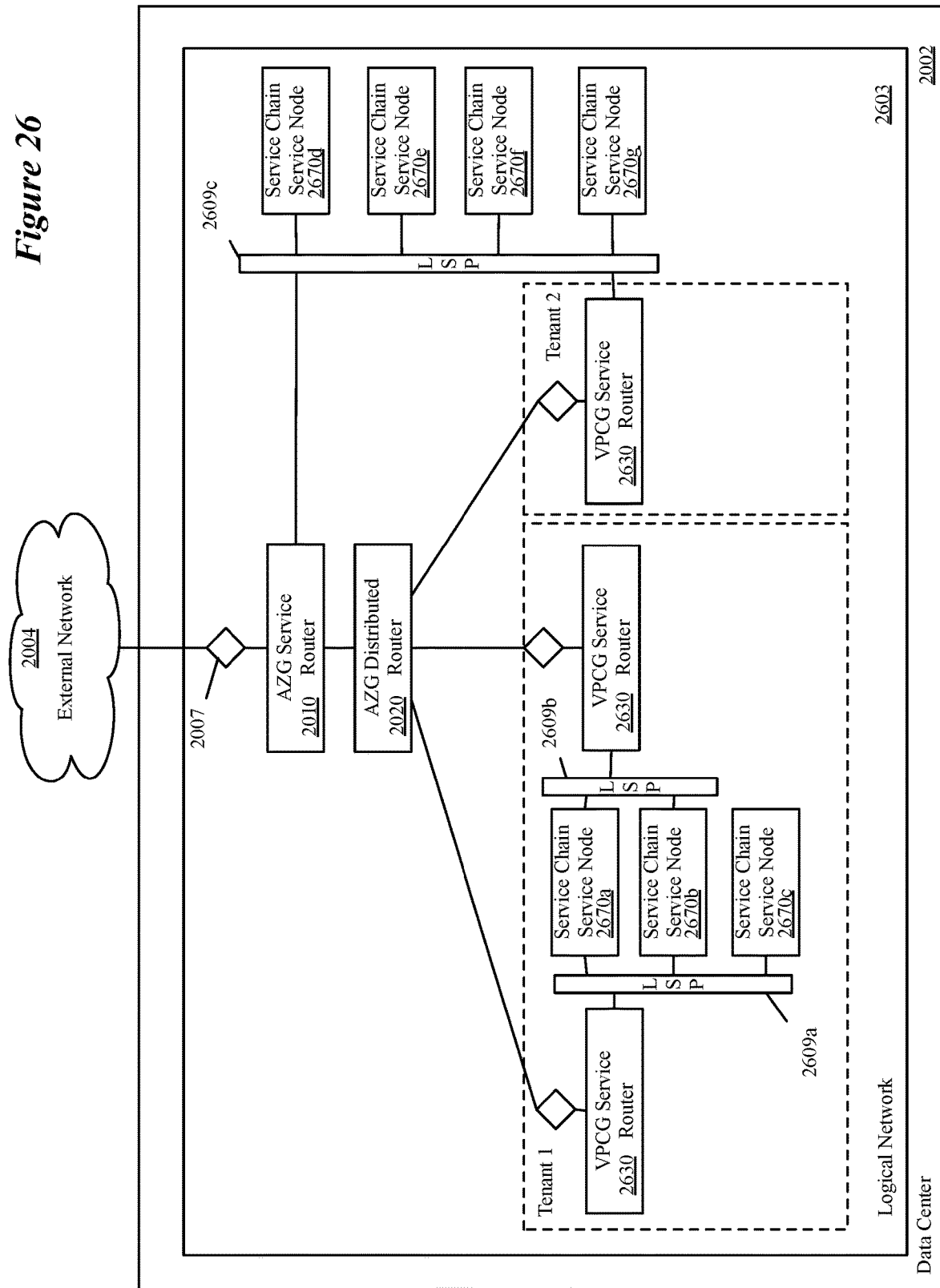
FIG. 26 illustrates a logical network including three VPC service routers 2630 belonging to two different tenants.
Figure 27:
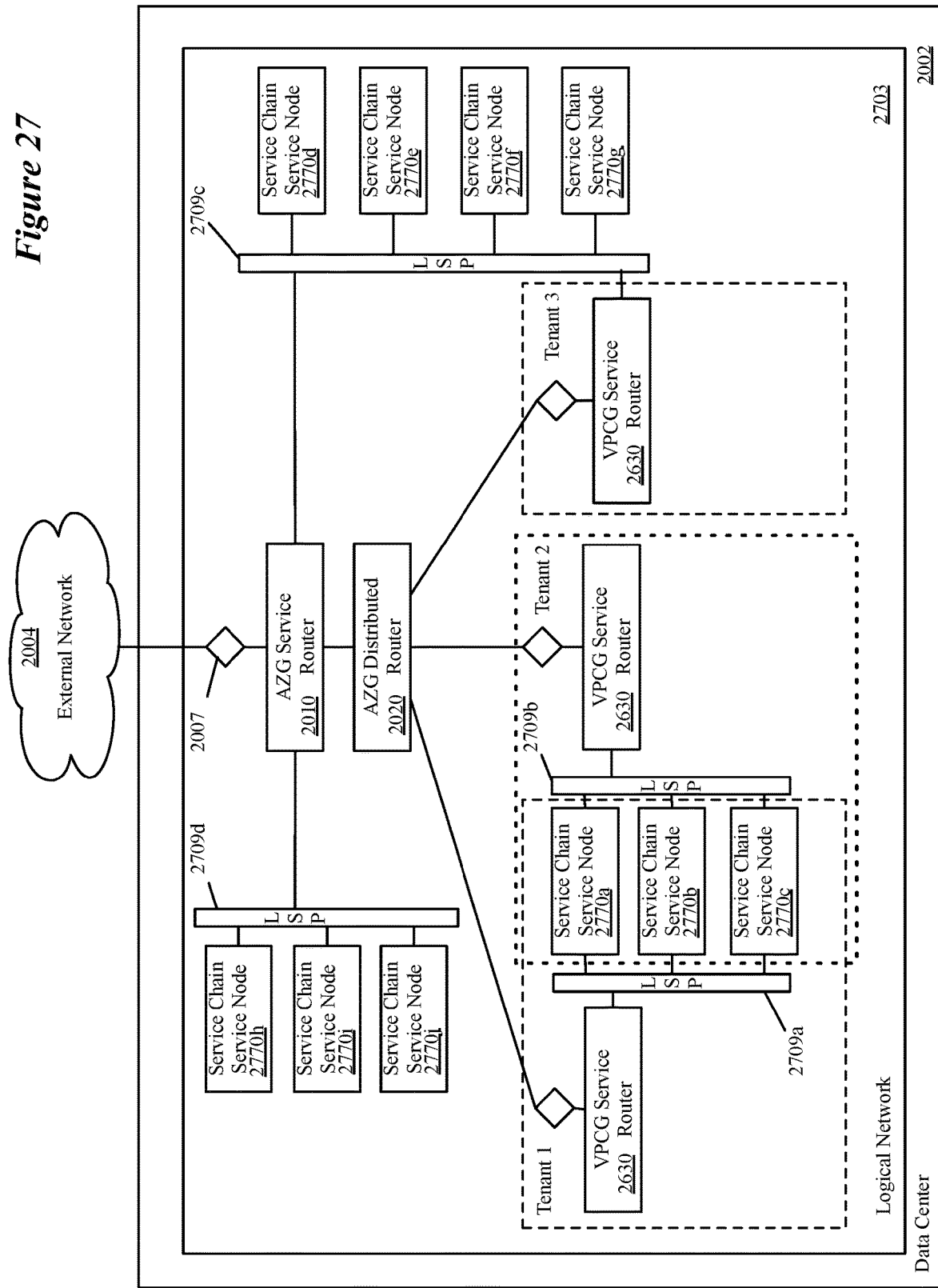
FIG. 27 illustrates a logical network including three VPC service routers 2630 belonging to three different tenants.

FIGS. 26 and 27 conceptually illustrate logical networks in which multiple logical service forwarding planes are configured for different service routers. FIG. 26 illustrates a logical network 2603 including three VPC service routers 2630 belonging to two different tenants. Logical network 2603 also illustrates three logical service forwarding planes 2609a-c connected to the VPC service routers 2630 one of which (2609c) also connects to an availability zone service router 2010. The different logical service forwarding planes 2609a-c connect to different sets of service chain service nodes. In the embodiment of FIG. 26, the service chain service nodes 2670a-c are used by VPC service routers 2630 of Tenant 1 while the service chain service nodes 2670d-g are shared by availability zone service router 2010 and VPC service router 2630 of Tenant 2.

FIG. 27 illustrates a logical network 2703 including three VPC service routers 2630 belonging to three different tenants. Logical network 2703 also illustrates four logical service forwarding planes 2709a-c connected to the VPC service routers 2630 one of which (2709c) also connects to an availability zone service router 2010 and a logical service forwarding plane 2709d that is a second logical service forwarding plane that connects only to the availability zone service router 2010. Logical service forwarding planes 2709a and 2709b connect to a common set of service chain service nodes (2770a-c) while logical service forwarding planes 2709c and 2709d connect to distinct sets of service chain service nodes. In the embodiment of FIG. 27, the service chain service nodes 2770a-c are used by VPC service routers 2630 of both Tenant 1 and Tenant 2. While the shared service chain nodes 2770a-c are used by two different tenants, the data message traffic for each tenant is kept separate by using different logical service forwarding planes 2709a and 2709b. As in FIG. 26, the service chain service nodes 2770d-g are shared by availability zone service router 2010 and VPC service router 2630 of Tenant 3. However, in FIG. 27 the availability zone service router 2010 has a second logical service forwarding plane 2709d to which it connects that is not shared by a VPC service router 2630. As discussed below in relation to FIGS. 30 and 31 below, the service chain service nodes 2770h-j, in some embodiments, are accessible to the VPC service router 2630 of Tenant 3 if the availability zone service router 2010 is configured to provide a L3 routing service as a service chain service node.

Figure 28:
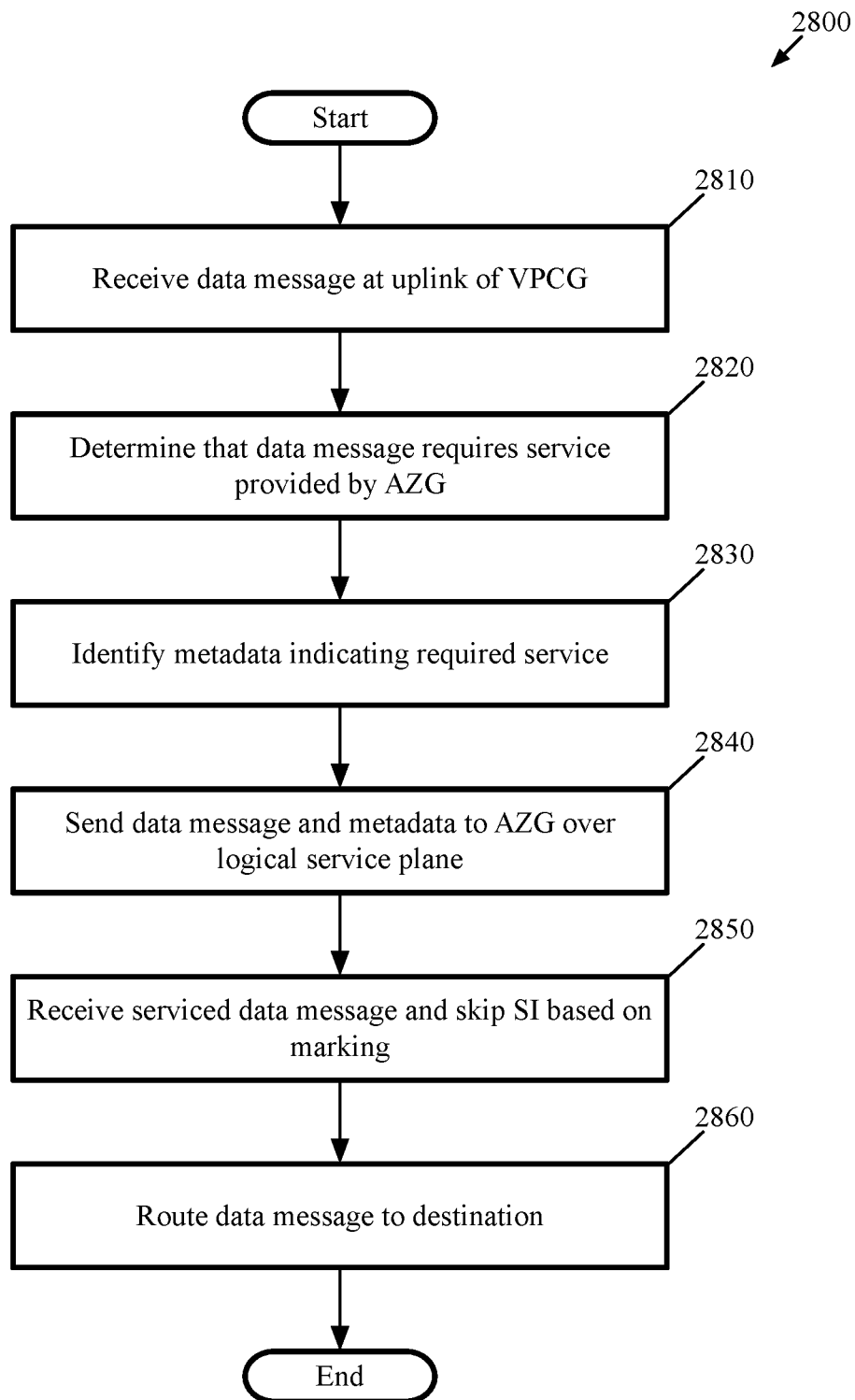
FIG. 28 conceptually illustrates a process for accessing services provided at an availability zone edge forwarding element from a VPC edge forwarding element.

FIG. 28 conceptually illustrates a process for accessing services provided at an availability zone edge forwarding element from a VPC edge forwarding element. Process 2800, in some embodiments, is performed by a VPC edge forwarding element (e.g., a VPC service router). In some embodiments, the process is performed by a service classification operation of the VPC edge forwarding element. The process 2800 begins by receiving (at 2810) a data message at an uplink interface of the VPC service router. In some embodiments, the data message is received from the VPC service router after a routing operation of the VPC service router, while in other embodiments, the data message is received from an availability zone distributed router.

The service classification operation determines (at 2820) that the data message requires a service provided at the availability zone service router. In some embodiments, the service classification operation performs the operations of process 100 to determine that the data message requires the service and to identify (at 2830) forwarding data for the data message. The forwarding information identified for the data message, in some embodiments, includes service metadata (SMD) used to send the data message over a logical service forwarding plane to the availability zone service router and additional service metadata for directing the availability zone service router to redirect the data message to a particular service node or set of service nodes. In some embodiments, the additional service metadata takes the form of arguments of a function call to a function exposed at the availability zone service router.

Figure 29:
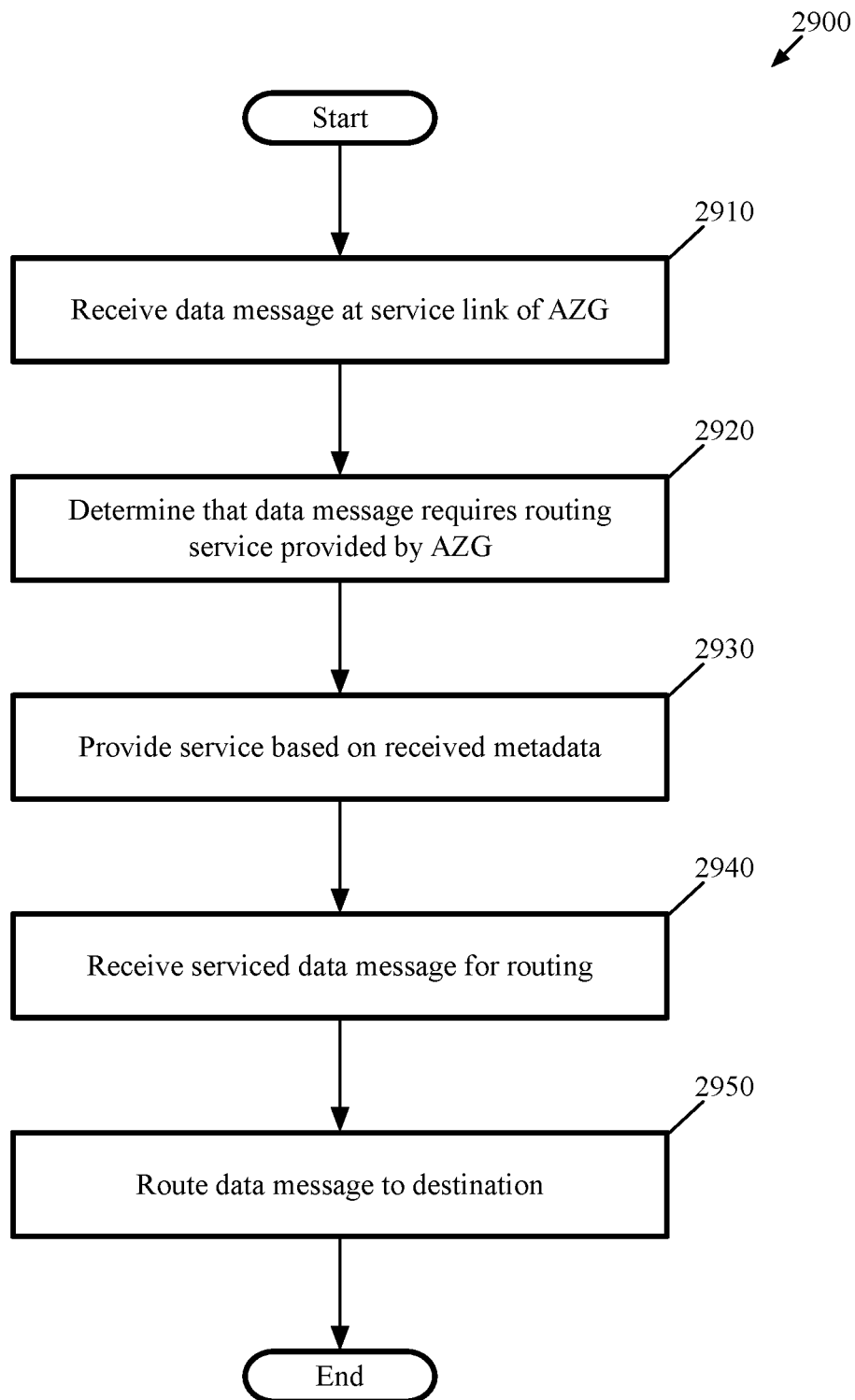
FIG. 29 conceptually illustrates a process for the availability zone service router to perform when it receives a data message from the VPC service router as part of process.

The data message is then sent (at 2840) to the availability zone service router over the logical service forwarding plane along with the service metadata identifying the required additional services. FIG. 29 conceptually illustrates a process 2900 for the availability zone service router to perform when it receives a data message from the VPC service router as part of process 2800. Process 2900 begins by receiving (at 2910) the data message sent (at 2840) from the VPC service router to be serviced. The data message is received over the logical service forwarding plane at a service link of the availability zone service router.

Once the data message is received by the availability zone service router, the availability zone service router determines (at 2920) that the data message requires a routing service to at least one additional service node. In some embodiments, the determination is made based on the additional metadata provided by the VPC service router, while in other embodiments, the determination is made based on an argument of a function call to a function (e.g., an API) made available at the availability zone service router.

Once the determination that the data message requires a routing service to at least one additional service node is made (at 2920), the availability zone service router provides (at 2930) the service based on the received metadata. In some embodiments, the service is provided by the service node functionality of the service router and the service is provided without redirection. In other embodiments, the service is provided by a set of service nodes reachable through one of the transport mechanisms described above and the data message is redirected to the service node using the appropriate transport mechanism. Once the data message is redirected to the service node, the process proceeds much like the process of FIG. 11, 12, 18, or 19 depending on the transport mechanism used to redirect the data message.

The serviced data message is received at the availability zone service router (at 2940) and is marked as a serviced data message. As mentioned above, in this embodiment, an identification of the data message as being serviced must be carried through the availability zone service router and distributed router so that the SI classifier of the VPC service router does not apply the same service insertion rule and redirect the data message to the same destination and get stuck in a loop. In embodiments in which the availability zone service router and the VPC service router are implemented in a same edge device, metadata identifying the data message as serviced is stored in a shared metadata storage that is used by the VPC service router SI classifier to identify a data message as serviced.

The data message is then routed (at 2950) to the destination. In some embodiments, the data message is routed to an external destination or a VPC service router that is different than the VPC service router without being returned to the VPC service router that sent the data message to the availability zone service router. In other embodiments, for data messages that were originally destined to a compute node in the network segment reached through the VPC service router (e.g., a southbound data message) the data message is routed to the VPC service router from which the data message was received. After routing the data message, the process 2900 ends. In an embodiment in which the data message is routed towards the VPC service router from which the data message was received, the process 2800 receives (at 2850) the serviced data message identified as a serviced data message and the SI classifier does not perform a service classification operation based on the marking. The data message is then received at the VPC service router and is routed to the data message's destination.

Figure 30:
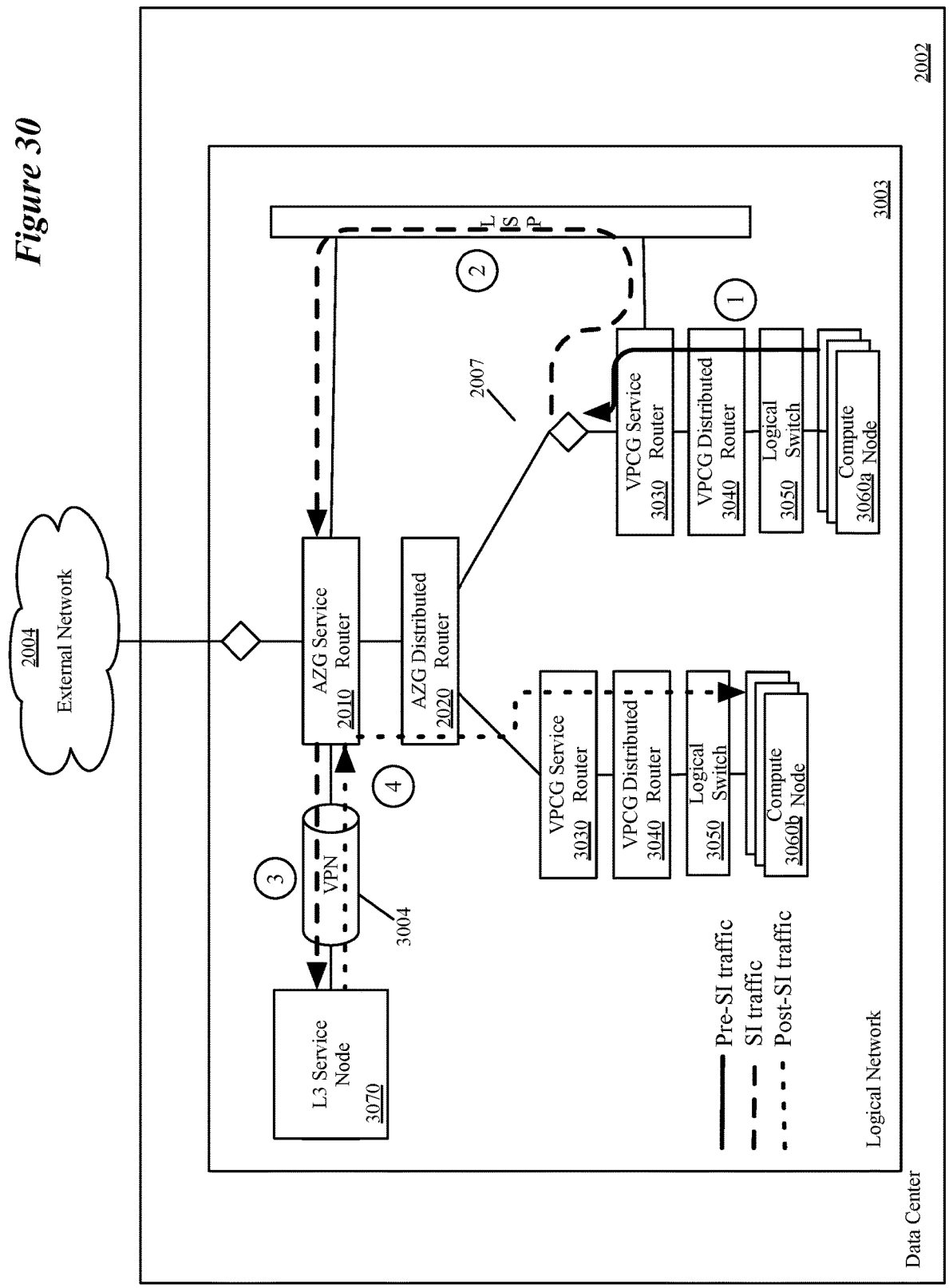
FIG. 30 conceptually illustrates a VPC service router processing a data message sent from a first compute node to a second compute node in a second network segment served by a second VPC service router.

FIG. 30 conceptually illustrates a VPC service router 3030 processing a data message sent from a first compute node 3060a to a second compute node 3060b in a second network segment served by a second VPC service router 3030. The data message is processed through the logical switch 3050 connected to the source compute node 3060a, the VPC distributed router 3040, and the VPC service router 3030 before encountering a SI classifier 2007 that determines, as described above in relation to FIG. 28, that the data message should be sent to the availability zone service router 2010 for having a service provided by L3 service node 3070. The data message is then sent over the logical service forwarding plane to the availability zone service router 2010 which redirects the direction to the identified service node (e.g., L3 service node 3070). The data message is then returned to the availability zone service router 2010 and routed to compute node 3060b as described above.

In some embodiments, sending the data message to the availability zone service router 2010 using the logical service forwarding plane includes sending the data message through a layer 2 interface 3005 of a software switch executing on the same device as the service router. The software switch is used to implement the logical service forwarding element (e.g., LSFE 801) represented by LSP 3009. In some embodiments, the connection to the AZG service router 2010 is mediated by a service proxy implemented by the AZG service router 2010 to comply with industry standard service insertion protocols.

FIG. 31 conceptually illustrates a VPC service router 3030 processing a data message sent from an external network 2004 to a compute node 3060. The data message is processed through the availability zone service router 2010 and the availability zone distributed router 2020 before encountering a SI classifier 2007 that determines, as described above in relation to FIG. 28, that the data message should be sent to the availability zone service router 2010 for having a service provided by L3 service node 3070. The data message is then returned to the availability zone service router 2010 and routed to compute node 3060. In routing the data message to the compute node 3060, the data message traverses the SI classifier 2007, but no service classification operation is performed because the serviced data message is identified as a serviced data message that does not require a service classification operation. The data message is then processed through the VPC service router 3030, the VPC distributed router 3040, and the logical switch 3050 and delivered to the destination compute node 3060.

Some embodiments facilitate the provision of a service reachable at a virtual internet protocol (VIP) address. The VIP address is used by clients to access a set of service nodes in the logical network. In some embodiments, data messages from client machines to the VIP are directed to an edge forwarding element at which the data messages are redirected to a load balancer that load balances among the set of service nodes to select a service node to provide a service requested by the client machine. The load balancer, in some embodiments, does not change the source IP address of the data message received from the client machine so that the service node receives a data message to be serviced that identifies the client machine IP address as a source IP address. The service node services the data message and sends the serviced data message to the client machine using the IP address of the service node as a source IP address and the IP address of the client node as the destination IP address. Because the client sent the original address to the VIP address, the client will not recognize the source IP address of the serviced data message as being a response to the request sent to the VIP address and the serviced data message will not be processed appropriately (e.g., it will be dropped, or not associated with the original request).

Facilitating the provision of the service, in some embodiments, includes returning the serviced data message to the load balancer to track the state of the connection using the service logical forwarding element. To use the service logical forwarding element, some embodiments configure an egress datapath of the service nodes to intercept the serviced data message before being forwarded to a logical forwarding element in the datapath from the client to the service node, and determine if the serviced data message requires routing by the routing service provided as a service by the edge forwarding element. If the data message requires routing by the routing service (e.g., for serviced data messages), the serviced data message is forwarded to the edge forwarding element over the service logical forwarding element. In some embodiments, the serviced data message is provided to the edge forwarding element along with the VIP associated with the service, in other embodiments, the edge forwarding element determines the VIP based on a port used to send the data message over the service logical forwarding element. The VIP is used by the edge forwarding element to identify the load balancer associated with the serviced data message.

The serviced data message is then forwarded to the load balancer for the load balancer to maintain state information for the connection to which the data message belongs and modify the data message to identify the VIP as the source address for forwarding to the client.

Figure 32A:
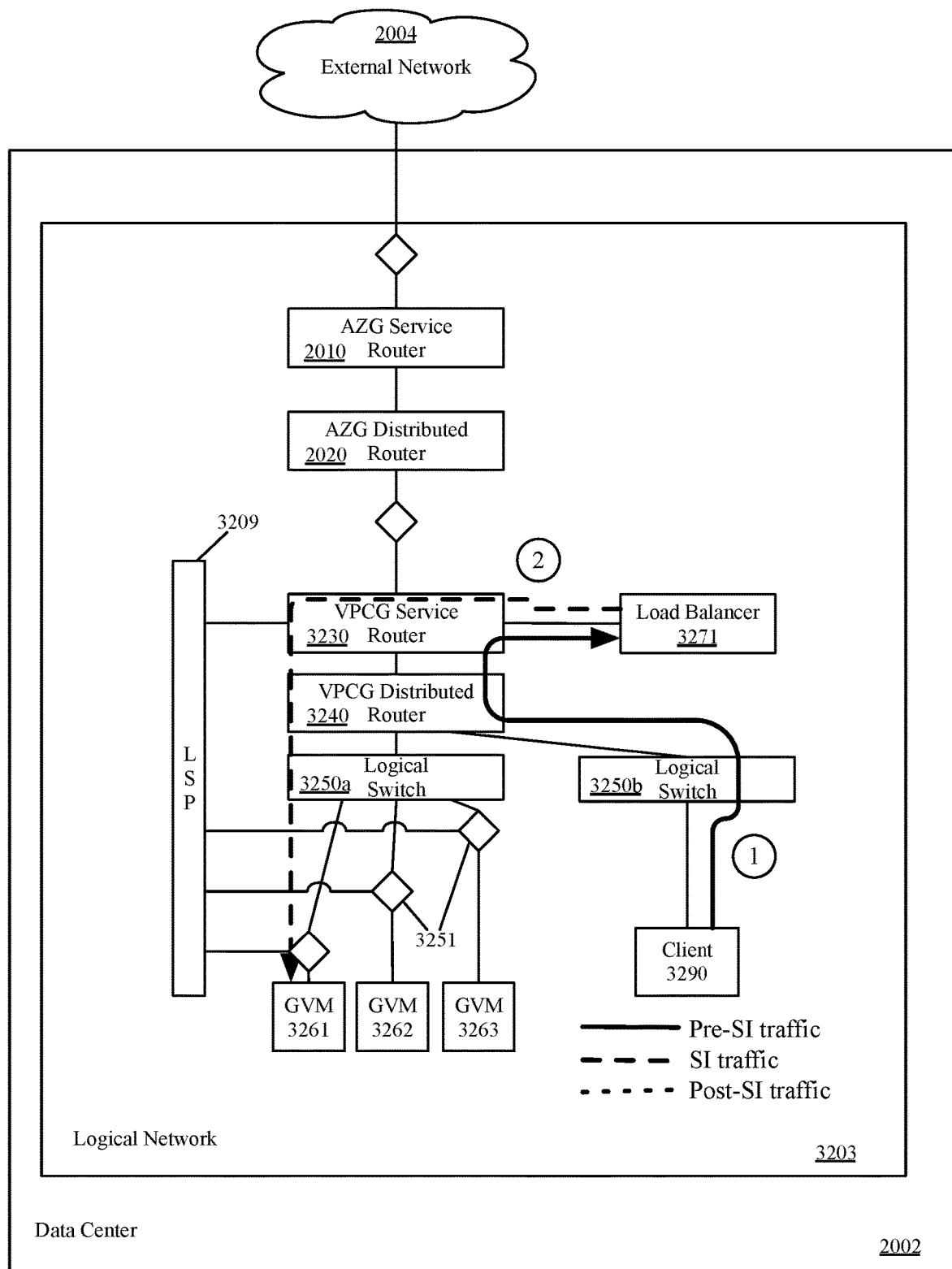
FIGS. 32A-B illustrates a set of data messages for providing a service addressable at a VIP to a client served by a same virtual private cloud gateway (e.g., a virtual private cloud gateway service and distributed router).
Figure 32B:
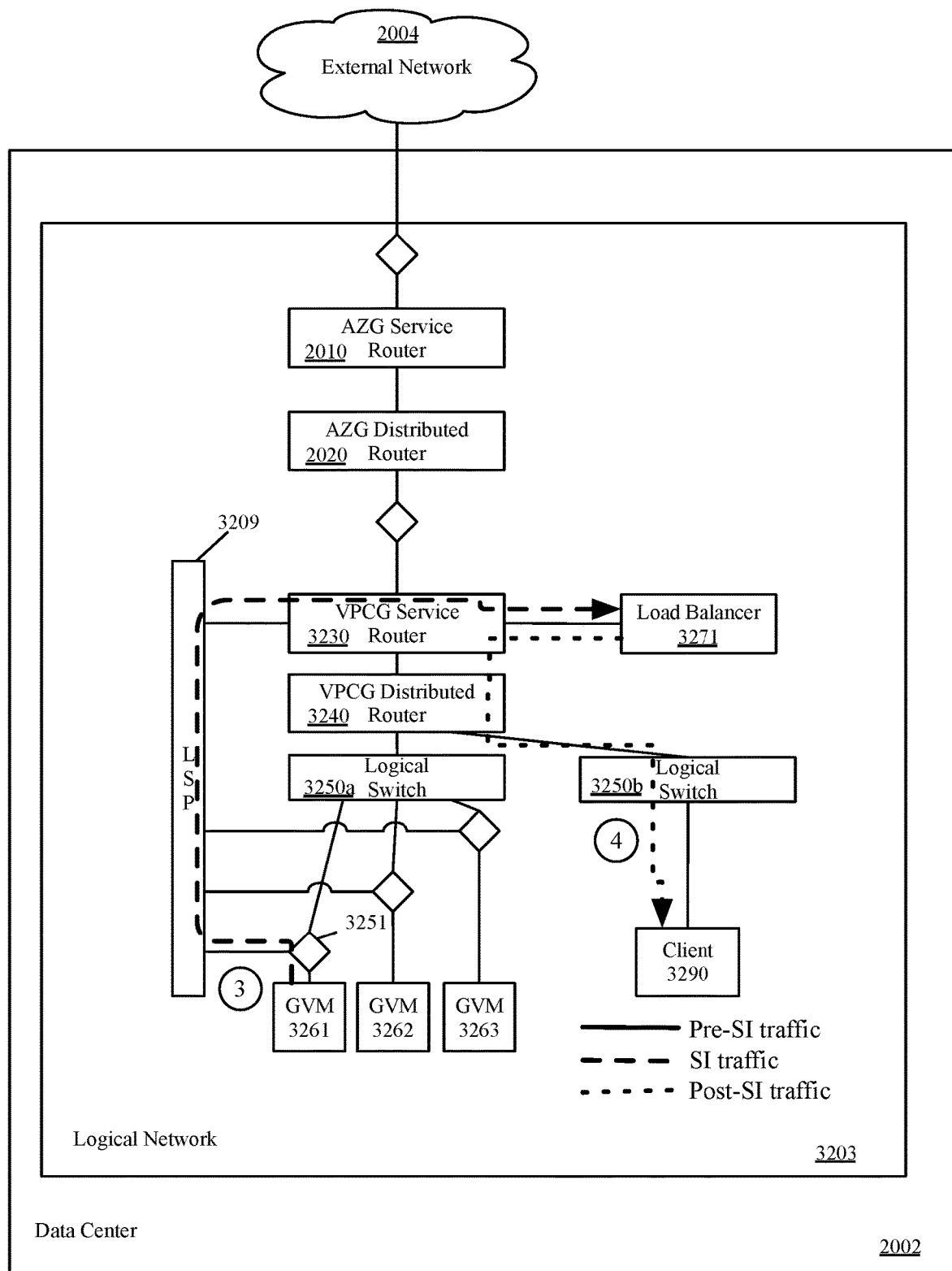

FIGS. 32A-B illustrate a set of data messages for providing a service addressable at a VIP to a client served by a same virtual private cloud gateway (e.g., a VPCG service and distributed router). FIG. 32A illustrates a logical network 3203 including two logical switches 3250a and 3250b serviced by a same VPC service router 3230. Logical switch 3250a connects to a set of guest virtual machines (GVMs) 3261-3263 that provide a service reachable at a virtual IP (VIP) address. In some embodiments, the GVMs provide content instead of providing a service. Logical switch 3250b connects to client 3290 that accesses the services available at the VIP. FIG. 32A illustrates a first data message sent from the client 3290 to the VIP address. The data message is forwarded to the VPC service router 3230 which identifies a load balancer 3271 as the next hop for the VIP address. The load balancer 3271 then performs a load balancing operation to select a GVM 3261 from the set of GVMs 3261-3263. The load balancer 3271 changes the destination IP address from the VIP to the IP address of the selected GVM 3261.

FIG. 32B illustrates the GVM 3261 returning the serviced data message to the client device 3290. The serviced data message is intercepted at a service insertion (SI) pre-processor as described in U.S. patent application Ser. No. 16/444,826 that redirects the data message over the logical service forwarding plane 3209 to the VPC service router. In some embodiments, the pre-processor is configured to redirect all data messages over the logical service forwarding plane to the VPC service router. The serviced data message, in some embodiments, is sent to the VPC service router along with metadata identifying the VIP to which the data message was originally sent. In other embodiments, the VPC service router identifies a destination for the data message based on attributes of the data messages (e.g., a port, or source address). The VPC service router 3230 routes the data message to the load balancer 3271. The load balancer 3271, in some embodiments, stores state information for the data message flow which it uses to update a source IP Address to be the VIP address and send the data message to the client 3290 with a source IP address that is recognized by the client 3290.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 33:
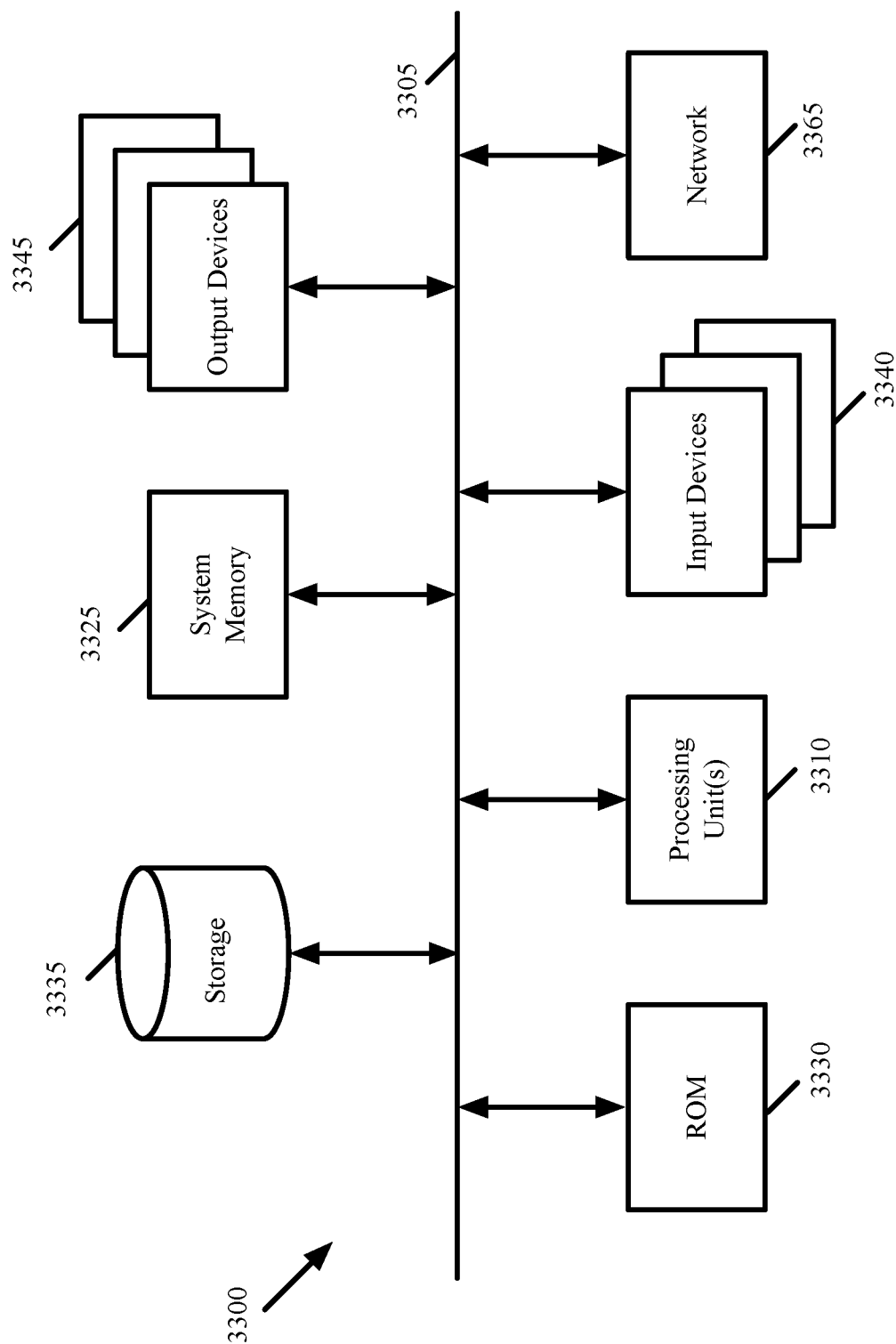
FIG. 33 conceptually illustrates an electronic system with which some embodiments of the invention are implemented.

FIG. 33 conceptually illustrates a computer system 3300 with which some embodiments of the invention are implemented. The computer system 3300 can be used to implement any of the above-described hosts, controllers, and managers. As such, it can be used to execute any of the above described processes. This computer system includes various types of non-transitory machine readable media and interfaces for various other types of machine readable media. Computer system 3300 includes a bus 3305, processing unit(s) 3310, a system memory 3325, a read-only memory 3330, a permanent storage device 3335, input devices 3340, and output devices 3345.

The bus 3305 collectively represents all system, peripheral, and chipset buses that communicatively connect the numerous internal devices of the computer system 3300. For instance, the bus 3305 communicatively connects the processing unit(s) 3310 with the read-only memory 3330, the system memory 3325, and the permanent storage device 3335.

From these various memory units, the processing unit(s) 3310 retrieve instructions to execute and data to process in order to execute the processes of the invention. The processing unit(s) may be a single processor or a multi-core processor in different embodiments. The read-only-memory (ROM) 3330 stores static data and instructions that are needed by the processing unit(s) 3310 and other modules of the computer system. The permanent storage device 3335, on the other hand, is a read-and-write memory device. This device is a non-volatile memory unit that stores instructions and data even when the computer system 3300 is off. Some embodiments of the invention use a mass-storage device (such as a magnetic or optical disk and its corresponding disk drive) as the permanent storage device 3335.

Other embodiments use a removable storage device (such as a flash drive, etc.) as the permanent storage device. Like the permanent storage device 3335, the system memory 3325 is a read-and-write memory device. However, unlike storage device 3335, the system memory is a volatile read-and-write memory, such a random access memory. The system memory stores some of the instructions and data that the processor needs at runtime. In some embodiments, the invention's processes are stored in the system memory 3325, the permanent storage device 3335, and/or the read-only memory 3330. From these various memory units, the processing unit(s) 3310 retrieve instructions to execute and data to process in order to execute the processes of some embodiments.

The bus 3305 also connects to the input and output devices 3340 and 3345. The input devices enable the user to communicate information and select commands to the computer system. The input devices 3340 include alphanumeric keyboards and pointing devices (also called "cursor control devices"). The output devices 3345 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 33, bus 3305 also couples computer system 3300 to a network 3365 through a network adapter (not shown). In this manner, the computer can be a part of a network of computers (such as a local area network ("LAN"), a wide area network ("WAN"), or an Intranet, or a network of networks, such as the Internet. Any or all components of computer system 3300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Even though the service insertion rules in several of the above-described examples provide service chain identifiers, some of the inventions described herein can be implemented by having a service insertion rule provide the service identifiers (e.g., SPIs) of the different services specified by the service insertion rule. Similarly, several of the above-described embodiments perform distributed service routing that relies at each service hop identifying a next service hop by performing an exact match based on the SPI/SI values. However, some of the inventions described herein can be implemented by having the service insertion pre-processor embed all the service hop identifiers (e.g., service hop MAC addresses) as the data message's service attribute set and/or in the data message's encapsulating service header.

In addition, some embodiments decrement the SI value differently (e.g., at different times) than the approaches described above. Also, instead of performing the next hop lookup just based on the SPI and SI values, some embodiments perform this lookup based on the SPI, SI and service direction values as these embodiments use a common SPI value for both the forward and reverse directions of data messages flowing between two machines.

The above-described methodology is used in some embodiments to express path information in single tenant environments. Thus, one of ordinary skill will realize that some embodiments of the invention are equally applicable to single tenant datacenters. Conversely, in some embodiments, the above-described methodology is used to carry path information across different datacenters of different datacenter providers when one entity (e.g., one corporation) is a tenant in multiple different datacenters of different providers. In these embodiments, the tenant identifiers that are embedded in the tunnel headers have to be unique across the datacenters, or have to be translated when they traverse from one datacenter to the next. Thus, one of ordinary skill in the art would understand that the invention is not to be limited by the foregoing illustrative details, but rather is to be defined by the appended claims

We claim:

1. A method for providing services at an edge forwarding element that is at a boundary of a tenant network in a public cloud, the method comprising:

defining, for the edge forwarding element, a plurality of virtual tunnel interfaces (VTIs), each to serve as a tunnel endpoint for a virtual private network (VPN) connection;

identifying a first VTI from the plurality of the VTIs to perform a service insertion operation for a set of services; and configuring the first VTI to perform the service insertion operation for data messages received at the first VTI and to direct a set of the received data messages to a second VTI to receive a service in the set of services, without configuring the second VTI to perform the service insertion operation for the set of services in order to avoid having the second VTI identify a service in the set of services for the same received data message.

2. The method of claim 1, wherein the second VTI is connected to a service node that performs the service in the set of services and returns serviced data messages to the second VTI.

3. The method of claim 2, wherein the second VTI directs the serviced data messages to the first VTI to be forwarded to the destination of the serviced data messages.

4. The method of claim 3, wherein the second VTI is configured to perform a marking operation for serviced data messages received from the service node, the marking operation identifying the serviced data messages as having had the service provided in order to avoid the first VTI performing the service insertion operation a second time.

5. The method of claim 1, wherein the first VTI is a first endpoint for a VPN implemented using an internet protocol security (IPsec) protocol.

6. The method of claim 5, wherein using the IPsec protocol comprises receiving encrypted data messages at the first VTI, and the first VTI performs the service insertion operations after data messages are decrypted.

7. The method of claim 1, wherein the service insertion operation performed by the first VTI comprises:
- identifying a service insertion rule that applies to the set of received data messages,
  - wherein the identified service insertion rule applies to the set of received data messages because a set of data message attributes of the set of received data messages match a set of data message attributes specified in the identified service insertion rule, and
  - wherein the identified service insertion rule is included in a set of service insertion rules identified as applying at the first VTI; and
- identifying, based on the identified service insertion rule, (1) the service in the set of services required by the set of received data messages and (2) the second VTI as a next hop to which to direct the data messages to receive the service.

8. The method of claim 1, wherein the first VTI is further configured to direct each of a different set of data messages to a different interface in the plurality of VTIs of the edge forwarding element to be provided a particular set of services in the set of services.

9. The method of claim 8, wherein the plurality of VTIs of the edge forwarding element comprises a third VTI.

10. The method of claim 8, wherein the plurality of VTIs of the edge forwarding element comprises an interface connected to a logical service forwarding plane that connects to the edge forwarding element to a plurality of service nodes that provide a plurality of service in the set of services.

11. The method of claim 8, wherein the plurality of VTIs of the edge forwarding element comprises a set of two interfaces that connect to a service node that provides a particular service, and a set of source and destination data link layer addresses is the same for a serviced data message received from the service node and for the data message sent to the service node over one of the interfaces in the plurality of VTIs.

12. A method for providing services at an edge forwarding element with a plurality of associated virtual tunnel interfaces (VTIs) that is at a boundary of a logical network, the method comprising:
- at the edge forwarding element:
  - performing a service insertion operation for a set of services on a data message received at the first VTI that identifies a second VTI to receive the data message in order to forward the data message to a set of service nodes to perform the set of services;
  - forwarding the data message to the identified second VTI for the data message to receive the required service for the data message, wherein a service insertion operation for the set of services is not performed on the data message for the identified second VTI;
  - receiving the serviced data message at the identified second VTI for the data message, wherein the serviced data message is marked as being serviced; and
  - forwarding the serviced data message to a destination of the data message over the first VTI, wherein the first VTI does not provide the service insertion operation for the serviced data message because it was marked as having been serviced.

13. The method of claim 12, wherein the second VTI is connected to a service node that performs the service in the set of services and returns serviced data messages to the second VTI.

14. The method of claim 13, wherein the service node is one of a service virtual machine and a service appliance.

15. The method of claim 12, wherein the second VTI performs a service insertion operation for a default service insertion rule that marks data messages received from the service node as having been serviced.

16. The method of claim 12, wherein the first VTI is a first endpoint for a VPN implemented using an internet protocol security (IPsec) protocol, and using the IPsec protocol comprises receiving encrypted data messages at the first VTI, and the first VTI performs the service insertion operations after data messages are decrypted.

17. The method of claim 16, wherein the first VTI is an endpoint for a plurality of IPsec tunnels.

18. The method of claim 12, wherein the set of services is a first set of services and the edge forwarding element has a plurality of virtual interfaces, the method further comprising:
- at the edge forwarding element:
  - performing, for the first virtual tunnel interface (VTI), a service insertion operation for the set of services on received data messages directed out of the first VTI to identify other interfaces in the plurality of virtual interfaces to which to direct the received data messages to receive a required set of services in the first set of services for the data message;
  - forwarding each data message to the identified virtual interface for the data message to receive the required set of services for the data message, wherein a service insertion operation for the set of services is not performed on the data message for the identified virtual interface;
  - receiving each serviced data message at the identified virtual interface for the data message, wherein the serviced data message is marked as being serviced; and
  - forwarding each serviced data message to a destination of the data message over the first VTI, wherein the first VTI does not provide the service insertion operation for the serviced data message because it was marked as having been serviced.

19. The method of claim 18, wherein the service insertion operation performed by the first VTI for the first set of services on a particular received data message comprises:
- identifying a service insertion rule that applies to the particular data messages,
  - wherein the identified service insertion rule applies to the particular data messages because a set of data message attributes of the particular data messages match a set of data message attributes specified in the identified service insertion rule, and
  - wherein the identified service insertion rule is included in a set of service insertion rules identified as applying at the first VTI; and
- identifying, based on the identified service insertion rule, (1) the required set of services for the particular data message and (2) a virtual interface in the plurality of virtual interfaces as a next hop to which to direct the particular data message to receive the required set of services.

20. The method of claim 19, wherein each service insertion rule in the set of service insertion rules identifies a set of interfaces of the edge forwarding element to which it applies.

* * * * *